US008082098B2

(12) United States Patent
Fukuda et al.

(10) Patent No.: US 8,082,098 B2
(45) Date of Patent: Dec. 20, 2011

(54) INFORMATION SUPPLYING SYSTEM, APPARATUS MOUNTED IN VEHICLE, INFORMATION SUPPLYING SERVER, PROGRAM, AND INFORMATION PROCESSING METHOD

(75) Inventors: Kazuhiro Fukuda, Kanagawa (JP); Tetsuo Maruyama, Tokyo (JP); Tetsu Sumita, Tokyo (JP)

(73) Assignees: Sony Corporation, Tokyo (JP); Plat-Ease Corporation, Tokyo (JP)

( * ) Notice: Subject to any disclaimer, the term of this patent is extended or adjusted under 35 U.S.C. 154(b) by 794 days.

(21) Appl. No.: 12/024,776

(22) Filed: Feb. 1, 2008

(65) Prior Publication Data

US 2008/0228394 A1 Sep. 18, 2008

(30) Foreign Application Priority Data

Mar. 16, 2007 (JP) ................................. 2007-069504
Mar. 16, 2007 (JP) ................................. 2007-069519
Mar. 16, 2007 (JP) ................................. 2007-069529

(51) Int. Cl.
*G01C 21/30* (2006.01)
(52) U.S. Cl. ............. 701/208; 701/36; 701/212; 701/35; 340/988; 340/438; 705/14.1
(58) Field of Classification Search .................... 701/29, 701/35, 36, 208, 212; 340/988, 425.5, 438, 340/439; 705/14.1
See application file for complete search history.

(56) References Cited

U.S. PATENT DOCUMENTS

2004/0128066 A1 7/2004 Kudo et al.
2006/0267801 A1* 11/2006 Tomita et al. ................. 340/988

FOREIGN PATENT DOCUMENTS

| EP | 1 760 655 A2 | 3/2007 |
|---|---|---|
| JP | 11-65434 | 3/1999 |
| JP | 11-160088 | 6/1999 |
| JP | 11-167695 | 6/1999 |
| JP | 2001-134561 | 5/2001 |
| JP | 2002-195842 | 7/2002 |
| JP | 2002-373397 | 12/2002 |
| JP | 2003-511798 | 3/2003 |
| JP | 2003-131604 | 5/2003 |

(Continued)

OTHER PUBLICATIONS

Japanese Office Action issued Apr. 5, 2011, in Patent Application No. 2007-69519.

(Continued)

*Primary Examiner* — Gertrude Arthur Jeanglaud
(74) *Attorney, Agent, or Firm* — Oblon, Spivak, McClelland, Maier & Neustadt, L.L.P.

(57) ABSTRACT

An apparatus mounted in a vehicle which can communicate with an information supplying server includes: a detection portion for detecting that a predetermined process is carried out in the vehicle; an institution information acquiring portion for acquiring institution information indicating an institution in a location where the process is carried out; a recording portion for recording the institution information acquired by the institution information acquiring portion in a memory medium; an information acquiring portion for acquiring information to be outputted from an information supplying server which stores information to be outputted, including map additional information to be added to maps or advertisement information; and an extraction portion for extracting information to be outputted relating to an institution indicated by the institution information recorded in the memory medium from the information to be outputted acquired by the information acquiring portion.

18 Claims, 49 Drawing Sheets

FOREIGN PATENT DOCUMENTS

| | | |
|---|---|---|
| JP | 2004-157013 | 6/2004 |
| JP | 2004-191666 | 7/2004 |
| JP | 2004-317222 | 11/2004 |
| JP | 2004-354619 | 12/2004 |
| JP | 2005-10080 | 1/2005 |
| JP | 2005-25461 | 1/2005 |
| JP | 2005-134707 | 5/2005 |
| JP | 2005-249606 | 9/2005 |
| JP | 2006-096060 | 4/2006 |
| JP | 2006-96060 | 4/2006 |
| WO | WO 01/27831 A1 | 4/2001 |
| WO | WO 2004/046985 A1 | 6/2004 |
| WO | WO 2006/126496 A1 | 11/2006 |

OTHER PUBLICATIONS

Office Action issued Apr. 21, 2011, in Japan Patent Application No. 2009-295793.

Hiroyuki Minami, et al., "The Construction of Advertising Information Delivery System to In-Vehicle Equipments Based on User Model and Situation—Estimation of Interest-Level and Machine Learning of Delivery-Rules—", The Information Processing Society of Japan, IPSJ SIG Technical Report, vol. 2006, No. 120, Nov. 17, 2006, pp. 177-184.

* cited by examiner

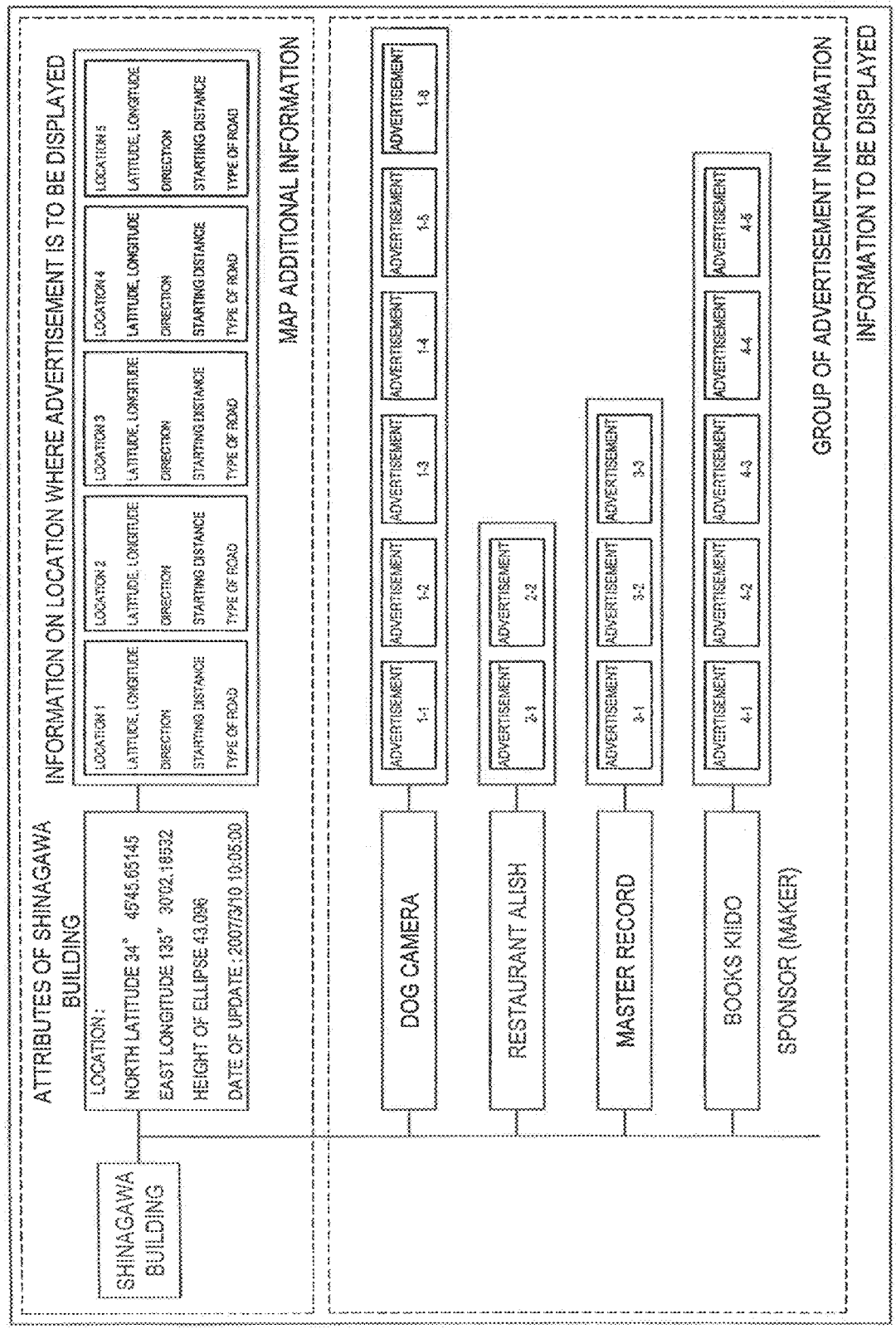

FIG.6

MAP ADDITIONAL INFORMATION

```
<map_addition_information location_id="location100100"
                          title="SHINAGAWA BUILDING"
                          create_date="20070130"
                          copyright="SHINAGAWA BUILDING">
  <position data="xxx.yyy.hhh" />
</map_addition_information>
```

FIG.7

ADVERTISEMENT INFORMATION

```
<advertisement_information maker_id="mk10005"
                           advertisement_id="ad101"
                           title="DOG CAMERA"
                           start_date="2007/3/1"
                           end_data="2007/3/30" >
  < map_addition_information_ref title="SHINAGAWA BUILDING"
                                 id_ref="location100100"
                                 comment="NORTH700m" />
         .
         .
         .
```

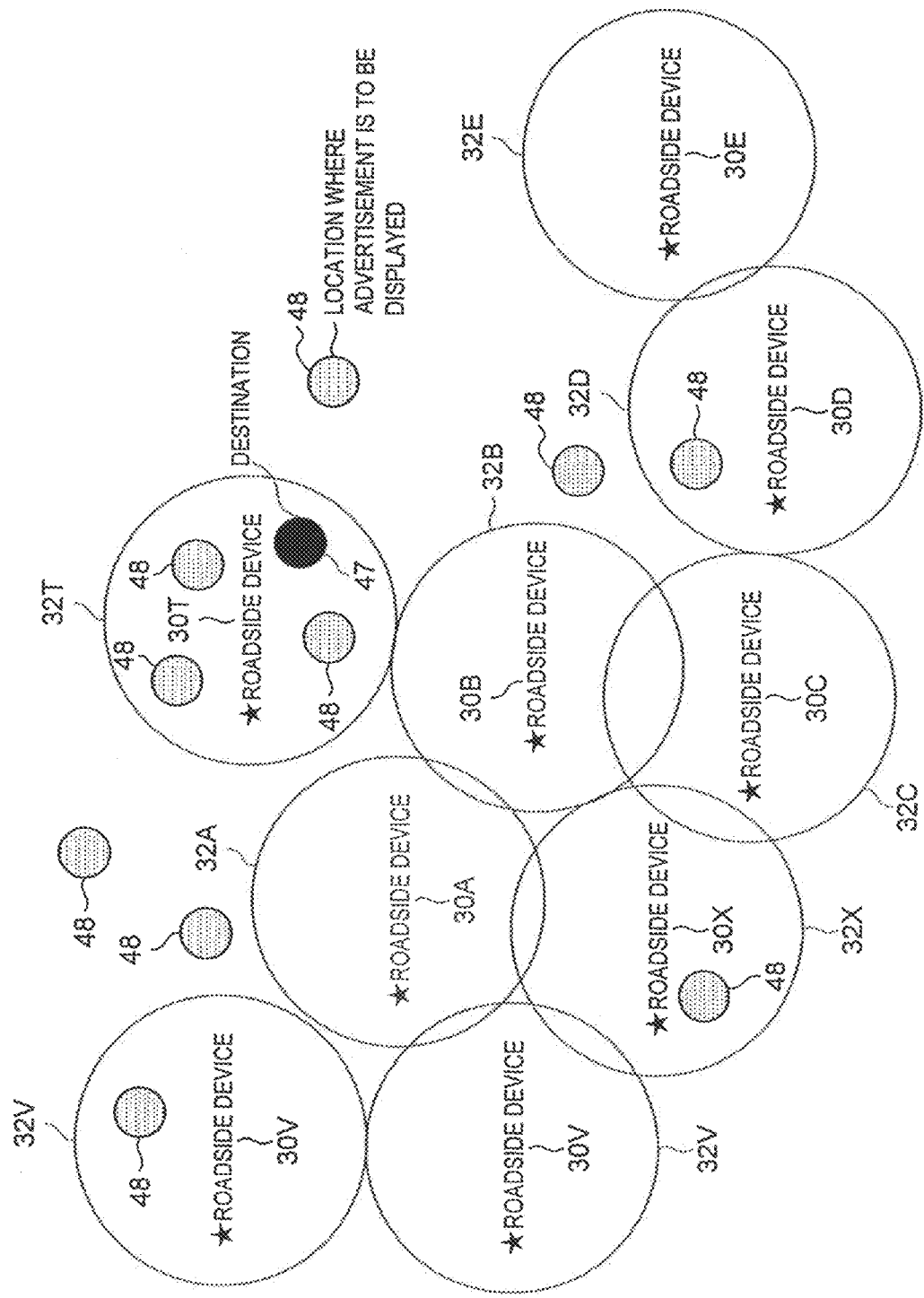

FIG.24

```
<advertisement_information maker_id="mk10006"
                advertisement_id="ad101" title="RESTAURANT ALISH"
                start_time="8:00:00"
                end_time="20:00:00"
                start_date="2007/3/1"
                end_data="2007/3/30" >
```
~462

```
< map_addition_information_ref title="SHINAGAWA BUILDING"
                  id_ref="location100100"
                  comment="INSIDE SHINAGAWA BUILDING" />
```
~464

```
<content start_time="8.00:00" end_time="10:00:00">
HOW ABOUT A GOOD VALUE BREAKFAST?!!! RESTAURANT ALISH
</content>
```
~466

```
<content start_time="10:00:00" end_time="13:00.00">
HOW ABOUT A GOOD VALUE LUNCH?!!! RESTAURANT ALISH
</content>
```
~468

```
<content start_time="13:00:00" end_time="20.00:00">
WE HAVE PREPARED RICH COURSES AND ARE WAITING FOR YOU.!!!
RESTAURANT ALISH
</content>
```
~470

```
<content start_time="13:00:00" end_time="20:00:00">
HOW ABOUT A CAKE SET FOR A BRIEF BREAK?!!! RESTAURANT ALISH
</content>
```
~472

```
<content start_time="13:00:00" end_time="20:00:00">
WE DO BREAKFAST FROM 8 IN THE MORNING.!!! RESTAURANT ALISH
</content>
</advertisement_infomation>
```
~474

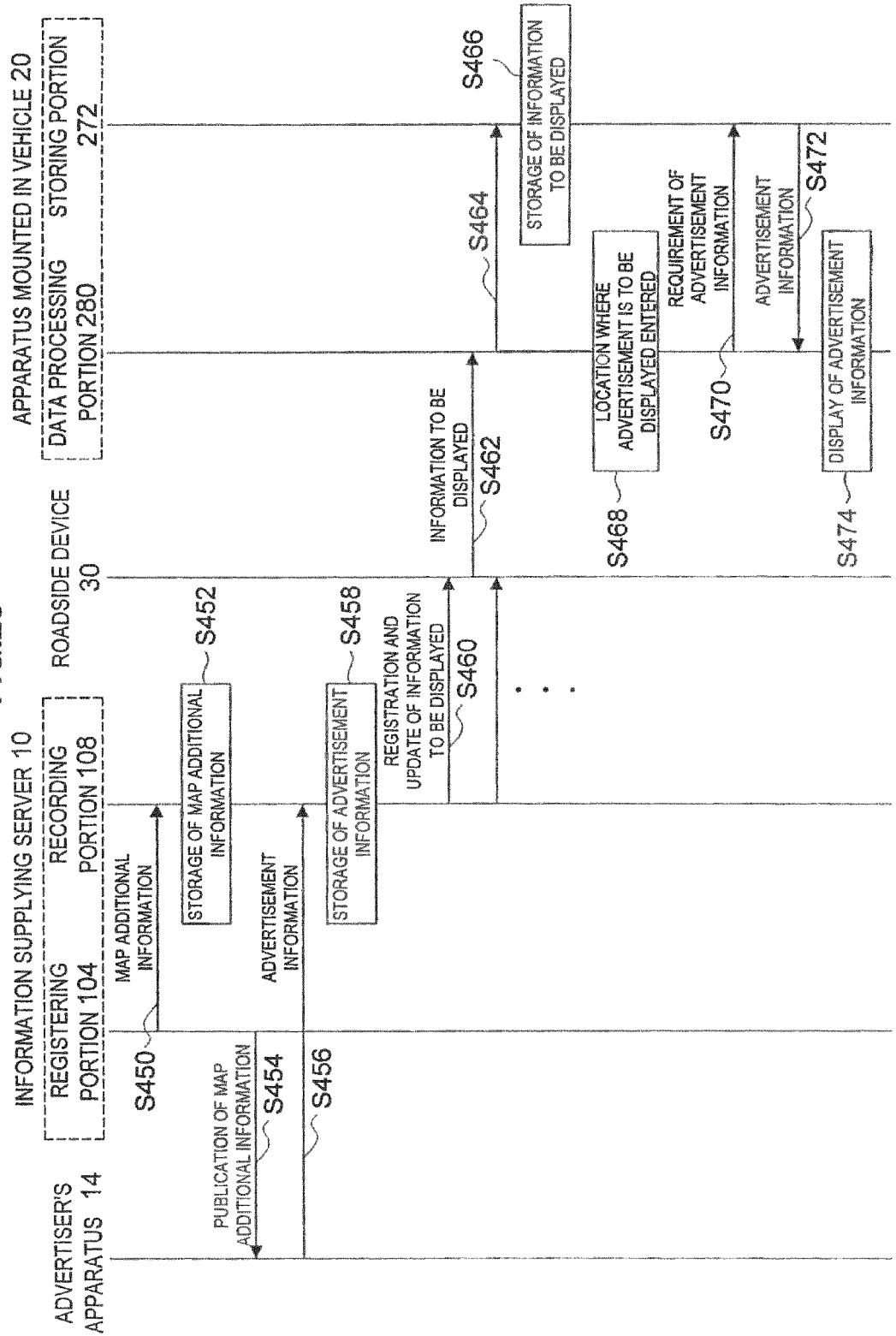

FIG.32

| CATEGORY :
CONVENIENCE STORE | TIME AND DATE |
|---|---|
| SEVEN-TEN | 2007/1/23 9:00 |
| LAWSEN | 2007/1/22 18:00 |
| SEVEN-TEN | 2007/1/22 8:00 |
| SEVEN-TEN | 2007/1/19 16:00 |
| SEVEN-TEN | 2007/1/13 11:00 |
| SEVEN-TEN | 2007/1/11 9:00 |
| SEVEN-TEN | 2006/12/30 11:00 |
| SEVEN-TEN | 2006/12/25 11:00 |
| MINIMART | 2006/12/20 11:00 |

FIG.33

PREFERENCE INFORMATON

```
<category type="CONVENIENCE STORE">
<content name="SEVEN-TEN" point="15" >
<event date="20061225" time="11:00:00"/>
<event date="20061230" time="11:00:00"/>
<event date="20070111" time="09:00:00"/>
...
</content>
</category>
```

FIG.34

```
<preference id="car00100" car_model="BMV" >
<category type="CONVENIENCE STORE">
<content name="SEVEN-TEN" point="15" />
<content name="LAWSEN" point="3" />
</category>
<category type="GAS STATION">
<content name="SHALL" point="8" />
<content name="ENELS" point="1" />
</category>
...

</preference>
```

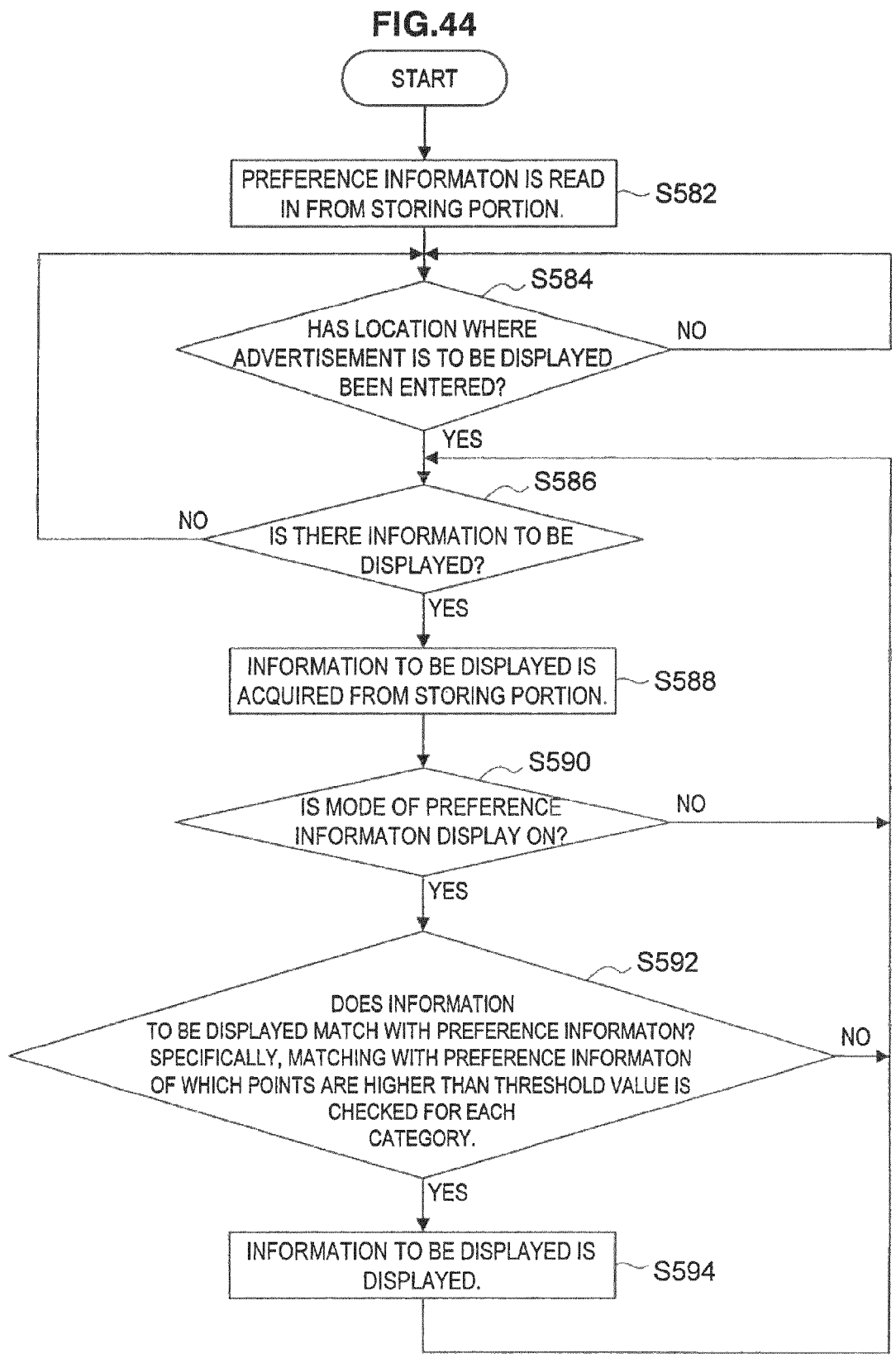

FIG.45

| STATE OF VEHICLE | EXAMPLE OF EXTRACTED MAP ADDITIONAL INFORMATION |
|---|---|
| GAUGE INDICATES THAT THE GAS IS LOW (FILL UP DESIRED) | GAS STATION |
| DRIVING TIME IS LONG (TIRED) | CAFE |
| TIME (HUNGRY) | RESTAURANT |
| WINDSHIELD WIPERS ACTIVATED (HIGH HUMIDITY) | SHOP OR REST AREA WITH ROOF |
| FREQUENT BRAKING IN SHORT TIME (TRAFFIC JAM) | SHOP WITH BATHROOM, SHOP TOGETHER WITH INTRODUCTION OF SIDE ROAD |
| PARKING LAMP (FRONT OF SHOP (FOR PARKING)) | PARKING LOT, CLOSE-BY SHOP WITH PARKING LOT |
| HORN HONKED (TIRED) | CAFE |
| POWER WINDOW OPENED (FEEL WELL) | FARAWAY SHOP, SIGHTSEEING SPOT WITH BEAUTIFUL SCENERY |
| REAR WINDOW OPENED (MANY PASSENGERS) | SHOP FOR MANY PEOPLE |
| INSIDE LAMP TURNED ON (LOOKING FOR SOMETHING) | PARKING LOT, SHOP |
| MAINTENANCE ERROR LAMP TURNED ON (REPAIR) | DEALER, GAS STATION |
| OUTSIDE TEMPERATURE IS HIGH OR LOW | CORRESPONDING SHOP |

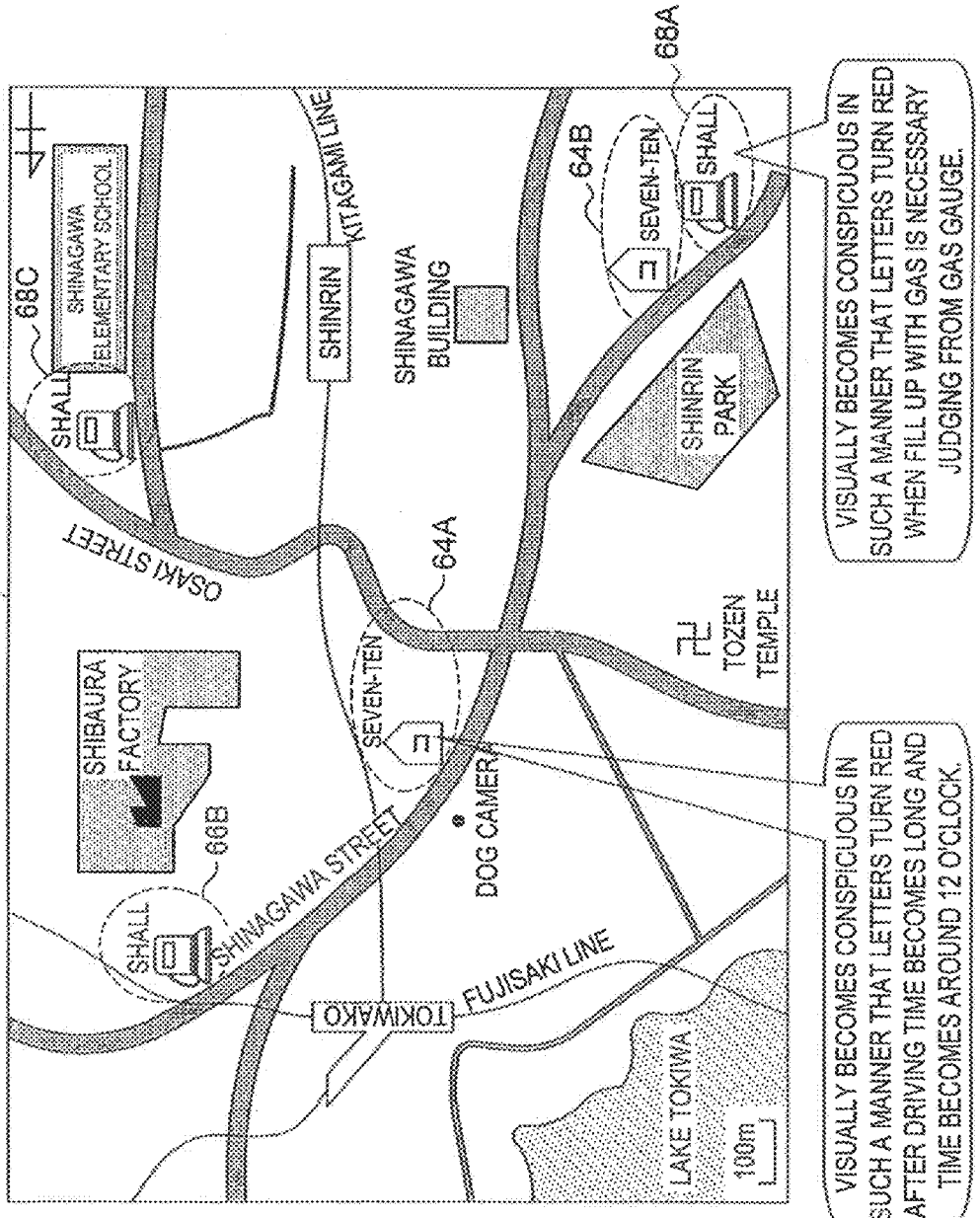

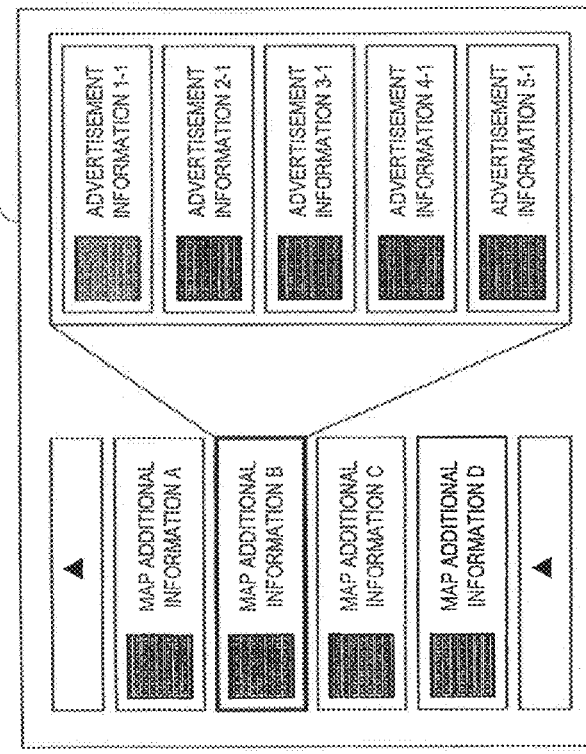

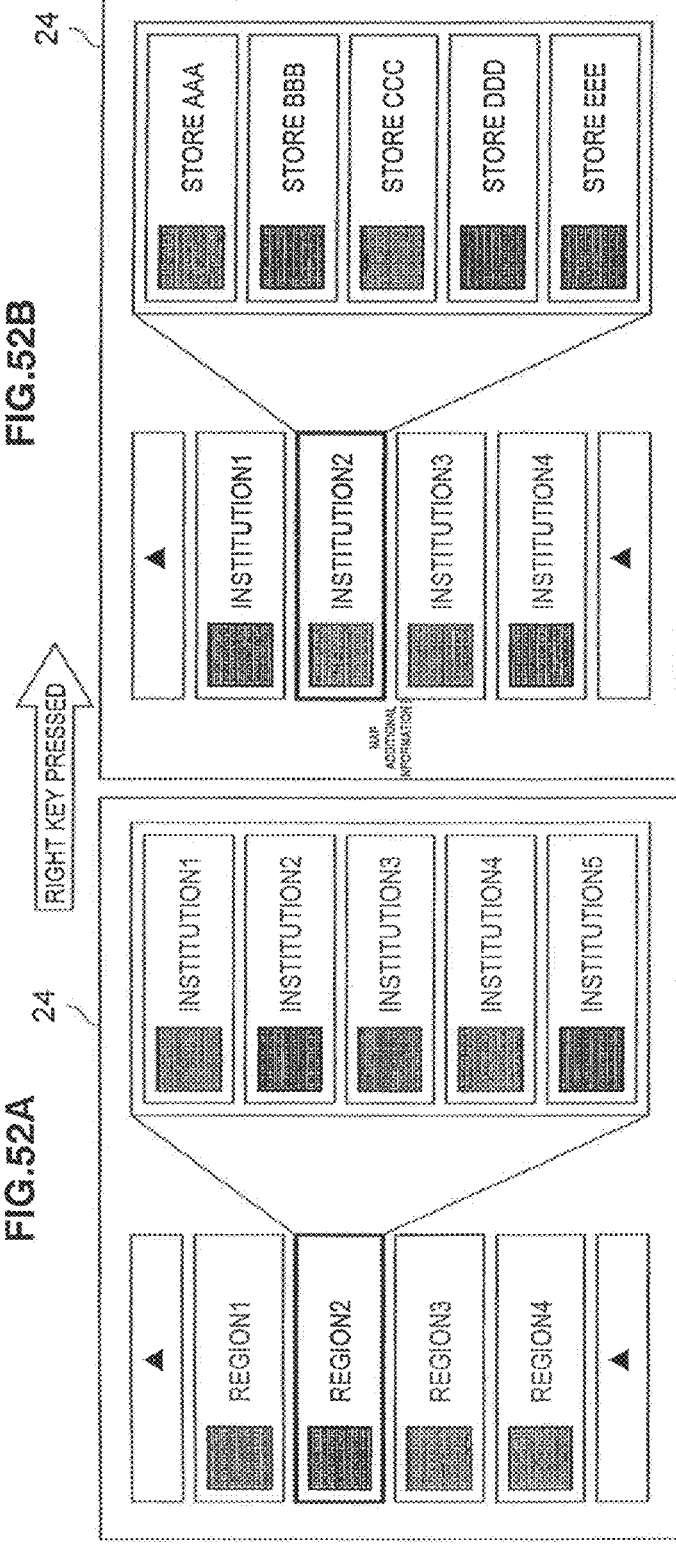

INFORMATION SUPPLYING SYSTEM, APPARATUS MOUNTED IN VEHICLE, INFORMATION SUPPLYING SERVER, PROGRAM, AND INFORMATION PROCESSING METHOD

CROSS REFERENCES TO RELATED APPLICATIONS

The present invention contains subject matter related to Japanese Patent Applications JP 2007-069519, JP 2007-069504 and JP 2007-069529 filed in the Japan Patent Office on Mar. 16, 2007, the entire contents of which being incorporated herein by reference.

BACKGROUND OF THE INVENTION

1. Field of the Invention

The present invention relates to an information supplying system, an apparatus mounted in a vehicle, an information supplying server, a program, and an information processing method.

2. Description of the Related Art

Recently, apparatuses mounted in a vehicle which can display the present location of the vehicle and a guide for driving the vehicle, such as a path leading to a destination, have been widely spread. Such apparatuses mounted in a vehicle can display a guide for driving the vehicle as described above together with a screen with a map on the basis of the stored map information, GPS (Global Positioning System) for estimating the location of the vehicle and the like.

In addition, roadside devices in which DSRC (Dedicated Short Range Communication) functions are provided tend to be equipped along roads through which vehicles run. An apparatus mounted in a vehicle can receive information on traffic jams, information on traffic regulations and the like transmitted from such roadside devices, and can display the state of the traffic jam and the state of the traffic regulations on the screen with a map.

Furthermore, a system has been proposed in which an information providing server that stores map additional information which is to be added to the maps, such as gas stations and convenience stores, as well as advertisement information, transmits the map additional information to be added to maps and the advertisement information to apparatuses mounted in a vehicle via roadside devices so that the apparatuses mounted in a vehicle display a screen with a map on which the map additional information is overlapped along with the advertisement information.

Japanese Patent Application Laid-Open No. 2002-195842, for example, discloses a technology which relates to a system for displaying advertisement information as described above on apparatuses mounted in a vehicle. This is described in further detail. Japanese Patent Application Laid-Open No. 2002-195842 discloses a car navigation system where advertisement information for a certain store is transmitted to the apparatuses mounted in vehicles which pass through the neighborhood of a region where the store is located so that the apparatuses mounted in a vehicle display the store's advertisement information.

SUMMARY OF THE INVENTION

However, apparatuses mounted in a vehicle, which are included in a car navigation system in the past, display information to be outputted, such as map additional map additional information and advertisement information, transmitted to an unspecified large number of apparatuses mounted in a vehicle from an information supplying server. Accordingly, car navigation systems in the past may merely supply information to be outputted to the users of the vehicles, which is useless for the users.

Accordingly, it is desirable to address the above-identified issue and to provide a novel and improved information supplying system, an apparatus mounted in a vehicle, an information supplying server, a program, and an information processing method, capable of supplying information to be outputted to the users of the vehicles corresponding to their driving history and the current state of the vehicle.

According to an embodiment of the present invention, there is provided an information supplying system including an apparatus mounted in a vehicle and an information supplying server which can communicate with the apparatus mounted in a vehicle. The information supplying system includes a detection portion for detecting that a predetermined process is carried out in a vehicle, an institution information acquiring portion for acquiring institution information which indicates the institution in a location where the process is carried out, a recording portion for storing the institution information acquired by the institution information acquiring portion in a memory medium, and an extraction portion for extracting the information to be outputted on an institution indicated by the institution information stored in the memory medium from information to be outputted, including map additional map additional information to be added to maps or advertisement information stored in the information supplying server.

According to another embodiment of the present invention, there is provided an apparatus mounted in a vehicle which can communicate with an information supplying server. This apparatus mounted in a vehicle has a detection portion for detecting that a predetermined process is carried out in a vehicle, an institution information acquiring portion for acquiring institution information which indicates the institution in a location where the process is carried out, a recording portion for recording the institution information acquired by the institution information acquiring portion in a memory medium, an information acquiring portion for acquiring information to be outputted from an information supplying server which stores information to be outputted, including the map additional information to be added to maps or the advertisement information, and an extraction portion for extracting information to be outputted concerning the institution indicated by the institution information recorded in the memory medium from among the information to be outputted acquired by the information acquiring portion.

In this configuration, when the detection portion detects that a predetermined process is carried out in the vehicle, such as the engine of the vehicle stalling and monetary accounts being automatically settled, the institution information acquiring portion acquires institution information indicating the institution in a location where the process is carried out, and the recording portion records the institution information in a memory medium. Here, the institution information recorded in the memory medium can be handled equally with the history of the institution used by the user of the vehicle, and in some cases indicates the preferences of the user of the vehicle. In addition, the extraction portion extracts the information to be outputted on the basis of this institution information from the information to be outputted acquired by the information acquiring portion. Accordingly, this apparatus mounted in a vehicle makes it possible to extract the information to be outputted based on the preferences of the user of the vehicle from the information to be outputted acquired by the information acquiring portion.

In addition, this apparatus mounted in a vehicle may further include an output control portion for outputting the information to be outputted extracted by the extraction portion from an output apparatus. In this configuration, the output control portion can output the information to be outputted extracted by the extraction portion on the basis of the preferences of the user of the vehicle from the output apparatus. Accordingly, the output apparatus can output the information to be outputted on the basis of the preferences of the user of the vehicle, and therefore, the user of the vehicle can acquire information on the basis of their own preferences from the output of the output apparatus.

In addition, the extraction portion may determine institution information, of which the number of pieces satisfies a predetermined criterion, from among the institution information indicating the same type of institutions recorded in a memory medium, and may extract the information to be outputted concerning the institutions indicated by the determined institution information. For example, when 10 pieces of institution information indicating institutions named Seven Ten are stored in the memory medium, 2 pieces of institution information indicating institutions named Lawsen are stored in the memory medium and a predetermined criterion is that 5 or more pieces of information are stored in the memory medium, the extraction portion may determine that the institution information concerning Seven Ten is the institution information, of which the number of pieces of information satisfying a predetermined criterion is recorded in a memory medium and may extract the information to be outputted concerning Seven Ten from the information to be outputted acquired by the information acquiring portion. That is to say, the institution information, of which the number of pieces that are stored in the memory medium is greater, can be considered to be more reliable in order to determine the preferences of the user of the vehicle, and therefore, it becomes possible with the apparatus mounted in a vehicle to extract the information to be outputted meeting the preferences of the user of the vehicle better.

In addition, the recording portion may record time information indicating the time when a predetermined process is carried out associated with the institution information in a memory medium, and the apparatus mounted in a vehicle may have a management portion for deleting the institution information, with which the time information indicating the time out of the range from the present time to the set time before is associated in the memory medium. In this configuration, the management portion deletes the institution information, with which the time information indicating the time out of range from the present time to the set time before is associated in the memory medium, and therefore, the extraction portion extracts the information to be outputted using the institution information on the basis of processing of which the elapsed time from when the process is started is within the range of the set time. The preferences of the user of the vehicle may change due to a transition of time or season, and therefore, the apparatus mounted in a vehicle can extract the information to be outputted better following the change in the preferences of the user of the vehicle.

According to another embodiment of the present invention, there is provided an information supplying server which can communicate with an apparatus mounted in a vehicle. The information supplying server has an institution information acquiring portion for acquiring institution information indicating an institution in a location where a predetermined process is carried out in the vehicle, information to be outputted, including map additional map additional information to be added to maps or advertisement information, a storing portion for storing the institution information acquired by the institution information acquiring portion, an extraction portion for extracting the information to be outputted concerning an institution indicated by the institution information stored in the memory medium from the information to be outputted stored in the storing portion, and a transmission portion for transmitting the information to be outputted extracted by the extraction portion to the apparatus mounted in a vehicle.

In this configuration, the institution information acquiring portion acquires institution information indicating an institution in a location where a predetermined process is carried out, such as the engine of the vehicle stalling and monetary accounts being automatically settled, and institution information acquired by the information acquiring portion is stored in the storing portion. Here, the institution information stored in the storing portion can be handled equally with the history of the institutions used by the user of the vehicle, and in some cases, shows the preferences of the user of the vehicle. In addition, the extraction portion extracts the information to be outputted on the basis of the above described institution information from the information to be outputted acquired by the information acquiring portion, and the output portion transmits the extracted information to be outputted to the apparatus mounted in a vehicle. Accordingly, this information supplying server makes it possible for the information to be outputted on the basis of the preferences of the user of the vehicle to be transmitted to the apparatus mounted in a vehicle.

The extraction portion may extract the information to be outputted concerning the institutions indicated in the institution information of which the stored number of pieces satisfies a predetermined criterion from among the institution information showing the same institutions stored in the storing portion. In the case where 8 pieces of institution information showing the institutions named Enels are stored in the memory medium, 3 pieces of institution information showing the institutions named Shall are stored in the memory medium, and a predetermined criterion is the storage of the greatest number of pieces stored in the memory medium, the extraction portion determines that Enels is the institution information of which the number of pieces stored in the memory medium satisfies the predetermined criterion and can extract the information to be outputted concerning Enels from the information to be outputted acquired by the information acquiring portion. That is to say, the institution information, of which the number of pieces that are stored in the storing portion is greater, can be considered to be more reliable in order to determine the preferences of the user of the vehicle, and therefore, it becomes possible with the information supplying server to extract the information to be outputted more on the basis of the preferences of the user of the vehicle and transmit the information to the apparatus mounted in a vehicle.

The storing portion may store the time information showing the time when the process is carried out in the vehicle so that the time information corresponds to the institution information, and the information supplying server may have a management portion for deleting the institution information, with which the time information indicating the time out of the range from the present time to the set time before is associated in the storing portion. In this configuration, the management portion deletes the institution information, with which the time information showing the time out of the range from the present time to the set time before is associated in the storing portion, and therefore, the extraction portion extracts the information to be outputted using the institution information on the basis of the processing out of the range from when the process starts being carried out and the set time. The preferences of the user of the vehicle may change due to a transition of time or season, and therefore, the information supplying server can extract the information to be outputted following the change in the preferences of the user of the vehicle and transmits the information to the apparatus mounted in a vehicle.

According to another embodiment of the present invention, there is provided a program for making a computer function as an apparatus mounted in a vehicle which can communicate with an information supplying server and includes a detection portion for detecting that a predetermined process is carried out in a vehicle, an institution information acquiring portion for acquiring institution information which shows the institution in a location where the process is carried out, a recording portion for recording the institution information acquired by the institution information acquiring portion in a memory medium, an information acquiring portion for acquiring information to be outputted from an information supplying server which stores information to be outputted, including the map additional information to be added to maps or the advertisement information, and an extraction portion for extracting map additional information to be added concerning the institution indicated by the institution information recorded in the memory medium from among the information to be outputted acquired by the information acquiring portion.

Such program can make a hardware resource of a computer including, for example, a CPU, a ROM and a RAM carry out functions of the above described information acquiring portion, recording portion and extraction portion. That is to say, it is possible to make a computer function as the above described apparatus mounted in a vehicle using the program.

According to another embodiment of the present invention, there is provided a program which makes a computer function as an information supplying server which can communicate with an apparatus mounted in a vehicle and includes an institution information acquiring portion for acquiring institution information indicating an institution in a location where a predetermined process is carried out in the vehicle, information to be outputted, including map additional map additional information to be added to maps or advertisement information, a storing portion for storing the institution information acquired by the institution information acquiring portion, an extraction portion for extracting the information to be outputted concerning an institution indicated by the institution information stored in the memory medium from the information to be outputted stored in the memory medium, and a transmission portion for transmitting the information to be outputted extracted by the extraction portion to the apparatus mounted in a vehicle.

This program can make a hardware resource of a computer including, for example, a CPU, a ROM and a RAM carry out functions of the above described institution information acquiring portion, recording portion, extraction portion and transmission portion. That is to say, it is possible to make a computer function as the above described information supplying server using this program.

According to another embodiment of the present invention, there is provided an information processing method which is used in an apparatus mounted in a vehicle that can communicate with an information supplying server and includes the steps of: detecting that a predetermined process is carried out in a vehicle; acquiring institution information indicating the institution in a location where the process is carried out; recording the institution information in a memory medium; acquiring information to be outputted from the information supplying server which stores information to be outputted including map additional map additional information to be added to maps or advertisement information; and extracting information to be outputted which relates to the institution indicated by the institution information recorded in the memory medium from among the information to be outputted.

According to another embodiment of the present invention, there is provided an information processing method in an information supplying server which can communicate with an apparatus mounted in a vehicle, including the steps of: recording information to be outputted, which includes map additional map additional information to be added to maps or advertisement information, in a memory medium; acquiring institution information indicating the institution in a location where a predetermined process is carried out in the vehicle; recording the institution information in a memory medium; extracting information to be outputted which relates to the institution indicated by the institution information from among the information to be outputted recorded in the memory medium; and transmitting the information to be outputted extracted from the information to be outputted recorded in the memory medium to the apparatus mounted in a vehicle.

According to another embodiment of the present invention, there is provided an information supplying system, which includes an apparatus mounted in a vehicle, and an information supplying server which can communicate with the apparatus mounted in a vehicle. The information supplying system includes a detection portion for detecting the state of a vehicle, which includes a state of operation of the vehicle and the state of the environment, and an extraction portion for extracting the information to be outputted in accordance with the state of the vehicle detected by the detection portion from the information to be outputted, which includes the map additional information to be added to maps or advertisement information stored in the information supplying server.

According to another embodiment of the present invention, there is provided an apparatus mounted in a vehicle which can communicate with an information supplying server. The apparatus mounted in a vehicle includes a detection portion for detecting the state of the vehicle, which includes the state of the operation of the vehicle or the state of the environment, an information acquiring portion for acquiring the information to be outputted from the information supplying server which stores the information to be outputted, which includes the map additional information to be added to maps or advertisement information, and an extraction portion for extracting the information to be outputted in accordance with the state of the vehicle detected by the detection portion from the information to be outputted acquired by the information acquiring portion.

In this configuration, when the detection portion detects the state of a vehicle, which includes the state of the operation of a vehicle or the state of the environment, such that the gauge indicates that the gas is low, the windshield wipers are in operation, or the outside temperature is low, the extraction portion can extract the information to be outputted in accordance with the state of the vehicle at that time from the information to be outputted acquired by the information acquiring portion.

The apparatus mounted in a vehicle may further include an output controlling portion for controlling the information to be outputted extracted by the extraction portion distinguished from the other information to be outputted in the output apparatus when outputted. In this configuration, the information to be outputted in accordance with the state of the vehicle at that time extracted by the extraction portion is displayed so as to be distinguished from the other information to be outputted in such a manner that the output control portion emphasizes and then outputs the information to be outputted in accordance with the state of the vehicle at that time in the output apparatus, and therefore, it becomes possible for the user of the vehicle to efficiently obtain map additional information to be added in accordance with the state of the vehicle at that time.

According to another embodiment of the present invention, there is provided an information supplying server which can communicate with an apparatus mounted in a vehicle. This information supplying server includes a vehicle state acquiring portion for acquiring the state of a vehicle, which includes the state of the operation of the vehicle or the state of the environment, a storing portion for storing information to be outputted, which includes map additional map additional information to be added to maps or advertisement information, an extraction portion for extracting the information to be outputted in accordance with the state of the vehicle acquired by the vehicle state acquiring portion from the information to be outputted stored in the storing portion, and a transmission portion for transmitting the information to be outputted extracted by the extraction portion to the apparatus mounted in the vehicle.

In this configuration, when the detection portion detects the state of a vehicle, which includes the state of the operation of the vehicle or the state of the environment, such that the operation time is long, the horn is honked, or the outside humidity is high, the extraction portion may extract the information to be outputted in accordance with the state of the vehicle at that time from the information to be outputted acquired by the information acquiring portion. As a result of this, the information to be outputted extracted by the extraction portion in the apparatus mounted in a vehicle may be outputted so as to be distinguished from other of the information to be outputted, or only the information to be outputted extracted by the extraction portion may be outputted for example, and thus, it becomes possible to efficiently supply the information to be outputted in accordance with the state of the vehicle at that time to the user of the vehicle.

According to another embodiment of the present invention, there is provided a program for making a computer function as an apparatus mounted in a vehicle which can communicate with an information supplying server, including a detection portion for detecting the state of a vehicle, which includes the state of the operation of the vehicle or the state of the environment, an information acquiring portion for acquiring the information to be outputted from the information supplying server, which stores the information to be outputted that includes the map additional information to be added to maps or advertisement information, and an extraction portion for extracting the information to be outputted in accordance with the state of the vehicle detected by the detection portion from the information to be outputted acquired by the information acquiring portion.

Such program can make a hardware resource of a computer that includes, for example, a CPU, a ROM and a RAM, perform functions of the detection portion, the information acquiring portion and the extraction portion as described above. That is to say, it is possible to make a computer function as an apparatus mounted in a vehicle as described above using the program.

According to another embodiment of the present invention, there is provided a program for making a computer function as an information supplying server which can communicate with an apparatus mounted in a vehicle including a vehicle state acquiring portion for acquiring the state of a vehicle, which includes the state of the operation of the vehicle or the state of the environment, a recording portion for recording the information to be outputted that includes the map additional information to be added to maps or advertisement information, an extraction portion for extracting the information to be outputted in accordance with the state of the vehicle acquired by the vehicle state acquiring portion from the information to be outputted stored in the memory medium, and a transmission portion for transmitting the information to be outputted extracted by the extraction portion to the apparatus mounted in the vehicle.

This program can make a hardware resource of a computer that includes, for example, a CPU, a ROM and a RAM, perform functions of the vehicle state acquiring portion, the recording portion, the extraction portion and the transmission portion as described above. That is to say, it is possible to make a computer function as an information supplying server as described above using the program.

According to another embodiment of the present invention, there is provided an information processing method which is used in an apparatus mounted in a vehicle that can communicate with an information supplying server, including the steps of detecting the state of the vehicle, which includes the state of the operation of the vehicle or the state of the environment, acquiring the information to be outputted from the information supplying server which stores information to be outputted including the map additional information to be added to maps or advertisement information, and extracting the information to be outputted in accordance with the state of the vehicle from the information to be outputted.

According to another embodiment of the present invention, there is provided an information processing method which is used in an information supplying server that can communicate with an apparatus mounted in a vehicle, including the steps of recording the information to be outputted, which includes the map additional information to be added to maps or advertisement information, in a memory medium, acquiring the state of a vehicle, which includes the state of the operation of the vehicle or the state of the environment, extracting the information to be outputted in accordance with the state of the vehicle from the information to be outputted recorded in the memory medium, and transmitting the information to be outputted extracted from the information to be outputted recorded in the memory medium to the apparatus mounted in a vehicle.

According to another embodiment of the present invention, there is provided an information supplying system including an apparatus mounted in a vehicle and an information supplying server which can communicate with the apparatus mounted in a vehicle. Specifically, the information supplying server includes a storing portion for storing the map additional information to be added to maps, advertisement information and the location information indicating the location where a predetermined advertisement is outputted associated with each other, and a transmission portion for transmitting the advertisement information and the location information, associated with the map additional information that indicates a set destination in the vehicle. In addition, the apparatus mounted in a vehicle includes a destination setting portion for setting the destination of the vehicle, an information acquiring portion for acquiring from the information supplying server the advertisement information and the location information transmitted from the transmission portion, an output portion for outputting the advertisement information acquired by the information acquiring portion, a location determining portion for determining whether or not the vehicle has arrived at the advertisement output location indicated by the location information acquired by the information acquiring portion, and an output control portion for controlling the output portion to output the advertisement information when the location determining portion determines that the vehicle has arrived at the advertisement output location.

According to another embodiment of the present invention, there is provided an apparatus mounted in a vehicle which can communicate with an information supplying server. This apparatus mounted in a vehicle includes a destination setting portion for setting the destination of the vehicle, an information acquiring portion for acquiring advertisement information and location information, associated with the information added to the maps that indicates the set destination from the information supplying server which stores the map additional information to be added to maps, the advertisement information and the location information indicating the location where a predetermined advertisement is to be outputted, associated with each other, an output portion for outputting the advertisement information acquired by the information acquiring portion, a location determining portion for determining whether or not the vehicle has arrived at the advertisement output location indicated by the location information acquired by the information acquiring portion, and an output control portion for outputting advertisement information to the output portion when the location determining portion determines that the vehicle has arrived at the advertisement output location.

In this configuration, the information acquiring portion acquires advertisement information and location information associated with the map additional information indicating the destination set by the destination setting portion from the information supplying server. In addition, the location determining portion determines whether or not the vehicle has arrived at the advertisement output location indicated by the location information acquired by the information acquiring portion, and when the location determining portion determines that the vehicle has arrived at the advertisement output location, the output control portion controls the output portion to output the advertisement information acquired by the information acquiring portion. As a result, the output portion can output the advertisement information associated with the map additional information indicating the destination set by the destination setting portion at the advertisement output location indicated by the location information associated with the map additional information indicating the destination set by the destination setting portion.

Accordingly, advertisement information concerning the destination to which the user of the vehicle is going is supplied to the user, and therefore, the user, in many cases, is interested in the supplied advertisement information or the supplied advertisement information can be effectively used. In addition, from the point of view of the advertisers who supply the advertisement information, the advertisement information, which can be determined as having high consumer appeal, can be supplied to the user of the vehicle. That is to say, the apparatus mounted in the vehicle supplies the advertisement information relating to the destination of the user to the user of the vehicle, and therefore, the usefulness of the advertisement information for the user of the vehicle can be improved, and the effects of supplying advertisements by the advertisers can be improved.

The advertisement information may include a number of pieces of advertisement information, and the apparatus mounted in a vehicle may further include a selection portion for selecting the next advertisement information to be outputted by the output portion on the basis of the advertisement information previously outputted by the output portion. In this configuration, whenever the vehicle arrives at the advertisement output location, the next advertisement information selected on the basis of the advertisement information previously outputted by the output portion is outputted. Accordingly, the apparatus mounted in the vehicle can output each piece of advertisement information included in the group of pieces of advertisement information acquired by the information acquiring portion in a predetermined order independent of the route through which the vehicle travels.

The advertisement information may include a sequence of pieces of advertisement information placed in order relative to each other, and the selection portion may select a piece of advertisement information which is placed in the order next to the piece of the advertisement information outputted by the output portion immediately before as the next piece of advertisement information. In this configuration, the apparatus mounted in the vehicle sequentially outputs the pieces of advertisement information which are placed in order relative to each other independent of the route through which the vehicle travels. In a case where, for example, a sequence of pieces of advertisement information concerning a certain product are placed in such an order that the advertisement information describing the outline the product, the advertisement information describing the purpose of the product, the advertisement information describing the application of the product, and the advertisement information describing the effects of the product, this apparatus mounted in the vehicle outputs the sequence of advertisement information in this order. As a result, the user of the vehicle can grasp the product in an efficient order through the outline, the purpose, the application and the effects. That is to say, this apparatus mounted in a vehicle can supply a sequence of advertisement information having higher consumer appeal to the user of the vehicle than in the case where each piece of advertisement information is independently outputted.

The apparatus mounted in a vehicle may further include a recording portion for recording the institution information indicating the institution in a location where a predetermined process is carried out in the vehicle in a memory medium and an extraction portion for extracting advertisement information concerning the institution indicated by the institution information recorded in the memory medium from among the advertisement information acquired by the information acquiring portion, wherein the output control portion may control the output portion to output the advertisement information extracted by the extraction portion.

In this configuration, when the institution information indicates an institution in the location where a predetermined process is carried out in the vehicle such that the engine of the vehicle stalls and monetary accounts are automatically settled, the recording portion records the institution information in a memory medium. Here, the institution information recorded in the memory medium can be handled equally as the history of the institutions used by the user of the vehicle and sometimes indicates the preferences of the user of the vehicle. In addition, the extraction portion extracts advertisement information concerning this institution information from among the advertisement information acquired by the information acquiring portion, and the output control portion makes the output portion output the extracted advertisement information. Accordingly, the apparatus mounted in a vehicle can allow advertisement information matching the preferences of the user of the vehicle to be extracted from the advertisement information acquired by the information acquiring portion, and thus, the advertisement information matching the preferences of the user of the vehicle can be adopted.

The apparatus mounted in a vehicle is further provided with a detection portion for detecting the state of a vehicle, which includes the state of the operation of the vehicle or the state of the environment, and an extraction portion for extracting advertisement information in accordance with the state of the vehicle detected by the detection portion from among the advertisement information acquired by the information acquiring portion, and the output control portion may control the output portion to output the advertisement information extracted by the extraction portion.

In this configuration, when the detection portion detects the state of a vehicle, which includes the state of the operation of a vehicle or the state of the environment, for example, the gauge indicates that the gas is low, the windshield wipers are in operation, and the outside temperature is low, the extraction portion can extract the information to be outputted in accordance with the state of the vehicle at that time from the information to be outputted acquired by the information acquiring portion, and the output control portion makes the output portion output the extracted advertisement information. Accordingly, it becomes possible for the user of the vehicle to efficiently gain the information to be outputted in accordance with the state of the vehicle at that time.

The apparatus mounted in a vehicle may be further provided with an extraction portion for extracting advertisement information in accordance with the time from the advertisement information acquired by the information acquiring portion, and the output control portion may control the output portion to output the advertisement information extracted by the extraction portion. Here, the advertisement information that can be effectively used by the user of the vehicle sometimes differs depending on the time zone. Though the user of the vehicle thinks of going to a certain restaurant in the case where the advertisement information showing the lunch menu of the restaurant is supplied at 11 am, the advertisement information can hardly be effectively used sometimes in the case where the advertisement information is supplied at 8 pm. Therefore, the extraction portion extracts advertisement information in accordance with the time from among the advertisement information acquired by the information acquiring portion as described above, and thus, the advertisement information having high consumer appeal at that time can be supplied to the user of the vehicle.

The information supplying server may transmit advertisement information and location information through any of the communication apparatuses having different ranges of use, and the information acquiring portion may acquire advertisement information and location information through the communication apparatus, of which the range of use includes the location advertisement output indicated by the location information which is associated with the map additional information showing the set destination. Even if a communication apparatus, of which the range of use does not include the advertisement output location on the basis of the set destination, transmits advertisement information and location information on the basis of the destination, the transmitted advertisement information is not immediately outputted by the apparatus mounted in a vehicle, and therefore, this is not effective from the point of view of the amount of communicated data. Therefore, when the information acquiring portion can acquire advertisement information and the location information from a communication apparatus, of which the range of use includes the advertisement output location on the basis of the destination, as described above, the amount of communication and the scale of the hardware can be restricted in the communication apparatus.

According to another embodiment of the present invention, there is provided an information supplying server which can communicate with an apparatus mounted in a vehicle. This information supplying server is provided with a storing portion for storing the map additional information, advertisement information and the location information indicating the location where a predetermined advertisement is to be outputted, associated with each other, and a transmission portion for transmitting advertisement information and the location information associated with the map additional map additional information indicating the destination set for the vehicle to the apparatus mounted in a vehicle via a communication apparatus.

In this configuration, the transmission portion can transmit advertisement information and location information, associated with the information to be added, to the maps indicating the destination set for the vehicle to the apparatus mounted in the vehicle via a communication apparatus. As a result, it becomes possible to supply advertisement information associated with the set destination to the user of the vehicle in the advertisement output location indicated by the location information associated with the set destination on the basis of the operation of the apparatus mounted in the vehicle.

The advertisement information stored in the storing portion may include a series of pieces of advertisement information which are placed in order relative to each other. In this configuration, the transmission portion transmits the sequence of pieces of advertisement information to the apparatus mounted in the vehicle, and therefore, it becomes possible for the transmission portion to output a sequence of pieces of advertisement information which are placed in order relative to each other to the apparatus mounted in the vehicle, independent of the route through which the vehicle travels in sequence. In the case where a sequence of pieces of advertisement information concerning a certain building, for example, is placed in such an order that advertisement information indicating the historical background of the building, advertisement information indicating anecdotes relating to why the building was built, advertisement information indicating incidents concerning the building, and advertisement information indicating the state of the building at that time, the sequence of pieces of advertisement information can be outputted to the apparatus mounted in the vehicle in this order. As a result, advertisement information on the building can be supplied to the user of the vehicle in an efficient order of historical background, anecdotes why the building was built, incidents, and state at that time. That is to say, the information supplying server can supply a sequence of pieces of advertisement information having high consumer appeal to the user of the vehicle by making the pieces of advertisement information relate to each other.

The storing portion may further include an extraction portion for storing institution information indicating the institution in a location where a predetermined process is carried out in the vehicle and extracting advertisement information on the institution indicated by the institution information stored in the storing portion from among the advertisement information stored in the storing portion, and the transmission portion may transmit the advertisement information extracted by the extraction portion to the apparatus mounted in the vehicle via a communication apparatus.

In this configuration, institution information indicating the institution in a location where a predetermined process is carried out in the vehicle, for example that the engine of the vehicle stalls and monetary accounts are automatically settled, is stored in the storing portion. Here, the institution information stored in the storing portion can be handled equally with the history of the institution used by the user of the vehicle, and sometimes indicates the preferences of the user of the vehicle. In addition, the extraction portion extracts advertisement information concerning the institution information from among the advertisement information acquired by the information acquiring portion, and the output portion transmits the extracted advertisement information to the apparatus mounted in the vehicle. Accordingly, it becomes possible with the information supplying server for the advertisement information matching the preferences of the user of the vehicle to be transmitted to the apparatus mounted in the vehicle.

An extraction portion for extracting advertisement information in accordance with the state of the vehicle including the state of operation of the vehicle or the state of the environment from among the advertisement information stored in the storing portion may further be provided, and the transmission portion may transmit the advertisement information extracted by the extraction portion to the apparatus mounted in the vehicle via a communication apparatus. In this configuration, the information supplying server acquires the state of the vehicle, including the state of operation of the vehicle or the state of the environment, for example, that the driving time is long, that the horn is honked, or that the outside humidity is high, and the extraction portion extracts the acquired advertisement information in accordance with the state of the vehicle, and the transmission portion transmits the extracted advertisement information. As a result, the advertisement information extracted by the extraction portion in the apparatus mounted in the vehicle can be distinguished from other pieces of information when outputted, and it becomes possible for only the advertisement information extracted by the extraction portion to be outputted, and thus, it becomes possible to efficiently supply the advertisement information in accordance with the state of the vehicle at that time to the user of the vehicle.

An extraction portion for extracting advertisement information in accordance with the time from among the advertisement information stored in the storing portion may further be provided, and the transmission portion may transmit the advertisement information extracted by the extraction portion to the apparatus mounted in the vehicle via a communication apparatus. Here, the advertisement information that can be effectively used by the user of the vehicle sometimes differs depending on the time zone. The user of the vehicle may think of visiting a certain zoo which is open from 10 am to 5 pm if the advertisement information on the zoo is supplied by 11 am, but it may not necessarily possible for this advertisement information to be effectively used in the case where it is supplied at 8 pm. Therefore, the extraction portion extracts advertisement information in accordance with the time from the advertisement information acquired by the information acquiring portion as described above, and thus, the transmission portion can transmit advertisement information having high consumer appeal to the user of the vehicle to the apparatus mounted in the vehicle.

Each communication apparatus has a different range of use, and the transmission portion may transmit advertisement information and location information via a communication apparatus of which the range of use includes the advertisement output location indicated by the location information extracted by the extraction portion. Even if a communication apparatus of which the range of use does not include the advertisement output location on the basis of the set destination transmits advertisement information and location information on the basis of the destination, the transmitted advertisement information is not immediately outputted by the apparatus mounted in a vehicle, and therefore, this is not effective from the point of view of the amount of communicated data. Therefore, when the corresponding advertisement information and location information are transmitted to the communication apparatus of which the range of use includes the advertisement output location indicated by the location information extracted by the extraction portion, as described above, the amount of communication and the scale of the hardware can be restricted in the communication apparatus.

According to another embodiment of the present invention, there is provided a program for making a computer function as an apparatus mounted in a vehicle which can communicate with an information supplying server and has a destination setting portion for setting the destination for the vehicle, an information acquiring portion for acquiring advertisement information and location information, associated with the map additional information indicating the set destination from an information supplying server for storing map additional map additional information, advertisement information and location information indicating the location where a predetermined advertisement is to be outputted, associated with each other, an output portion for outputting the advertisement information acquired by the information acquiring portion, a location determining portion for determining whether or not the vehicle has arrived at the advertisement output location indicated by the location information acquired by the information acquiring portion, and an output control portion for making the output portion output advertisement information when the location determining portion determines that the vehicle has arrived at the advertisement output location.

This program can make a hardware resource of a computer that includes, for example, a CPU, a ROM and a RAM, perform functions of the destination setting portion, the information acquiring portion, the location determining portion and the output control portion as described above. That is to say, it is possible to make a computer function as an apparatus mounted in a vehicle as described above using the program.

According to another embodiment of the present invention, there is provided a program for making a computer function as an information supplying server which can communicate with an apparatus mounted in a vehicle and has a recording potion for recording map additional map additional information, advertisement information and location information indicating the location where a predetermined advertisement is to be outputted associated with each other in a memory medium, and a transmission portion for transmitting advertisement information and location information, associated with map additional map additional information, indicating the destination set for the vehicle to the apparatus mounted in the vehicle via a communication apparatus.

Such program can make a hardware resource of a computer that includes, for example, a CPU, a ROM and a RAM, perform functions of the above described recording portion and the transmission portion. That is to say, it is possible to make a computer function as an information supplying server as described above using this program.

According to another embodiment of the present invention, there is provided an information processing method which is used in an apparatus mounted in a vehicle that can communicate with an information supplying server, wherein the information processing method includes the steps of setting the destination for the vehicle, acquiring advertisement information and map additional location information, associated with map additional map additional information indicating the set destination from an information supplying server which stores the map additional information, advertisement information and location information indicating the location where a predetermined advertisement is to be outputted, associated with each other, determining whether or not the vehicle has arrived at the advertisement output location indicated by the location information acquired from the information supplying server, and outputting the advertisement information acquired from the information supplying server to the output apparatus when it is determined that the vehicle has arrived at the advertisement output location.

According to another embodiment of the present invention, there is provided an information processing method in an information supplying server which can communicate with an apparatus mounted in a vehicle, wherein the information processing method includes the steps of recording map additional map additional information, advertisement information and location information indicating a location where a predetermined advertisement is to be outputted associated with each other in a memory medium, and transmitting advertisement information and location information associated with map additional map additional information indicating the destination set in the vehicle to an apparatus mounted in the vehicle.

According to another embodiment of the present invention, there is provided an information supplying system including an apparatus mounted in a vehicle and an information supplying server which can communicate with the apparatus mounted in a vehicle. Specifically, the information supplying server is including a storing portion for storing map additional map additional information, an advertisement information group of a number of pieces of advertisement information, and location information indicating the location where a predetermined advertisement is to be outputted, associated with each other. In addition, the apparatus mounted in the vehicle is provided with an information acquiring portion for acquiring an advertisement information group and location information which associated with map additional map additional information in accordance with the location of the vehicle from the information supplying server, an output portion for outputting advertisement information which is included in the advertisement information group acquired by the information acquiring portion, a selection portion for selecting the next advertisement information from the advertisement information group on the basis of the advertisement information previously outputted by the output portion, a location determining portion for determining whether or not the vehicle has arrived at the advertisement output location indicated by location information acquired by the information acquiring portion, and an output control portion for outputting the next advertisement information selected by the selection portion to the output portion when the location determining portion determines that the vehicle has arrived at the advertisement output location.

According to another embodiment of the present invention, there is provided an apparatus mounted in a vehicle which can communicate with an information supplying server. This apparatus mounted in a vehicle is provided with an information acquiring portion for acquiring an advertisement information group and location information associated with map additional map additional information in accordance with the location of the vehicle from an information supplying server for storing map additional map additional information, an advertisement information group which includes a number of pieces of advertisement information, and location information indicating the location where a predetermined advertisement is to be outputted, associated with each other, an output portion for outputting advertisement information which is included in the advertisement information group acquired by the information acquiring portion, a selection portion for selecting the next advertisement information from the advertisement information group on the basis of the advertisement information previously outputted form the output portion, a location determining portion for determining whether or not the vehicle has arrived at the advertisement output location indicated by the location information acquired by the information acquiring portion, and an output control portion for making an output portion output the next advertisement information selected by the selection portion when the location determining portion determines that the vehicle has arrived at the advertisement output location.

In this configuration, whenever the vehicle arrives at the advertisement output location, the next advertisement information selected by the selection portion is outputted on the basis of the advertisement information previously outputted by the output portion. Accordingly, the apparatus mounted in the vehicle can output each piece of advertisement information included in the advertisement information group acquired by the information acquiring portion in a predetermined order, independent of the route through which the vehicle travels.

The advertisement information includes a sequence of pieces of advertisement information which are placed in order relative to each other, and the selection portion may select a piece of advertisement information of which the order is placed next to the piece of advertisement information outputted immediately before by the output portion as the next piece of advertisement information. In this configuration, the apparatus mounted in a vehicle outputs the sequence of pieces of advertisement information which are placed in order relative to each other, independent of the route through which the vehicle travels, in sequence. In the case where, for example, a sequence of pieces of advertisement information concerning a certain product is placed in such the order of advertisement information which depicts the product, advertisement information indicating the purpose of the product, advertisement information showing the application for the product and advertisement information showing the effects of the product, the apparatus mounted in a vehicle outputs the sequence of pieces of advertisement information in this order. As a result, the user of the vehicle can grasp the product in an efficient order, namely, in the order of depiction, purpose, application and effects. That is to say, the apparatus mounted in a vehicle can supply a sequence of pieces of advertisement information having higher consumer appeal to the user of the vehicle than in the case where each piece of advertisement information is independently outputted.

The information acquiring portion may acquire the transmitted advertisement information group and location information from the information supplying server via any of communication apparatuses having different ranges of use, the communication apparatus may transmit advertisement information groups and location information concerning the range of use of other communication apparatuses surrounding the communication apparatus, and the apparatus mounted in the vehicle may further include a recording portion for recording the advertisement information group and the location information acquired by the information acquiring portion in a memory medium. In this configuration, the communication apparatus transmits the advertisement information groups and the location information concerning the range of use of other surrounding communication apparatuses, and therefore, the apparatus mounted in a vehicle can enter the range of use of another communication apparatus in a state where the advertisement information group and the location information concerning the range of use of other communication apparatuses are stored. As a result, the apparatus mounted in the vehicle can process the advertisement information group and the location information concerning the range of use of other communication apparatuses before entering the range of use of another communication apparatus, and therefore, can smoothly output the advertisement information group concerning the range of use of another communication apparatus after entering the range of use of another communication apparatus.

The apparatus mounted in a vehicle may further include a recording portion for recording institution information indicating the institution in the location where a predetermined process is carried out in the vehicle in a memory medium, and an extraction portion for extracting advertisement information concerning the institution indicated by the institution information recorded in the memory medium from among the advertisement information acquired by the information acquiring portion, and the output control portion may control the output portion to output the advertisement information extracted by the extraction portion.

In this configuration, when the institution information indicates an institution in the location where a predetermined process is carried out in the vehicle such that the engine of the vehicle stalls and monetary accounts are automatically settled, the recording portion records the institution in a memory medium. Here, the institution information recorded in the memory medium can be handled equally as the history of the institutions used by the user of the vehicle and sometimes indicates the preferences of the user of the vehicle. In addition, the extraction portion extracts advertisement information concerning this institution information from among the advertisement information acquired by the information acquiring portion, and the output control portion controls the output portion to output the extracted advertisement information. Accordingly, the apparatus mounted in a vehicle can allow advertisement information matching the preferences of the user of the vehicle to be extracted from the advertisement information acquired by the information acquiring portion, and thus, the advertisement information matching the preferences of the user of the vehicle can be adopted.

The apparatus mounted in a vehicle is further provided with a detection portion for detecting the state of a vehicle, which includes the state of the operation of the vehicle or the state of the environment, and an extraction portion for extracting advertisement information in accordance with the state of the vehicle detected by the detection portion from among the advertisement information acquired by the information acquiring portion, and the output control portion may control the output portion to output the advertisement information extracted by the extraction portion. In this configuration, when the detection portion detects the state of a vehicle, which includes the state of the operation of a vehicle or the state of the environment, for example, the gauge indicates that the gas is low, the windshield wipers are in operation, and the outside temperature is low, the extraction portion can extract the information to be outputted in accordance with the state of the vehicle at that time from the information to be outputted acquired by the information acquiring portion, and the output control portion controls the output portion to output the extracted advertisement information. Accordingly, it becomes possible for the user of the vehicle to efficiently gain the information to be outputted in accordance with the state of the vehicle at that time.

The apparatus mounted in a vehicle may be further provided with an extraction portion for extracting advertisement information in accordance with the time from the advertisement information acquired by the information acquiring portion, and the output control portion may control the output portion to output the advertisement information extracted by the extraction portion. Here, the advertisement information that can be effectively used by the user of the vehicle sometimes differs depending on the time zone. Though the user of the vehicle thinks of going to a certain restaurant in the case where the advertisement information showing the lunch menu of the restaurant is supplied at 11 am, the advertisement information can hardly be effectively used sometimes in the case where the advertisement information is supplied at 8 pm. Therefore, the extraction portion extracts advertisement information in accordance with the time from among the advertisement information acquired by the information acquiring portion as described above, and thus, the advertisement information having high consumer appeal at that time can be supplied to the user of the vehicle.

According to another embodiment of the present invention, there is provided an information supplying server which can communicate with an apparatus mounted in a vehicle. This information supplying server is including a storing portion for storing map additional map additional information, an advertisement information group including a number of pieces of advertisement information, and location information indicating the location where a predetermined advertisement is to be outputted, associated with each other, and a transmission portion for making any of communication apparatuses having different ranges of use transmit an advertisement information group and location information that has been thinned out to such a degree that the information associated with map additional map additional information for the location at a distance from the range of use of the communication apparatus to the vehicle.

In this configuration, the closer the map additional information with which the information associated is to the range of use of each communication apparatus, the more detailed the contents transmitted by the communication apparatus are, and the closer the map additional information with which the information associated is to the range of use of each communication apparatus, the more general the transmitted contents are. Accordingly, this information supplying server has higher efficiency in terms of the information transmitted to the communication apparatus, and can restrict the amount of communication and the scale of the hardware in the communication apparatus.

The advertisement information group stored in the storing portion may include a sequence of pieces of advertisement information which are placed in order relative to each other. In this configuration, the transmission portion transmits the sequence of pieces of advertisement information to an apparatus mounted in a vehicle, and therefore, it becomes possible to make the apparatus mounted in a vehicle output a sequence of pieces of advertisement information which are placed in order relative to each other in sequence, independent of the route through which the vehicle travels. In the case where a sequence of pieces of advertisement information concerning a certain building, for example, is placed in such an order that advertisement information indicating the historical background of the building, advertisement information indicating anecdotes relating to why the building was built, advertisement information indicating incidents concerning the building, and advertisement information indicating the state of the building at that time, the sequence of pieces of advertisement information can be outputted to the apparatus mounted in the vehicle in this order. As a result, advertisement information on the building can be supplied to the user of the vehicle in an efficient order of historical background, anecdotes why the building was built, incidents, and state at that time. That is to say, the information supplying server can supply a sequence of pieces of advertisement information having high consumer appeal to the user of the vehicle by making the pieces of advertisement information relate to each other.

The storing portion may store the institution information indicating the institution in the location where a predetermined process is carried out in the vehicle, and the extraction portion may extract the advertisement information on the institution indicated by the institution information stored in the storing portion from among the advertisement information stored in the storing portion.

In this configuration, institution information indicating the institution in a location where a predetermined process is carried out in the vehicle, for example that the engine of the vehicle stalls and monetary accounts are automatically settled, is stored in the storing portion. Here, the institution information stored in the storing portion can be handled equally with the history of the institution used by the user of the vehicle, and sometimes indicates the preferences of the user of the vehicle. In addition, the extraction portion extracts advertisement information concerning the institution information from among the advertisement information acquired by the information acquiring portion, and the output portion transmits the extracted advertisement information to the apparatus mounted in the vehicle. Accordingly, it becomes possible with the information supplying server for the advertisement information matching the preferences of the user of the vehicle to be transmitted to the apparatus mounted in the vehicle.

The extraction portion may extract the advertisement information which corresponds to the state of the vehicle, including the state of operation of the vehicle or the state of the environment, from among the advertisement information stored in the storing portion. In this configuration, the information supplying server acquires the state of the vehicle, including the state of operation of the vehicle or the state of the environment, for example, that the driving time is long, that the horn is honked, or that the outside humidity is high, and the extraction portion extracts the acquired advertisement information in accordance with the state of the vehicle, and the transmission portion transmits the extracted advertisement information. As a result, the advertisement information extracted by the extraction portion in the apparatus mounted in the vehicle can be distinguished from other pieces of information when outputted, and it becomes possible for only the advertisement information extracted by the extraction portion to be outputted, and thus, it becomes possible to efficiently supply the advertisement information in accordance with the state of the vehicle at that time to the user of the vehicle.

An extraction portion may extract advertisement information in accordance with the time from among the advertisement information stored in the storing portion. Here, the advertisement information that can be effectively used by the user of the vehicle sometimes differs depending on the time zone. The user of the vehicle may think of visiting a certain zoo which is open from 10 am to 5 pm if the advertisement information on the zoo is supplied by 11 am, but it may not necessarily possible for this advertisement information to be effectively used in the case where it is supplied at 8 pm. Therefore, the extraction portion extracts advertisement information in accordance with the time from the advertisement information acquired by the information acquiring portion as described above, and thus, the transmission portion can transmit advertisement information having high consumer appeal to the user of the vehicle to the apparatus mounted in the vehicle.

According to another embodiment of the present invention, there is provided a program for making a computer function as an apparatus mounted in a vehicle which can communicate with an information supplying server, wherein the apparatus mounted in a vehicle is provided with an information acquiring portion for acquiring an advertisement information group and the location information associated with map additional map additional information in accordance with the location of the vehicle from an information supplying server which stores map additional map additional information, an advertisement information group including a number of pieces of advertisement information and location information indicating the location where a predetermined advertisement is to be outputted, associated with each other, an output portion for outputting a piece of advertisement information included in the advertisement information group acquired by the information acquiring portion, a selection portion for selecting the next advertisement information from the advertisement information group on the basis of the advertisement information previously outputted by the output portion, a location determining portion for determining whether or not the vehicle has arrived at the advertisement output location indicated by the location information acquired by the information acquiring portion, and an output control portion for controlling an output portion to output the next advertisement information selected by the selection portion when the location determining portion determines that the vehicle has arrived at the advertisement output location.

This program can make a hardware resource of a computer that includes, for example, a CPU, a ROM and a RAM, perform functions such as those of the information acquiring portion, the selection portion, the location determining portion and the output control portion as described above. That is to say, it is possible to make a computer function as an apparatus mounted in a vehicle as described above using the program.

According to another embodiment of the present invention, there is provided a program for making a computer function as an information supplying server which can communicate with an apparatus mounted in a vehicle, wherein the information supplying server is provided with a recording portion for recording information added to the maps, an advertisement information group including a number of pieces of advertisement information, and location information indicating the location where a predetermined advertisement is to be outputted, associated with each other, in a memory medium, and a transmission portion for making any of communication apparatuses having different ranges of use transmit an advertisement information group and location information that has been thinned out to such a degree that the information associated with map additional map additional information for the location at a distance from the range of use of the communication apparatus to the vehicle.

According to another embodiment of the present invention, there is provided a program for making a computer function as an information supplying server which can communicate with an apparatus mounted in a vehicle and has a recording potion for recording map additional map additional information, advertisement information and location information indicating the location where a predetermined advertisement is to be outputted associated with each other in a memory medium, and a transmission portion for transmitting advertisement information and location information, associated with map additional map additional information, indicating the destination set for the vehicle to the apparatus mounted in the vehicle via a communication apparatus.

According to another embodiment of the present invention, there is provided an information processing method which is used in an apparatus mounted in a vehicle that can communicate with an information supplying server, wherein the information processing method includes the steps of acquiring an advertisement information group and location information, associated with the map additional information in accordance with the location of the vehicle, from an information supplying server which stores map additional map additional information, an advertisement information group including a number of pieces of advertisement information, and location information indicating the location where a predetermined advertisement is to be outputted, associated with each other, making the output apparatus output a piece of advertisement information included in the advertisement information group acquired by the information supplying server, determining whether or not the vehicle has arrived at the advertisement output location indicated by the location information acquired by the information supplying server, selecting the next advertisement information from the advertisement information group on the basis of the advertisement information previously outputted by the output apparatus, and making the output apparatus output the next advertisement information when the location determining portion determines that the vehicle has arrived at the advertisement output location.

According to another embodiment of the present invention, there is provided an information processing method in an information supplying server which can communicate with an apparatus mounted in a vehicle, wherein the information processing method includes the steps of recording map additional map additional information, an advertisement information group including a number of pieces of advertisement information, and location information indicting the location where a predetermined advertisement is to be outputted, associated with each other, in a memory medium, and making any of communication apparatuses having different ranges of use transmit an advertisement information group and location information that has been thinned out to such a degree that the information associated with map additional map additional information for the location at a distance from the range of use of the communication apparatus to the vehicle.

According to the embodiments of the present invention described above, information to be outputted can be supplied to the user of the vehicle in accordance with the preferences of the user or the state at that time.

BRIEF DESCRIPTION OF THE DRAWINGS

FIG. 5 is a diagram illustrating an example of the configuration of information for display transmitted to an apparatus mounted in a vehicle via a roadside device;

FIG. 6 is a diagram illustrating an example of the structure of data of map additional information;

FIG. 7 is a diagram illustrating an example of the structure of data of advertisement information;

FIG. 23 is a diagram illustrating a modification of the first embodiment;

FIG. 24 is a diagram illustrating a modification of the first embodiment;

FIG. 25 is a sequence diagram schematically showing the flow of the information processing method used in the information supplying system according to the second embodiment of the present invention;

FIG. 32 is a diagram schematically illustrating preference information recorded in a storing portion;

FIG. 33 is a diagram illustrating an example of the structure of data on preference information;

FIG. 34 is a diagram illustrating another example of the structure of data on preference information;

FIG. 44 is a flow chart showing the flow through which an apparatus mounted in a vehicle displays information to be displayed on the basis of preference information;

FIG. 45 is a diagram illustrating an example of the relationship between the state of the vehicle and map additional information extracted by an extraction portion 288;

FIG. 47 is a diagram illustrating an example of a screen displayed in a display portion;

FIGS. 51A-D are diagrams illustrating examples of a screen for searching for map additional information and advertisement information; and FIGS. 52A-D are diagrams illustrating examples of a screen for searching for a region or an institution for each region.

DETAILED DESCRIPTION OF THE PREFERRED EMBODIMENTS

Figure 1:
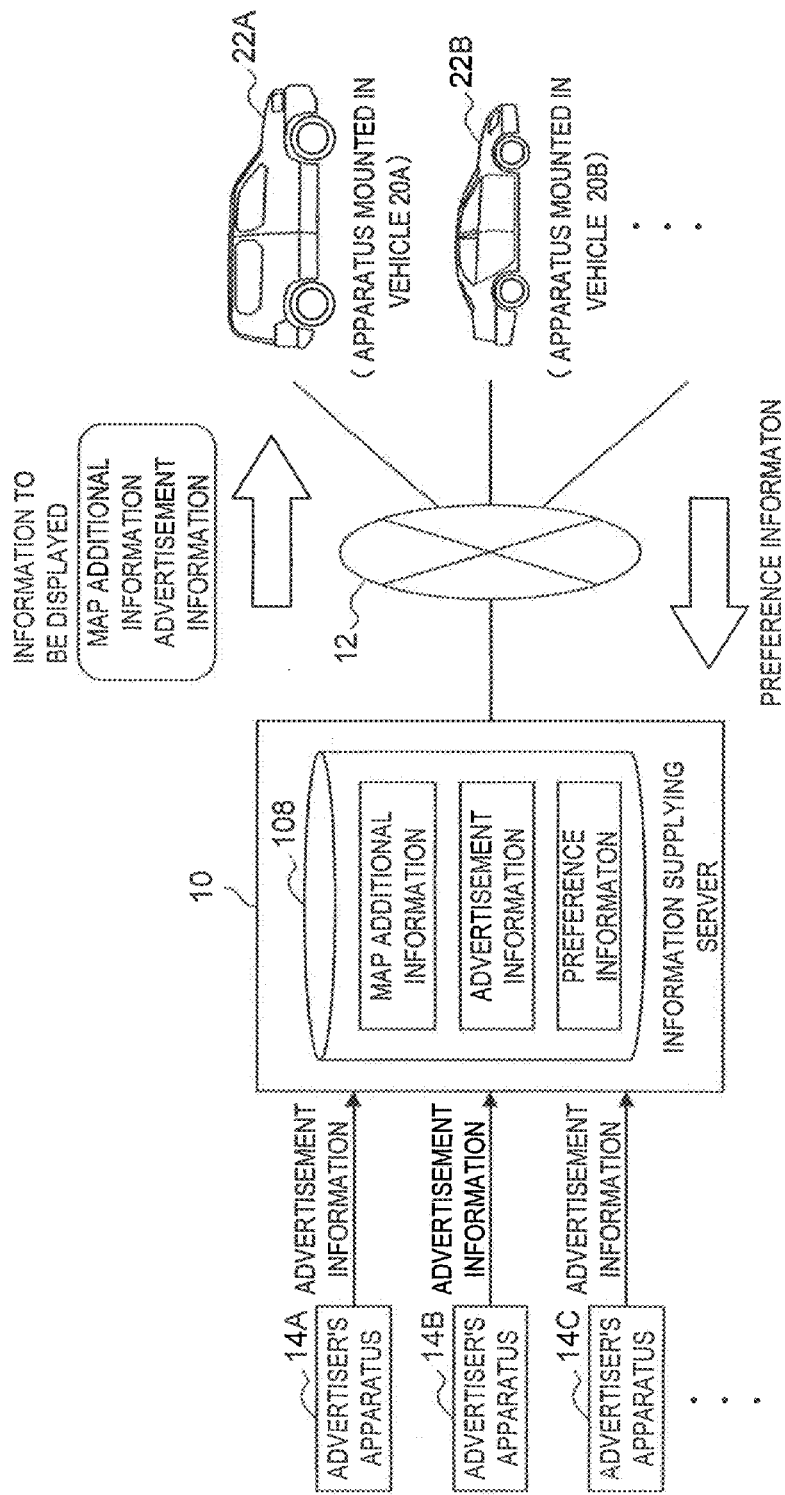
FIG. 1 is a diagram illustrating the configuration of an information supplying system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In addition, the entire structure of the present specification is as follows.

[1] Explanation of terms

[2] Summary of information supplying system according to one embodiment of present invention

[3] Description of first embodiment of present invention
  (supply of advertisement information relating to destination)
  [3-1] Issue with related art and effects of present embodiment
  [3-2] Detailed description of configuration and operation of first embodiment of present invention
  [3-3] Description of supplemental matters of first embodiment of present invention

[4] Description of second embodiment of present invention
  (supply of advertisement information during normal running)
  [4-1] Purpose of second embodiment of present invention
  [4-2] Detailed description of operation of second embodiment of present invention

[5] Description of third embodiment of present invention
  (supply of information to be displayed on basis of preference information or state of vehicle)
  [5-1] Issue with related art and effects of present embodiment
  [5-2] Detailed description of configuration and operation of third embodiment of present invention
  [5-3] Description of supplemental matters of third embodiment of present invention

[6] Description of flow of display screen which can be applied to embodiments of present invention

[7] Conclusions
  [7-1] Summary of effects of embodiments of present invention
  [7-2] Description of modifications of embodiments of present invention In the following, the embodiments of the present invention are described in accordance with the flow of the above described items.

[1] EXPLANATION OF TERMS

First, specific terms used in the description of the present embodiments are described.

(Map Information)

Information relating to maps showing rivers, geographical features and the like. Information on man-made institutions, such as buildings, stores parking lots, railroad networks is not included, and in some cases, information on place names and roads is included.

(Map Additional Information)

Information to be added in locations corresponding to map information, such as regional information, sightseeing spots, banks, post offices, gas stations, convenience stores, stations, bus stops and parking lots.

(Advertisement Information)

Information to advertise a certain thing, such as a shop, product or an institution. In the present specification, used particularly to point out information supplied to the user of the vehicle, and advertisement information can be referred to as individual advertisement.

(Advertisement Information Group)

One or more pieces of advertisement information and information which includes maker information corresponding to one or more pieces of advertisement information. In addition, information corresponding to map additional information. In some cases, indicated simply as advertisement information.

(Information to be Displayed)

Concepts including at least either map additional information or advertisement information. The output format of the map additional information and advertisement information in the apparatus mounted in a vehicle is usually "display," and therefore, referred to as information to be displayed, but an output format using "speech sound," for example, is also possible, and therefore, it is appropriate for it to be referred to as information to be outputted.

(Institution Information)

Information indicating an institution, such as a sightseeing spot, a bank, a post office, a gas station, a convenience store, a station, a bus stop or a parking lot. Institution information may coincide with map additional information. In addition, institution information may be location information, and in this case, the institution shown by the institution information may be an institution existing in the location shown by the location information.

(Preference Information)

Information showing the preferences of the user of the vehicle. In the present specification, in many cases, particularly information containing places and institutions which the user of the vehicle has visited is indicated.

(State of Vehicle)

Concepts including the state of operation, for example the speed of a certain vehicle running at that time, or turning on and off of the windshield wipers, the state of the environment, for example the remaining amount of gas, or the outside temperature.

Specific terms used in the description of the present embodiments are described above. Here, further details on the above described terms are shown in the following specification if necessary. In addition, mere examples of the meaning of the respective terms are shown in the above explanation of terms, and in the present specification, the terms are in some cases used with a different meaning than shown in the above explanation of terms.

[2] SUMMARY OF INFORMATION SUPPLYING SYSTEM ACCORDING TO ONE EMBODIMENT OF THE PRESENT INVENTION

Next, the summary of an information supplying system 1 according to one embodiment of the present invention is described in reference to FIGS. 1 to 15. Specifically, the configuration of the information supplying system 1, the summary of the service supplied through the information supplying system 1, the configuration of the respective apparatuses which form the information supplying system 1, an example of a screen displayed in an apparatus 20 mounted in a vehicle, an example of information transmitted and received in the information supplying system 1 and the like are described.

[2-1] Configuration of Information Supplying System 1

FIG. 1 is a diagram illustrating the configuration of the information supplying system 1. The information supplying system 1 is provided with an information supplying server 10, a communication network 12, an advertiser's apparatus 14 and an apparatus 20 mounted in a vehicle 22.

The information supplying server 10 stores map additional information, advertisement information and preference information for the vehicle 22 or the user of the vehicle 22 in a storing portion 108. In addition, the information supplying server 10 transmits information to be displayed, including map additional information and advertisement information, to the apparatus 20 mounted in a vehicle via a communication network 12. In addition, the information supplying server 10 acquires preference information for the vehicle 22 or the user of the vehicle 22 from the apparatus 20 mounted in a vehicle and stores the preference information for the vehicle 22 or the user of the vehicle 22.

Here, the communication network 12 may include transmission paths for data, such as cables, including copper wires and optical fibers, and wireless radio waves, and relays for data, for example a router and base for controlling communication. In particular, in the present embodiment, the communication network 12 may include a roadside device 30 in which a DSRC (Dedicated Short Range Communication) function is provided.

The advertiser's apparatus 14 is an apparatus used by an advertiser who supplies advertisement information and makes advertisement information correspond to map additional information or requests such correspondence. Here, the advertiser may be a sponsor of certain advertisement information, or an agent of the sponsor. FIG. 1 shows an advertiser's apparatus 14A, an advertiser's apparatus 14B and an advertiser's apparatus 14C as advertiser's apparatuses 14, and it is assumed that in practice, a greater number of advertiser's apparatuses 14 are included in the information supplying system 1.

The vehicle 22 is a vehicle which is moveable with people or cargo on board. Though FIG. 1 shows four-wheeled vehicles as examples of the vehicle, the vehicle 22 may be an automobile with two wheels or three wheels for a vehicle such as a bicycle, a bus, an electric car, a bullet train, an electric car for the road, an airplane, a ship or a boat. In addition, the vehicle 22 has the apparatus 20 mounted in the vehicle, so that the user of the vehicle 22 can get various types of information from the apparatus 20 mounted in the vehicle. Here, though FIG. 1 shows a vehicle 22A and a vehicle 22B as vehicles 22, and an apparatus 20A mounted in a vehicle and an apparatus 20B mounted in a vehicle as apparatuses 20 mounted in a vehicle, it is assumed that in practice, a greater number of vehicles 22 and apparatuses 20 mounted in a vehicle are included in the information supplying system 1.

[2-2] Concept of Service Supplied by Information Supplying System 1

Figure 2:
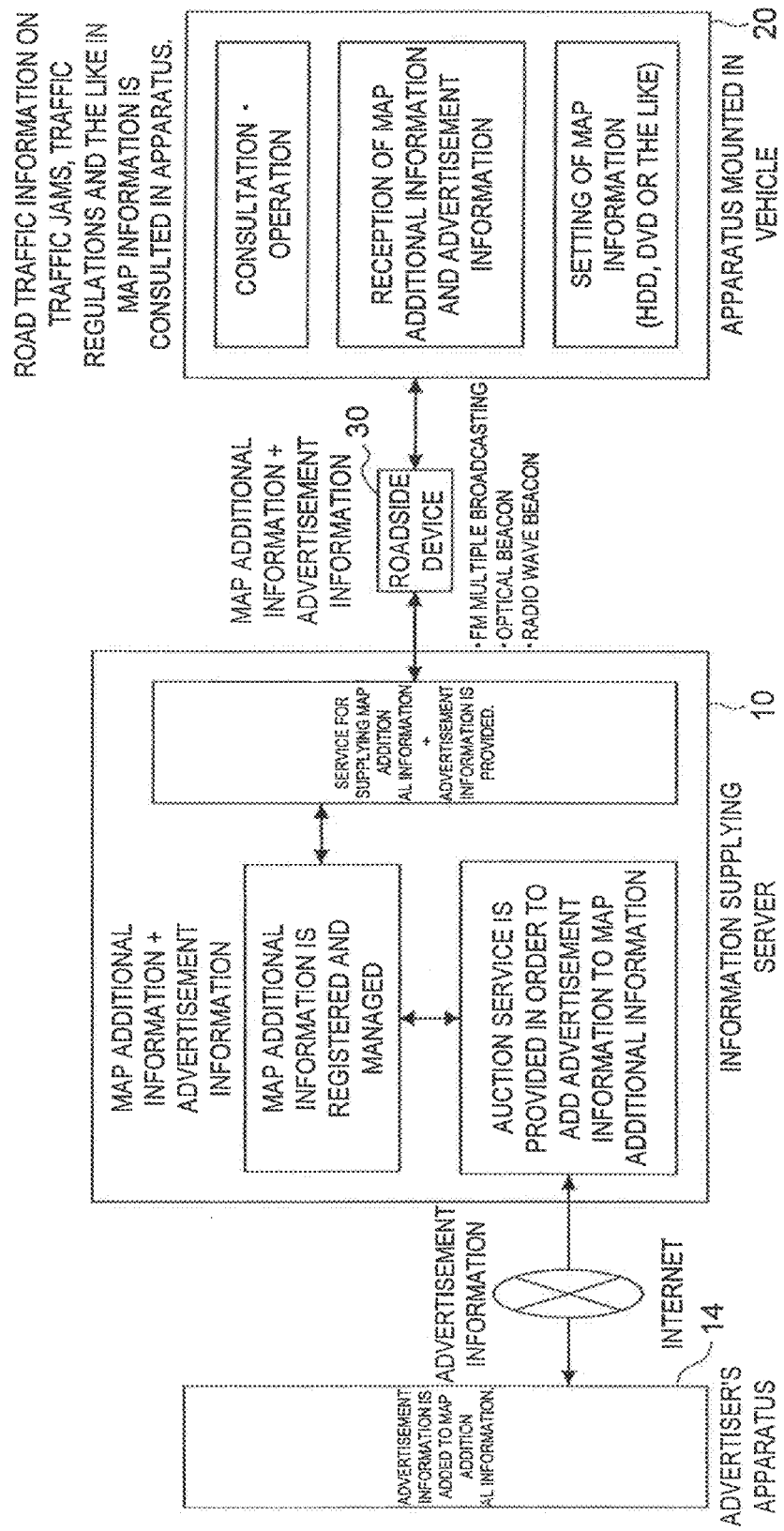
FIG. 2 is a diagram illustrating the concept of service supply through an information supplying system.

FIG. 2 is a diagram illustrating the concept of supply of service by the information supplying system 1. First, the information supplying server 10 registers and manages map additional information. Then, the information supplying server 10 provides an auction opportunity to advertisers in order to determine advertisement information which corresponds to the registered map additional information.

When an advertiser acquires the right to add advertisement information to map additional information via the advertiser's apparatus 14 through the auction, the advertisement information is made to correspond to the map additional information. The process for making the map additional information and the advertisement information correspond to each other may be carried out by the advertiser's apparatus 14 or the information supplying server 10.

When the advertisement information is made to correspond to the map additional information in this manner, the information supplying server 10 serves to supply information to be displayed, including the map additional information and the advertisement information which corresponds to the map additional information. Specifically, the information supplying server 10 registers, updates and indicates the information to be displayed which is to be transmitted to the respective roadside devices 30, and the roadside devices 30 transmit information to be displayed which is indicated by the information supplying server 10. The roadside devices 30 can carry out the above described transmission using such communication media as FM (Frequency Modulation) multiple broadcasting, optical beacon or radio wave beacon.

Then, the apparatus 20 mounted in a vehicle receives information for display transmitted from the information supplying server 10 via the roadside device 30, and thus, it becomes possible to consult a map screen where map additional information overlaps, as well as advertisement information. Here, the apparatus 20 mounted in a vehicle stores map information used to generate the map screen, and various types of settings can be made for the map information in the apparatus 20 mounted in a vehicle. In addition, the apparatus 20 mounted in a vehicle receives information, such as traffic jam information and traffic regulations information, from the roadside device 30, and can display the state of traffic at that time on the map screen on the basis of the received information.

Here, though in the above description, an example where the information supplying server 10 provides the right to add advertisement information to an advisor in an auction is described, the present invention is not limited to this example. For example, the information supplying server 10 may sell the right to add advertisement information to an advertiser.

[2-3] Display Screen Displayed by Apparatus 20 Mounted in a Vehicle

Figure 3:
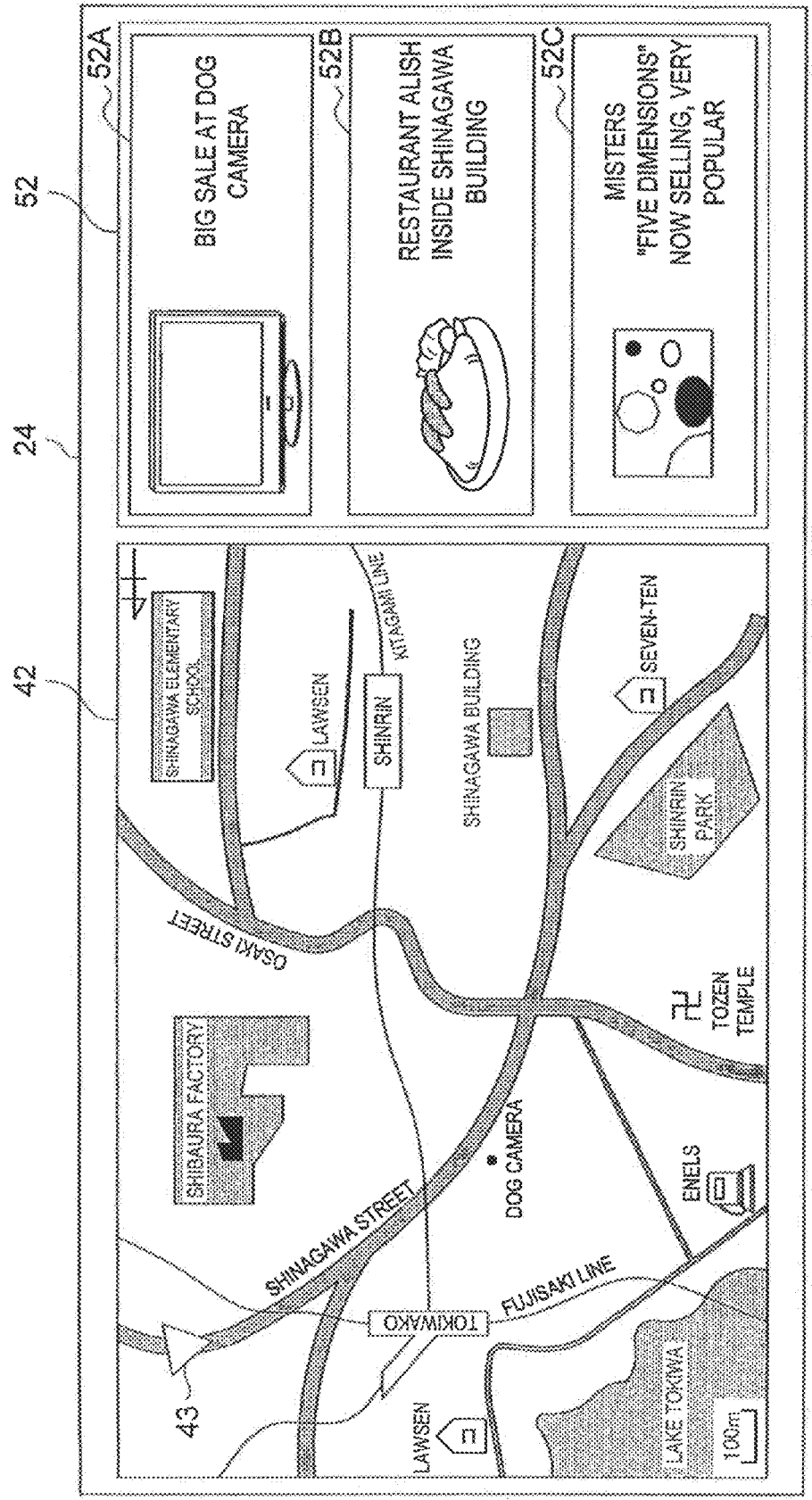
FIG. 3 is a diagram illustrating an example of a screen displayed on the display portion of an apparatus mounted in a vehicle.

FIG. 3 is a diagram illustrating an example of a display screen displayed in the display portion 24 of the apparatus 20 mounted in a vehicle. The apparatus 20 mounted in a vehicle generates a display screen on the basis of the information to be displayed which is received from the information supplying server 10 and can display this on the display portion 24. The display screen displayed on the display portion 24 of the apparatus 20 mounted in a vehicle includes the map screen 42 and the advertisement screen (advertisement information) 52, for example, as shown in FIG. 3. The map screen 42 is a screen where the map additional information, which is received from the information supplying server 10, such as "Lawsen," "Dog Camera," "Shinrin Park" and railroad tracks, overlaps with the map screen on the basis of the map information. The user of the vehicle 22 can drive while confirming the location 43 of the vehicle and the destination by viewing the map screen 42.

The advertisement screen 52 is a screen showing advertisement information included in the information to be displayed which is received from the information supplying sever 10. That is to say, the information supplying server 10 can supply advertisement information to the user of the vehicle 22 via the advertisement screen 52. In addition, in the example shown in FIG. 3, the advertisement screen 52 includes an advertisement screen 52A having a photograph of a large-scale liquid crystal television and text saying "Dog Camera grand sale," an advertisement screen 52B having a photograph of rice wrapped in an omelet and text "Restaurant Alish inside Shinagawa building," and an advertisement screen 52C having a photograph of the jacket of an album and text saying "Misters 'Five Dimensions' now selling, very popular."

This advertisement screen 52 can stimulate desire to purchase the product which is the object of advertisement in the user of the vehicle 22, impress the user of the vehicle 22 with the object of advertisement, and improve the image. Here, the consumer appeal of the object of advertisement is different for each user, even when the same advertisement information is supplied to the user of the vehicle 22 in accordance with the same method. Therefore, though details are described in "[3] Description of first embodiment of present invention" and "[5] Description of third embodiment of present invention," advertisement information which is determined to be appropriate for the user in a certain location is supplied to the user of the vehicle 22, and thus, customer appeal can be improved by supplying the advertisement information.

Here, though a case where the advertisement information is supplied to the user of the vehicle 22 via the advertisement screen 52 is described above, the present invention is not limited to this example. For example, the apparatus 20 mounted in a vehicle may supply advertisement information to the user of the vehicle 22 by outputting speech sound saying "Dog Camera grand sale" or outputting a song recorded on the album "Five Dimensions" by Misters. It is difficult for the user of the vehicle 22 to see the display portion 24 while driving, but even the user can listen and grasp the content of the advertisement information while driving when the advertisement information is outputted through speech sound, and therefore, it becomes effective to supply advertisement information through speech sound. In addition, the advertisement screen for the advertiser who made the highest bid in the auction may be displayed with priority or at the top.

[2-4] Configuration of Information Supplying Server 10

Figure 4:
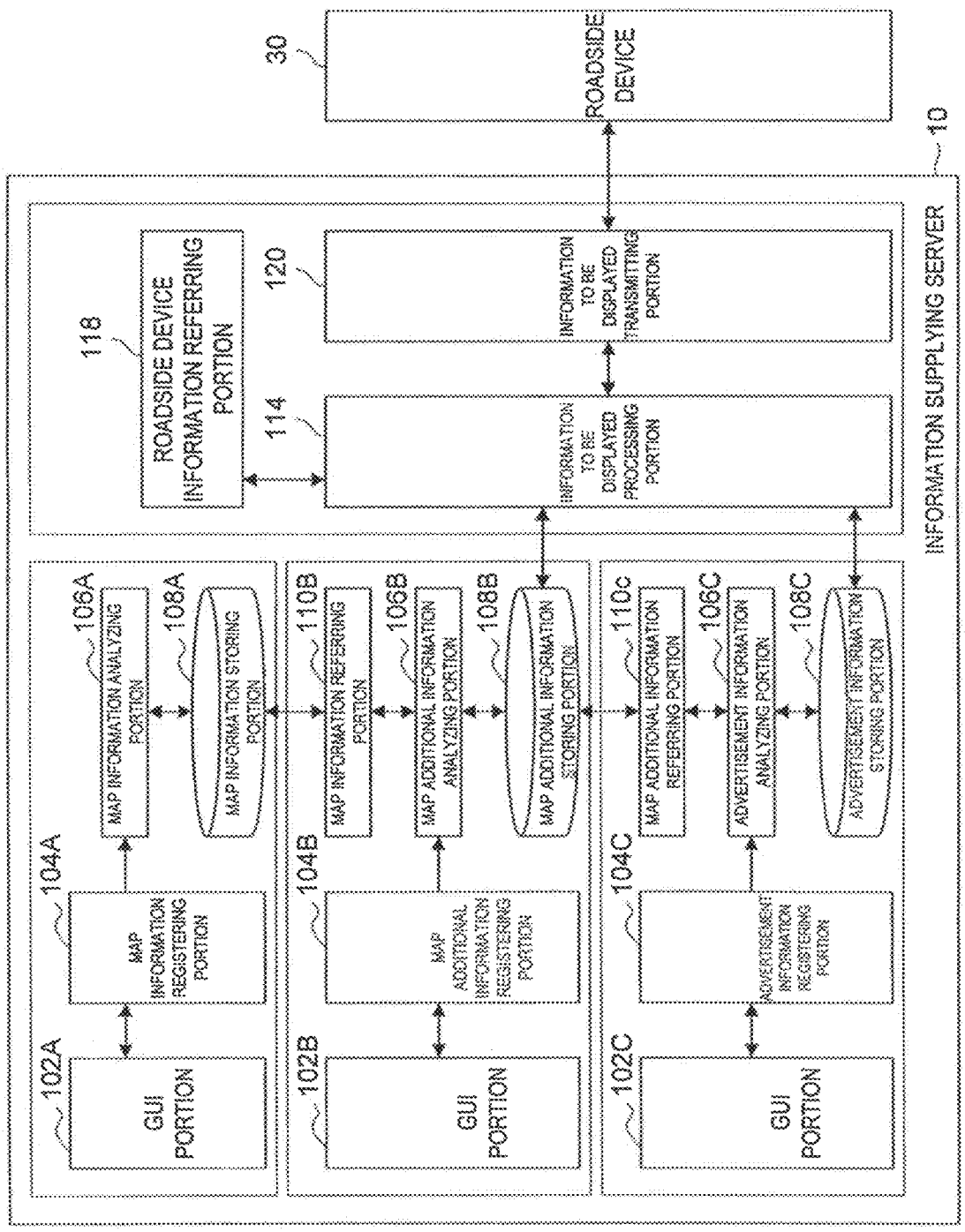
FIG. 4 is a function block diagram showing the configuration of an information supplying server.

FIG. 4 is a functional block diagram showing the configuration of the information supplying server 10. The information supplying server 10 is provided with a GUI portion 102 (102A to 102C), a registering portion 104 (104A to 104C), an analyzing portion 106 (106A to 106C), a storing portion 108 (108A to 108C), a reference portion 110 (110B and 110C), an information to be displayed processing portion 114, a roadside device information referring portion 118 and an information to be displayed transmitting portion 120.

The GUI (Graphical User Interface) portion 102A is an interface for inputting and outputting map information between the manager of the information supplying server 10 and the information supplying server 10. That is to say, the manager of the information supplying server 10 can carry out an input operation for new map information and an update operation for the map information via the GUI portion 102A.

The map information registering portion 104A detects the operation on the GUI portion 102A and outputs the information on the basis of the detected operation to the map information analyzing portion 106A. For example, the map information registering portion 104A detects an input operation for new map information on the GUI portion 102A and outputs this new map information to the map information analyzing portion 106A.

The map information analyzing portion 106A analyzes the map information inputted through the map information registering portion 104A and records this in the map information storing portion 108A. The map information storing portion 108A stores the map information recorded by the map information analyzing portion 106A.

The GUI portion 102B is an interface for inputting and outputting map additional information between the manager of the information supplying server 10 and the information supplying server 10. That is to say, the manager of the information supplying server 10 can carry out an input operation for new map additional information and an updating operation for map additional information via the GUI portion 102B.

The map additional information registering portion 104B detects the operation in the GUI portion 102B and outputs the information on the basis of the detected operation to the map additional information analyzing portion 106B. For example, the map additional information registering portion 104B detects the input operation for new map additional information in the GUI portion 102B and outputs this new map additional information to the map additional information analyzing portion 106B.

The map additional information analyzing portion 106B analyzes the map information which is referred to by the map additional information referring portion 110B and the map additional information which is inputted through the map additional information registering portion 104B, and records the map additional information in the map additional information storing portion 108B. For example, the map additional information analyzing portion 106B records the ID of information added to the maps, the title, the location for map information in which the map additional information is added, and the map additional information, including the time and data of recording, in the map additional information storing portion 108B.

The GUI portion 102C is an interface for inputting and outputting advertisement information between the manager of the information supplying server 10 and the information supplying serer 10. That is to say, the manager of the information supplying server 10 can carry out an input operation for new advertisement information and an updating operation for advertisement information via the GUI portion 102C.

The advertisement information registering portion 104C detects the operation in the GUI portion 102C and outputs the information on the basis of the detected operation to the advertisement information analyzing portion 106C. For example, the advertisement information registering portion 104C detects the input operation for new advertisement information in the GUI portion 102C and outputs this new advertisement information to the advertisement information analyzing portion 106C.

The advertisement information analyzing portion 106C analyzes the map additional information which is referred to by the map additional information referring portion 110C and advertisement information inputted through the advertisement information registering portion 104C, and associate the advertisement information with the map additional information and records this in the advertisement information storing portion 108C. For example, the advertisement information analyzing portion 106C associate the inputted advertisement information with the ID of the designated map additional information and records this in the advertisement information storing portion 108C.

The information to be displayed processing portion 114 carries out a process for setting the information to be displayed transmitted by each roadside device 30 on the basis of the location and the range of use of the respective roadside devices 30 which are referred to by the roadside device information referring portion 118. For example, the information to be displayed processing portion 114 carries out a setting process through which the map additional information which is included in the range of use of a certain roadside device 30 and the advertisement information corresponding to the map additional information is transmitted to the roadside device 30. The information to be displayed transmitting portion 120 functions as a transmission portion and transmits the information to be displayed set by the information to be displayed processing portion 114 to each roadside device 30, and furthermore, transmits this from the roadside device 30 to the apparatus 20 mounted in a vehicle.

Here, though FIG. 4 shows the configuration of the information supplying server 10 as being divided into blocks for each function, these blocks may be divided into smaller blocks, or a number of blocks may be unified. For example, the map information storing portion 108A, the map additional information 108B and the advertisement information storing portion 108C may form a storing portion 108.

In addition, the storing portion 108 may be a nonvolatile memory, such as an EEPROM (Electrically Erasable Programmable Read Only Memory) or an EPROM (Erasable Programmable Read Only Memory), a magnetic disc, such as a hard disc or a disc type magnetic disc, an optical disc, such as a CD-R/RW (Compact Disc Recordable/Rewritable), a DVD-R (Digital Versatile Disc Recordable)/RW/+R/+RW/RAM (Random Access Memory) or BD (Blu-Ray Disc (registered trademark))-R/BD-RE, or an MO (Magneto Optical) disc.

[2-5] Specific Examples of Information to be Displayed, Map Additional Information and Advertisement Information Next, examples of the configuration of information to be displayed, examples of the structure of data on map additional information, and examples of the structure of data on advertisement information are described in reference to FIGS. 5 to 7.

FIG. 5 is a diagram illustrating an example of the configuration of information to be displayed which is transmitted to the apparatus 20 mounted in a vehicle via a roadside device 30. The information to be displayed includes map additional information and an advertisement information group. In addition, the map additional information includes a title, attributes and information on the advertisement display location.

The title of the map additional information shown in the FIG. 5 is "Shinagawa building," and indicates that this is the map additional information concerning the Shinagawa building. In addition, the attributes include the location of the Shinagawa building and information on the date for updating this map additional information, and FIG. 5 shows that the Shinagawa building is located in "north latitude 34° 45'45.65145, east longitude 135° 30'02.18532, height of the ellipsis: 43.096," and the date for updating this map additional information is "10:05:00 3/10/2007."

The information on the advertisement display location includes such information as latitude, longitude, direction, starting distance, type of road and the like, and is location information which indicates the advertisement display location (location where advertisement is outputted), so that advertisement information is displayed on the apparatus 20 mounted in a vehicle. For example, the advertisement display location is on a road of the type indicated by the type of road, and indicates the location in a range of distance shown by the starting distance with the location indicated by the latitude and the longitude ant the center. Furthermore, advertisement information may be displayed on the apparatus 20 mounted in a vehicle in the case where the vehicle 22 is traveling in the direction indicated by the direction.

In addition, in the example shown in FIG. 5, the information to be displayed includes information on a maker showing the sponsor (maker), for example Dog Camera, Restaurant Alish, Master Record or Books Kiido, and an advertisement information group including a number of pieces of advertisement information. In FIG. 5, advertisement information for Dog Camera is denoted by 1-1 to 1-6, advertisement information for Restaurant Alish is denoted by 2-1 and 2-2, advertisement information for Master Record is denoted by 3-1 to 3-3, and advertisement information for Books Kiido is denoted by 4-1 to 4-5.

Here, though FIG. 5 shows five pieces of information on the advertisement display location, the number of pieces of location information where advertisement is to be displayed included in the map additional information is not limited to five, and a greater number of pieces of location information where advertisement is to be displayed or only a single piece of location information where advertisement is to be displayed may be included.

FIG. 6 is a diagram illustrating an example of the structure of data on map additional information. FIG. 6 shows the structure of data on map additional information where the ID "location id" of map additional information is "location 100100" and the title "title" is "Shinagawa building," the date for update "create date" is "20070130," "Shinagawa building" has "copyright," and the location "position date" to be added to the map information is "xxx. yyy. hhh."

FIG. 7 is a diagram illustrating an example of the structure of data on advertisement information. FIG. 7 shows the structure of data on advertisement information where the maker ID "maker id" is "mk10005," the advertisement information ID "advertisement id" is "ad101," the title "title" is "Dog Camera," the starting date "start date" is "1/3/2007," and the date of completion "end date" is "30/3/2007." Here, the starting date indicates the date when the advertisement information starts being supplied, and the date of completion indicates the date when the advertisement information stops being supplied.

In addition, the advertisement information shown in FIG. 7 corresponds to the map additional information shown in FIG. 6, where the ID is "location 100100" and the title is "Shinagawa building," as shown by the data where "map addition information reftitle=ShinagEwa building" and "id ref=location 100100." In addition, the data "comment=north 700 m" shows that Dog Camera, which is the object of advertisement in the advertisement information, is located 50 m north from the Shinagawa building, which is the corresponding map additional information. This comment "north 700 m" may be displayed together with the advertisement information for Dog Camera in the apparatus 20 mounted in a vehicle.

[2-6] Communication Between Vehicles on Roadside Device

Figure 8:
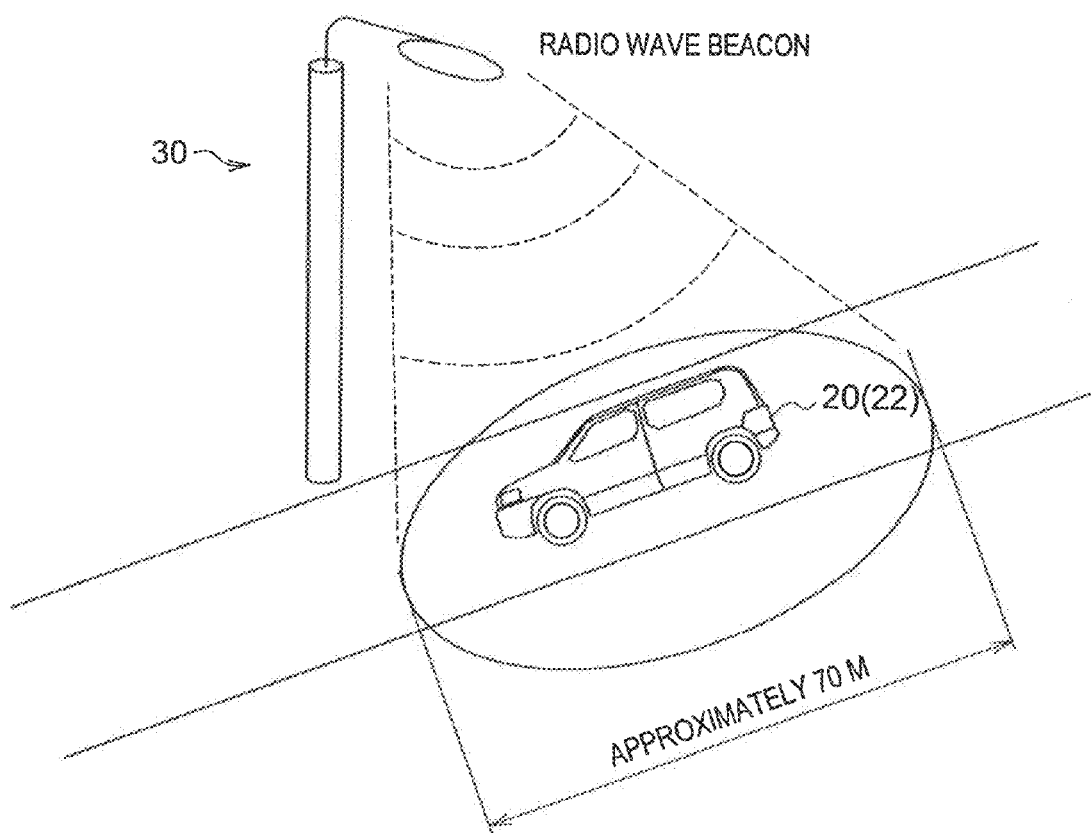
FIG. 8 is a diagram illustrating an example of the positional relationship between a roadside device which makes communication between vehicles on the road and a vehicle in which an apparatus is mounted possible.
Figure 9:
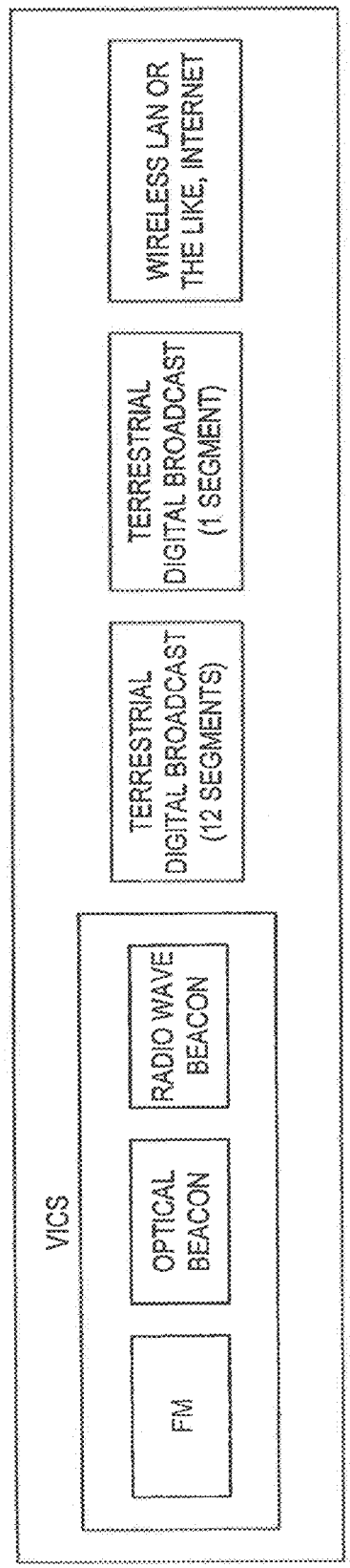
FIG. 9 is a diagram showing a communication medium which can be used when communication between vehicles on the road is made.
Figure 10:
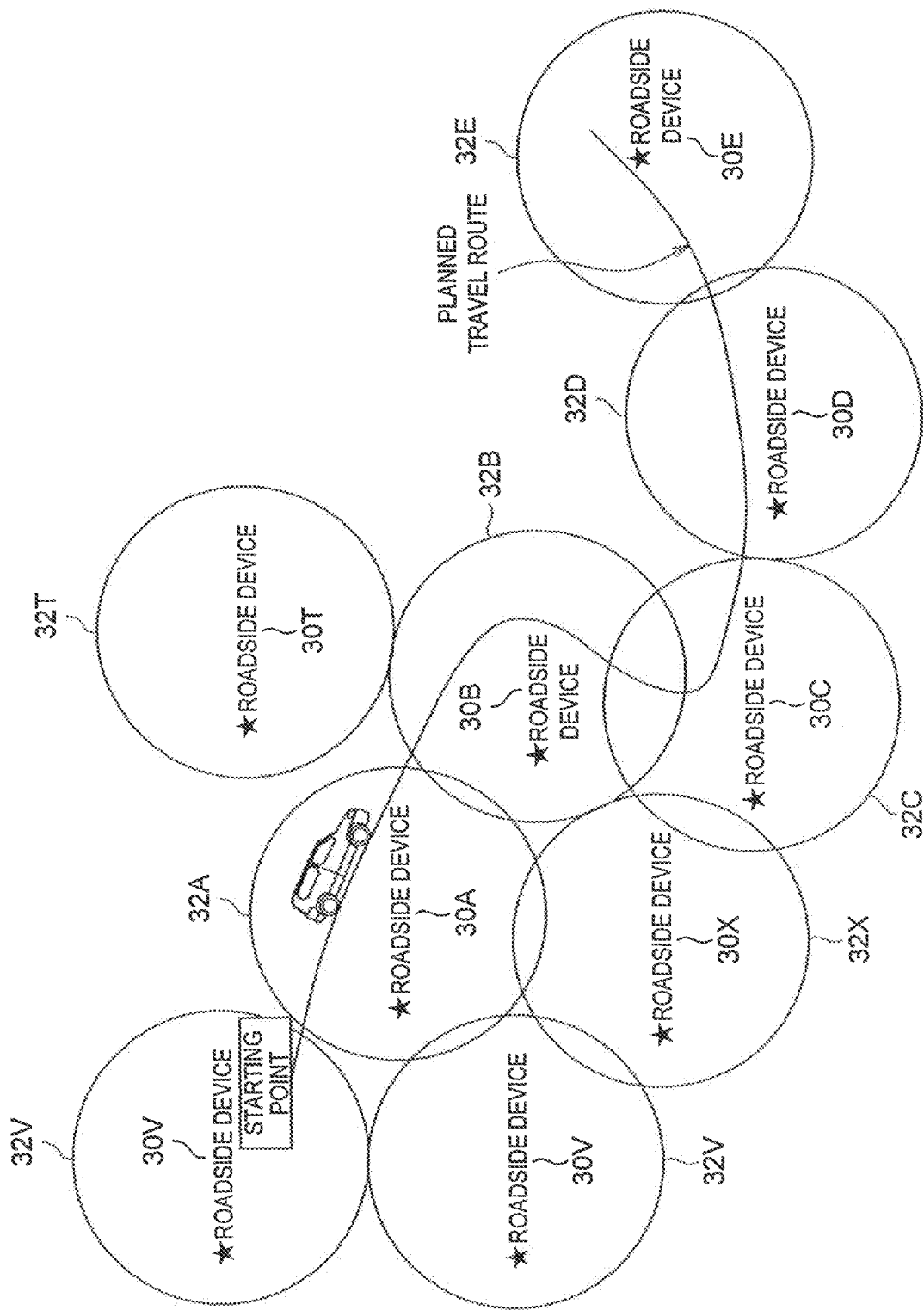
FIG. 10 is a diagram illustrating the ranges of use of respective roadside devices.
Figure 11:
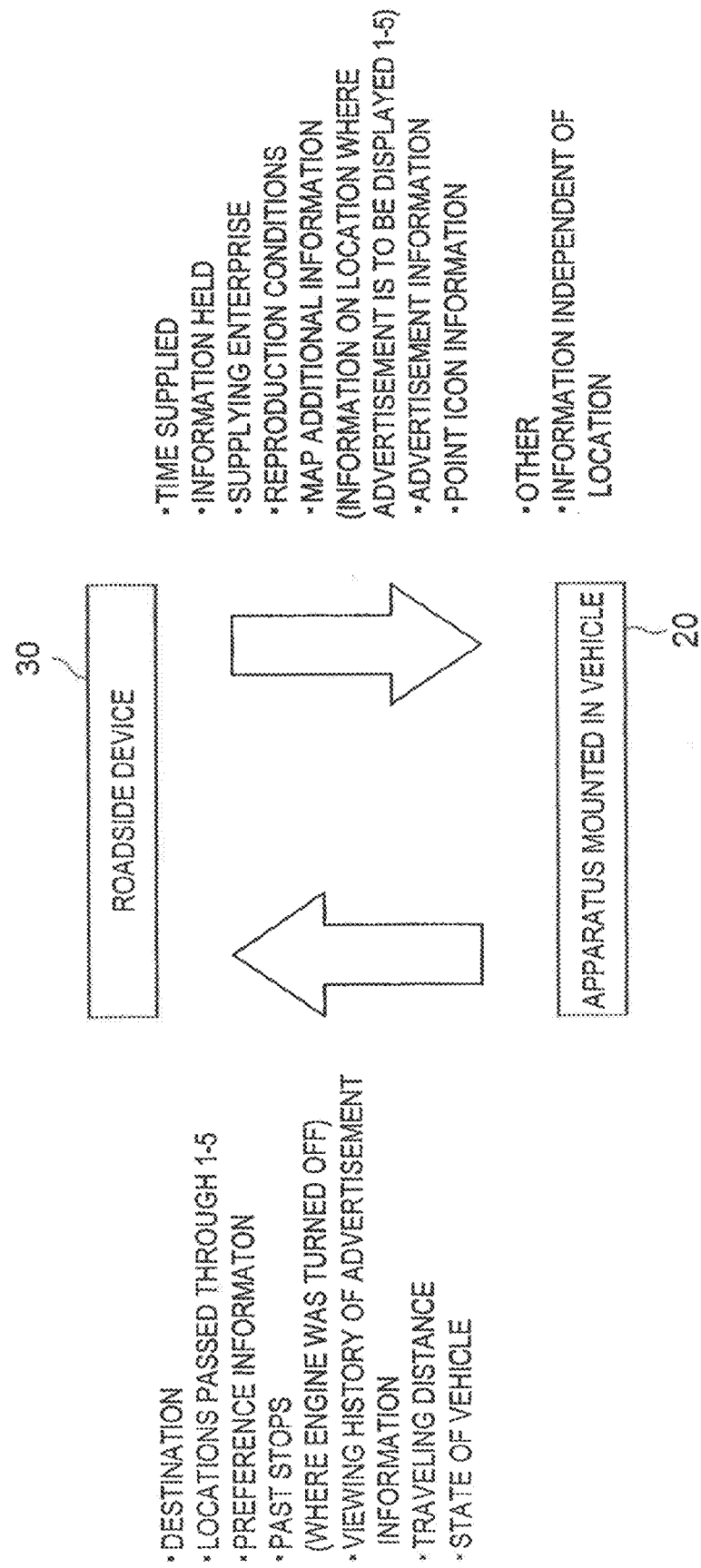
FIG. 11 is a diagram illustrating an example of information transmitted and received between a roadside device and an apparatus mounted in a car.

Next, communication between vehicles on the road, which is carried out between a roadside device 30 and the apparatus 20 mounted in a vehicle, is described in reference to FIGS. 8 to 11. FIG. 8 is a diagram illustrating an example of the positional relationship between a roadside device 30 which makes communication between vehicles on the road possible and a vehicle 22 in which the apparatus 20 mounted in a vehicle is mounted, FIG. 9 is a diagram illustrating a communication medium which can be used at the time of communication between vehicles on the road, FIG. 10 is a diagram illustrating the range of use of each roadside device 30, and FIG. 11 is a diagram illustrating an example of information received and transmitted between the roadside device 30 and the apparatus 20 mounted in a vehicle.

As shown in FIG. 8, the roadside device 30 provided on the road can communicate with the apparatus 20 mounted in the vehicle 22 which is running on the road using a radio wave beacon when the apparatus 20 mounted in the vehicle is within a range of approximately 70 m with the roadside device 30 at the center. The method according to which the roadside device 30 and the apparatus 20 mounted in a vehicle communicate, so that predetermined information is supplied to the apparatus 20 mounted in a vehicle in this manner is in some cases referred to as VICS (Vehicle Information And Communication System).

The purpose of VICS is to improve convenience by adapting to the needs of the user of the vehicle 22 and make it possible reduce cost by shortening the time for transportation, increase safety by appropriately grasping the situation, and conserve the environment by making traffic smooth, and as a result, to contribute to improving the quality of life of people and the development of the social economy. It can be said that right now, elimination of traffic jams on highways and general roads, reduction in the number of traffic accidents and improvement of the road environment are issues shared by all countries in the world.

In this situation, in terms of road traffic, VICS, according to which selection of an appropriate route for the user of the vehicle 22 is facilitated, and comfortable and smooth driving is made possible, is developed as a system for appropriately distributing the flow of traffic, thus improving safety and smoothness in road traffic, and improving the road environment. The VICS has a function of allowing the apparatus 20 mounted in a vehicle to be notified of indication information by the roadside device 30 so that the apparatus 20 mounted in a vehicle can respond, a function of allowing the roadside device 30 to identify the apparatus 20 mounted in a vehicle so that the apparatus 20 mounted in a vehicle can respond, a function of supplying various types of information in a package from the roadside device 30 to the apparatus 20 mounted in a vehicle, and a function of transmitting and receiving information on settlement to and from an IC card.

In addition, as the communication medium used in this VICS, as shown in FIG. 9, the above described radio wave beacon, optical beacon and FM multiple broadcasting can be cited. The radio wave beacon is made up of quasi-microwaves, and can be received within a range of approximately 35 m before and after the roadside device 30, as shown in FIG. 8. The optical beacon is made up of infrared rays, and can be received within a range of approximately 3.5 m directly beneath the roadside device 30. In addition, the optical beacon can allow two-directional communication between the apparatus 20 mounted in a vehicle and the roadside device 30. FM multiple broadcasting uses FM broadcasting waves and can be received within a broader range in comparison with the radio wave beacon and the optical beacon.

In addition to the above, the roadside device 30 may be provided with such functions as terrestrial digital broadcasting (12 segments), terrestrial digital broadcasting (1 segment) and wireless LAN (Local Area Network) if necessary.

In addition, the roadside device 30 transmits area information on predetermined matters within the range of use. For example, in the case where roadside devices 30A to 30E, 30T, 30U, 30V and 30X are arranged as shown in FIG. 10, the roadside device 30A transmits area information indicating institutions and the state of traffic jams included in the area 32A, which is within the range of use of the roadside device 30A.

In the same manner, the roadside device 30B transmits area information on the area 32B, the roadside device 30C transmits area information on the area 32C, the roadside device 30D transmits area information on the area 32D, the roadside device 30E transmits area information on the area 32E, the roadside device 30T transmits area information on the area 32T, the roadside device 30U transmits area information on the area 32U, the roadside device 30V transmits area information on the area 32V, and the roadside device 30X transmits area information on the area 32X.

In the example shown in FIG. 10, the vehicle 22 is running close to the roadside device 30A, and therefore, the apparatus 20 mounted in the vehicle 22 can receive area information which includes map additional information showing a facility included in the area 32A and an advertisement information group which corresponds to the map additional information from the roadside device 30A.

Subsequently, in the case where the vehicle 22 runs following the planned route for running, the apparatus 20 mounted in the vehicle 22 can receive area information on the area 32B from the roadside device 30B, area information on the area 32C from the roadside device 30C, area information on the area 32D from the roadside device 30D, and area information on the area 32E from the roadside device 30E. Here, it is possible for the apparatus 20 mounted in a vehicle to receive area information from each roadside device 30 and transmit the state of running of the vehicle 22 and the destination to the roadside device 30.

Here, as the information transmitted (uplinked) from the apparatus 20 mounted in a vehicle to the roadside device 30, as shown in FIG. 11, the destination of the vehicle 22, the places through which the vehicle 22 passes, preference information for the vehicle 22 and the user of the vehicle 22, places where the vehicle 22 has dropped in the past, the viewing history of advertisement information, the distance over which the vehicle has traveled and the state of the vehicle can be cited.

In addition, as the information transmitted (downlinked) from the roadside device 30 to the apparatus 20 mounted in a vehicle, as shown in FIG. 11, area information, such as the time when information is supplied, held information, the supplying enterprise, the conditions for reproduction, map additional information (including location information where an advertisement is to be displayed), advertisement information and point icon information, and other information which does not depend on the area of each roadside device 30 can be cited.

[2-7] Configuration of Roadside Device 30

Figure 12:
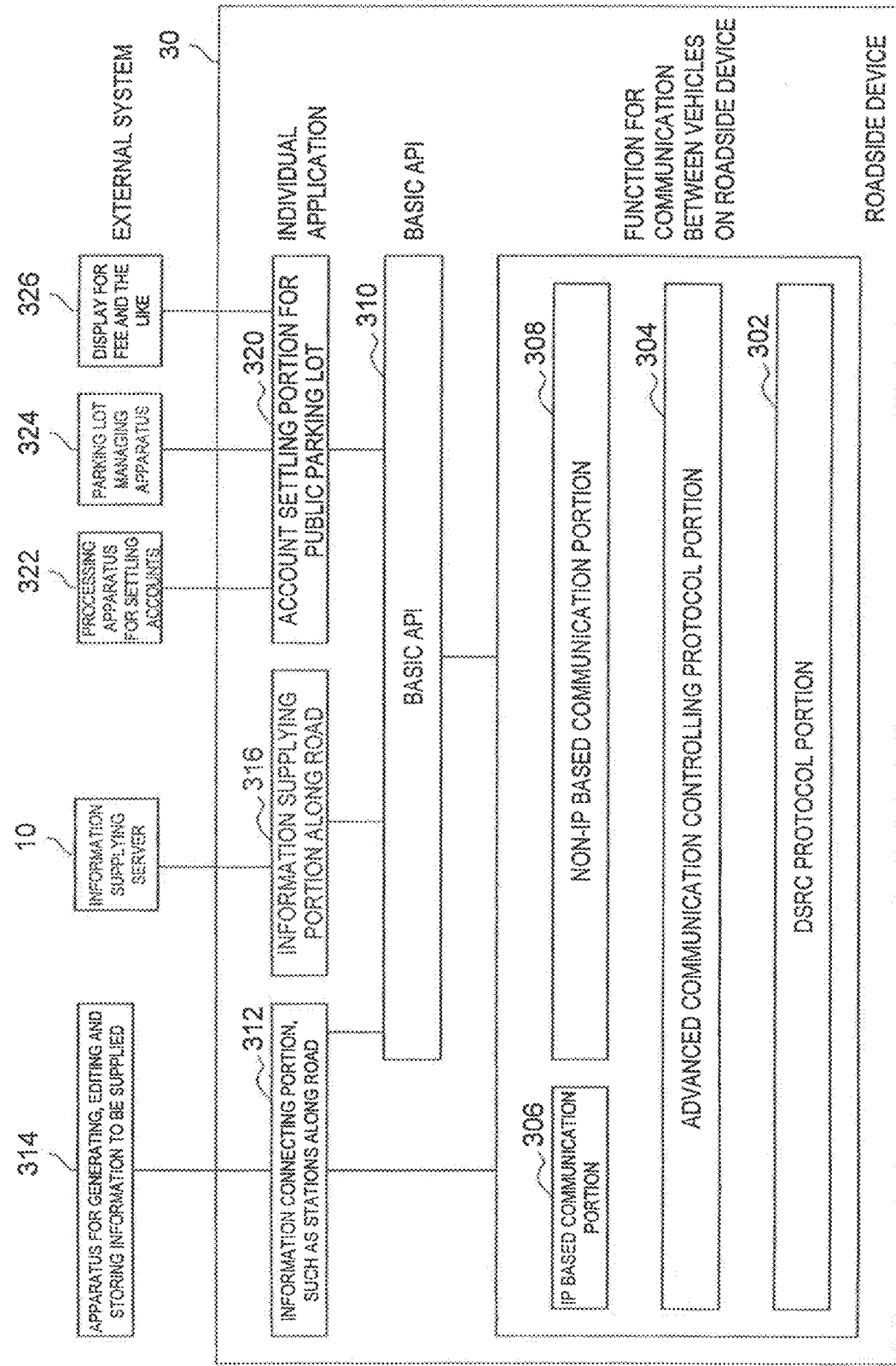
FIG. 12 is a function block diagram illustrating an example of the configuration of a roadside device.

FIG. 12 is a function block diagram showing an example of the configuration of the roadside device 30. The roadside device 30 is provided with a DSRC protocol portion 302, an extended communication controlling protocol portion 304, an IP based communication portion 306, a non-IP based communication portion 308, a basic API 310, an information connection portion 312, for example a station on the road, an information supplying portion 316 on the road, and a public parking lot settling portion 320.

The DSRC protocol portion 302 carries out dedicated narrow band communication between the roadside device 30 and the apparatus 20 mounted in a vehicle. The extended communication controlling protocol portion 304 (ELCP: Extended Link Control Protocol) is an interface for delivering information received through the DSRC communication to an application with precision.

The IP based communication portion 306 carries out a process which corresponds to intranet connection between the apparatus 20 mounted in a vehicle and a supplied information generating, editing and storing apparatus 314. In addition, in the case where the supplied information generating, editing and storing apparatus 314 has a firewall/internet connection function, a process for dealing with internet connection is carried out. The non-IP based communication portion 308 transmits a URL (Uniform Resource Locator) at the time of initial intranet connection of the apparatus 20 mounted in a vehicle.

The basic API 310 (Application Programming Interface) implements a function which relates to an object shared by all of the applications. For example, the basic API 310 carries out preparation of a common object, registration with a common object, reference with a common object, deletion of a common object and the like. In addition, the basic API 310 may permit/prohibit the next communication, request transmission, acquire received data, request ack transmission and the like, in terms of communication.

The information connection portion 320, for example a station on the road, provides such information as traffic information around the stations on the road, institution information and information on the region to the apparatus 20 mounted in a vehicle. Here, as the stations on the road, parking spaces and rest areas, such as SA's (Service Areas) and PA's (Parking Areas) along ordinary national roads and highways, can be cited. As described above, such information as traffic information around the stations on the road, institution information and information on the region is generated, edited and stored by the supplied information generating, editing and storing apparatus 314, and the information connection portion 312, for example a station on the road, receives this information from the supplied information generating, editing and storing apparatus 314, and carries out a process for transmitting the received information to the apparatus 20 mounted in a vehicle.

The information supplying portion 316 on the road supplies information to be displayed, such as map additional information and advertisement information, to the apparatus 20 mounted in a vehicle. As described above, information to be displayed, for example map additional information and advertisement information, is generated, edited and stored by the information supplying server 10, as described above, and the information supplying portion 316 on the road receives this information to be displayed from the information supplying server 10 and carries out a process for transmitting the received information to be displayed to the apparatus 20 mounted in a vehicle.

The public parking lot settling portion 320 communicates with the apparatus 20 mounted in a vehicle which is provided in the vehicle 22 that uses public parking lots, and works together with a settlement processing apparatus 322, a parking lot managing apparatus 324 and a fee displaying apparatus 326 so as to settle the usage fee for the public parking lot. For example, the parking lot managing apparatus 324 manages the time when the vehicle 22 enters a public parking lot and the time when the vehicle 22 leaves the public parking lot, the fee displaying apparatus 326 displays the usage fee on the basis of the time during which the vehicle 22 was parked in the public parking lot, and the settlement processing apparatus 322 settles the usage fee. Here, the public parking lot settling portion 320 receives the vehicle ID transmitted from the apparatus 20 mounted in the vehicle 22, and the settlement processing portion 322 may carry out a process for withdrawing the usage fee from the bank account specified on the basis of this vehicle ID.

[2-8] Configuration of Apparatus 20 Mounted in Vehicle

Figure 13:
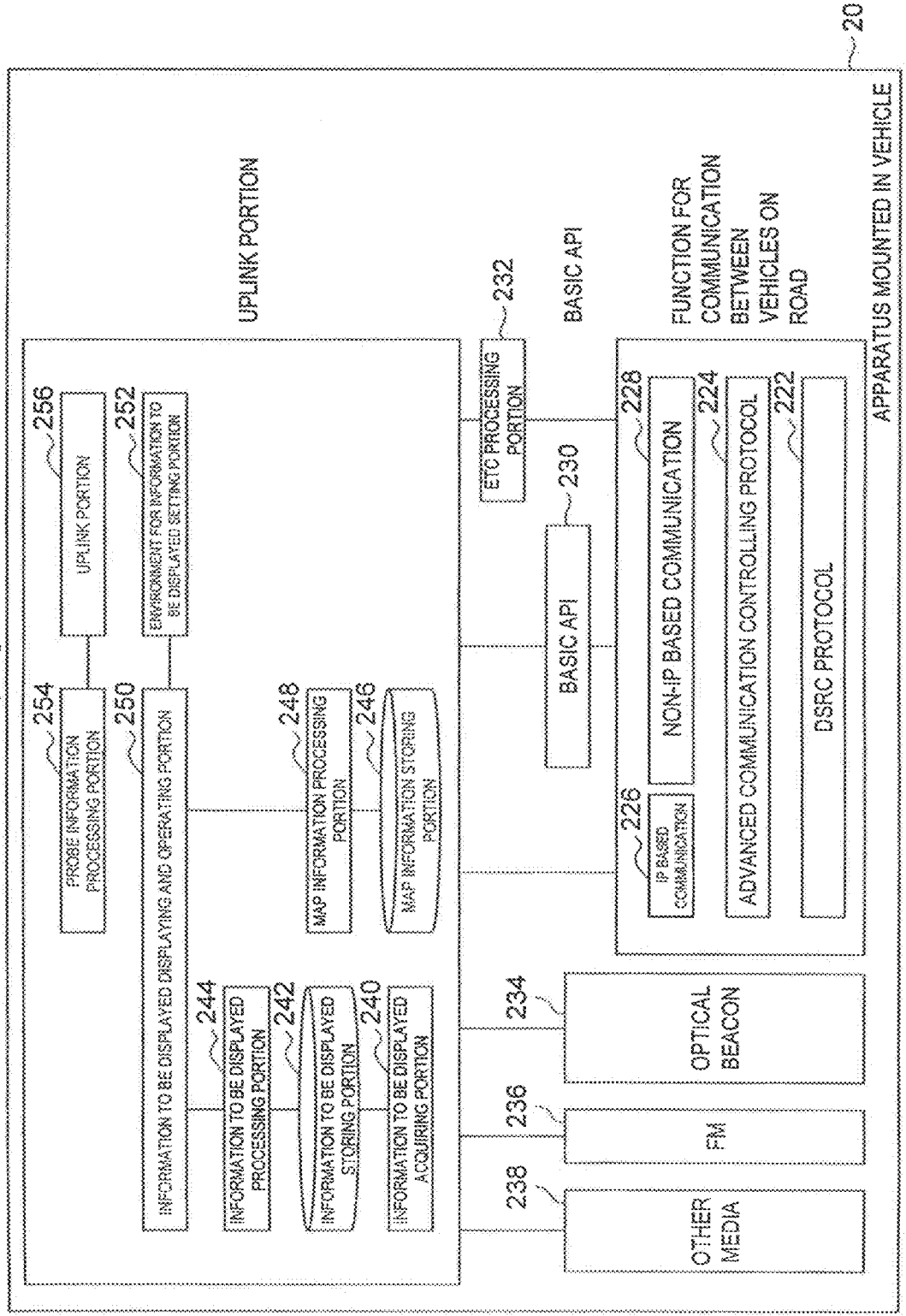
FIG. 13 is a function block diagram showing the configuration of an apparatus mounted in a vehicle.

FIG. 13 is a function block diagram showing the configuration of an apparatus 20 mounted in a vehicle. The apparatus 20 mounted in a vehicle is provided with a DSRC protocol portion 222, an extended communication controlling protocol portion 224, an IP based communication portion 226, a non-IP based communication portion 228, a basic API 230, an ETC processing portion 232, an information to be displayed acquiring portion 240, an information to be displayed storing portion 242, an information to be displayed processing portion 244, a map information storing portion 246, a map information processing portion 248, an information to be displayed displaying and operation portion 250, an information to be displayed environment setting portion 252, a probe information processing portion 254 and an uplink portion 256.

The DSRC protocol portion 222 carries out dedicated narrow band communication between the roadside device 30 and the apparatus 20 mounted in a vehicle. The extended communication controlling protocol portion 224 (ELCP: Extended Link Control Protocol) is an interface for delivering information received through the DSRC communication to an application with precision.

The IP based communication portion 226 carries out a process which corresponds to intranet connection or internet connection between the apparatus 20 mounted in a vehicle and the roadside device 30. The non-IP based communication portion 228 transmits a URL at the time of initial intranet connection of the apparatus 20 mounted in a vehicle.

The basic API 230 implements a function which relates to an object shared by all of the applications. For example, the basic API 230 carries out preparation of a common object, registration with a common object, reference with a common object, deletion of a common object and the like. In addition, the basic API 230 may permit/prohibit the next communication, request transmission, acquire received data, request ack transmission and the like, in terms of communication.

The ETC (Electronic Toll Collection) processing portion 232 carries out a process for automatic settlement of the toll for a toll road. The ETC processing portion 232 transmits information on the ID card which is inserted into the apparatus 20 mounted in a vehicle to the roadside device 30 through DSRC communication, and regards the owner of this ID card specified by the information on the ID card in the roadside device 30 as the payer of the toll. This ETC system is effective for eliminating the process for issuing a usage ticket, temporarily stopping the vehicle 22 in order to receive the usage ticket, and holding the usage ticket. Here, communication between vehicles on the road between the roadside device 30 and the apparatus 20 mounted in a vehicle can be carried out using other communication media, such as an optical beacon 234, FM multiple broadcasting 236 or a radio wave beacon, as described above.

The information to be displayed acquiring portion 240 acquires information to be displayed including map additional information and advertisement information corresponding to map additional information from the information supplying server 10 through DSRC communication. The information to be displayed storing portion 242 stores the information to be displayed acquired by the information to be displayed acquiring portion 240. The information to be displayed processing portion 244 generates a map screen or an advertisement screen on the basis of the information to be displayed stored by the information to be displayed storing portion 242.

The map information storing portion 246 stores map information and the map information processing portion 248 generates a map screen on the basis of the map information stored in the map information storing portion 246.

The information to be displayed displaying and operating portion 250 is an interface between the user of the vehicle 22 and the apparatus 20 mounted in a vehicle, displays a map screen or an advertisement screen, and detects the operation for setting the destination and the operation for switching the screen by the user of the vehicle 22. The information to be displayed environment setting portion 252 sets various types of environment concerning the information to be displayed.

The probe information processing portion 254 updates and manages probe information on the vehicle 22, and the uplink portion 256 carries out a process for transmitting the probe information to the roadside device 30. In the following, probe information is briefly described.

Figure 14:
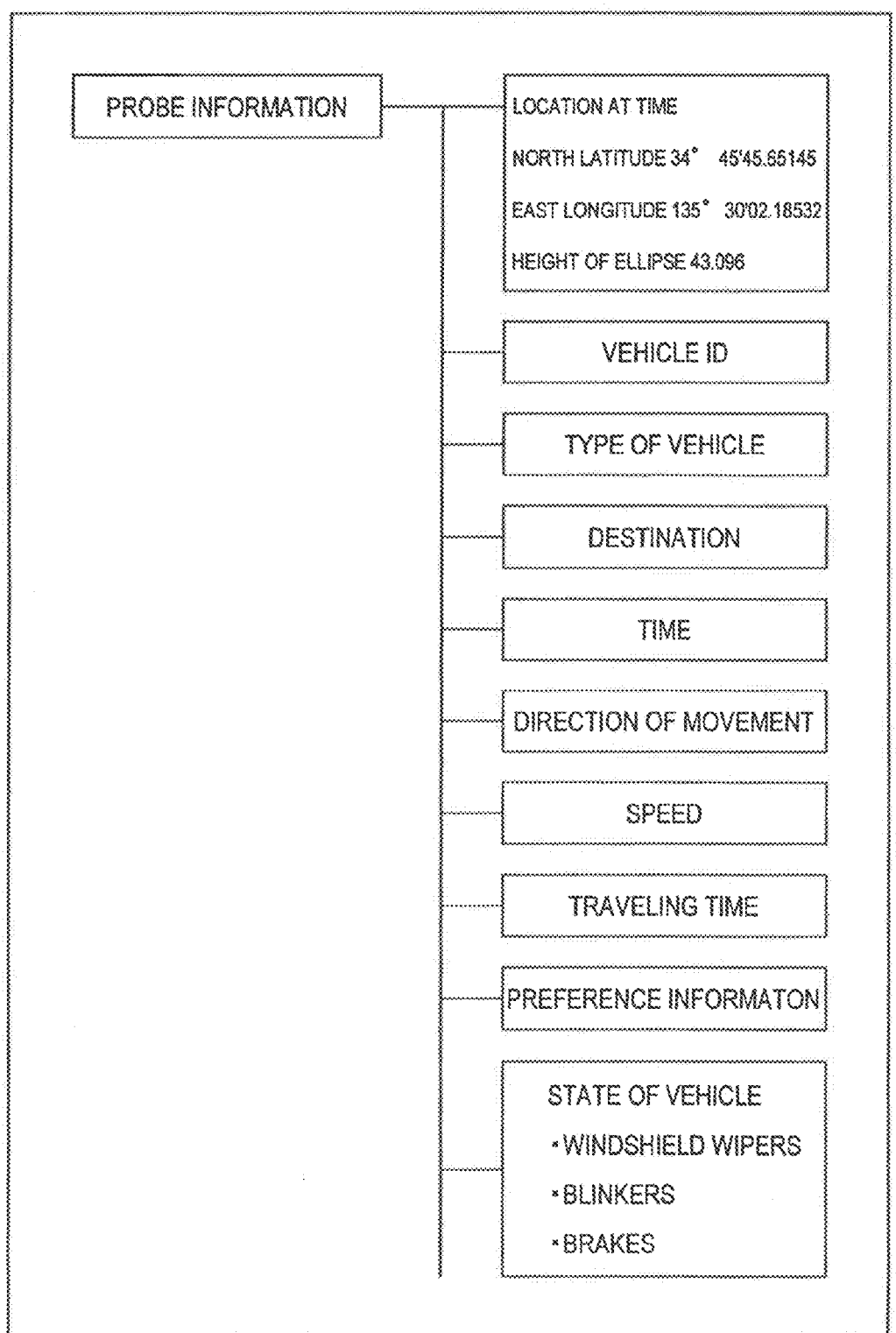
FIG. 14 is a diagram illustrating an example of the configuration of probe information.

FIG. 14 is a diagram illustrating an example of the configuration of probe information. Probe information is information showing information inherent to the vehicle 22 and the state of the vehicle, including the state of operation and the state of the environment. Specifically, probe information includes information showing the location of the vehicle 22 at that time, the vehicle ID of the vehicle 22, the type of the vehicle 22, the destination of the vehicle 22, the direction in which the vehicle 22 moves, the speed at which the vehicle 22 runs, preference information for the vehicle 22 or the user of the vehicle 22, and the state of the vehicle, for example the windshield wipers, the blinkers and the brakes, of the vehicle 22. The information supplying server 10 receives this probe information from the apparatus 20 mounted in a vehicle, so that the probe information can be used to extract information to be displayed which is to be transmitted to the apparatus 20 mounted in a vehicle, as described in, for example, "[5] Description of third embodiment of present invention."

The configuration of the apparatus 20 mounted in a vehicle is described above. Though FIG. 13 shows the configuration of the apparatus 20 mounted in a vehicle as being divided into blocks for each function, each block may be divided into smaller blocks, or a number of blocks may be united. The information to be displayed storing portion 242 and the map information storing portion 246, for example, may form a single storing portion 272.

[2-9] Configuration of Hardware of Apparatus 20 Mounted in Vehicle

Figure 15:
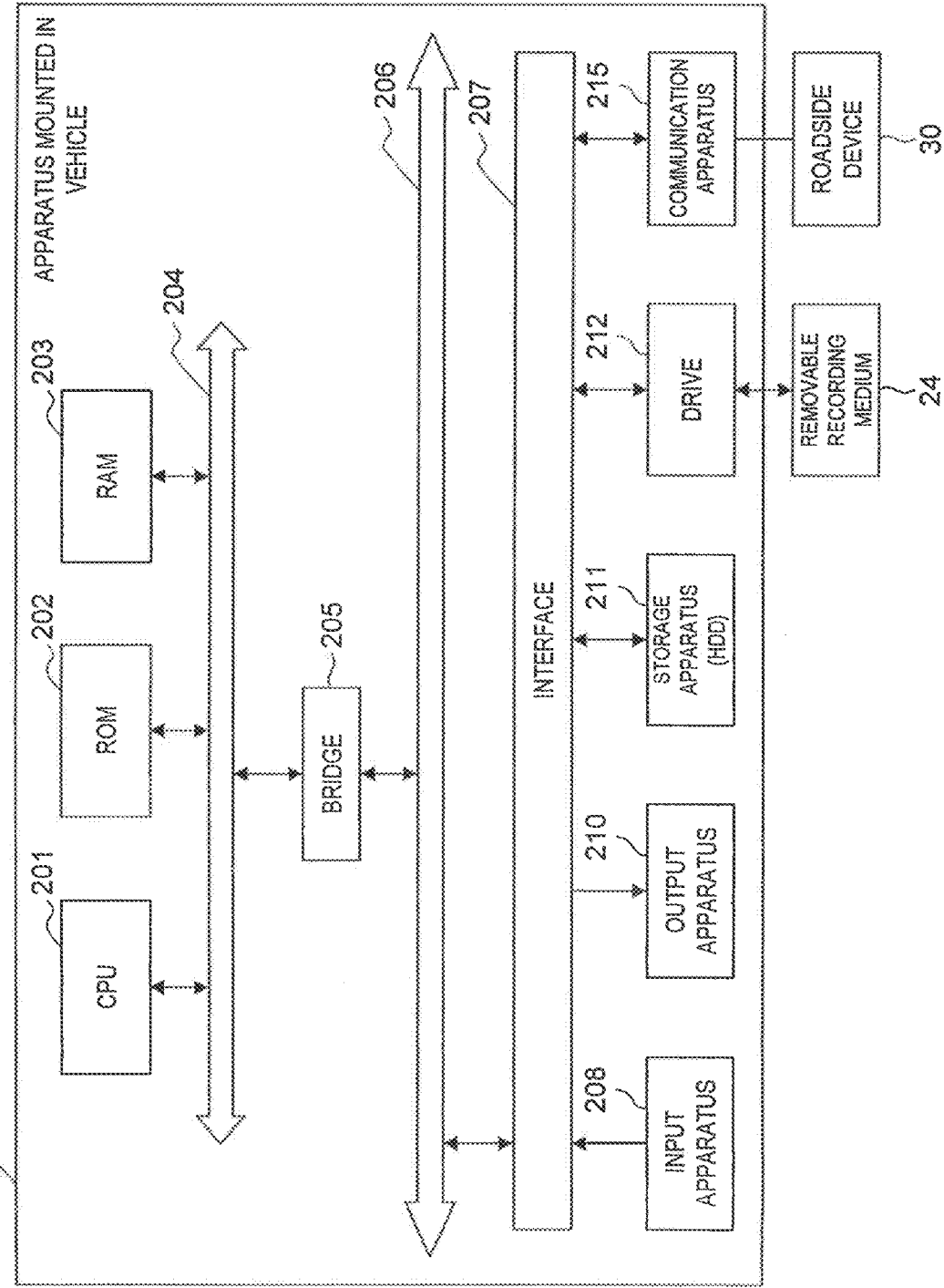
FIG. 15 is a diagram illustrating the configuration of hardware in an apparatus mounted in a vehicle.

FIG. 15 is a diagram illustrating the configuration of the hardware of an apparatus 20 mounted in a vehicle. The apparatus 20 mounted in a vehicle is provided with a CPU (Central Processing Unit) 201, a ROM (Read Only Memory) 202, a RAM (Random Access Memory) 203, a host bus 204, a bridge 205, an external bus 206, an interface 207, an input apparatus 208, an output apparatus 210, a storage apparatus (HDD) 211, a drive 212 and a communication apparatus 215.

The CPU 201 functions as an arithmetic processing apparatus and a control apparatus, and controls the operation within the apparatus 20 mounted in a vehicle as a whole in accordance with various types of programs. In addition, the CPU 201 may be a microprocessor. The ROM 202 stores the programs and operation parameters used by the CPU 201. The RAM 203 primarily stores the programs used to run the CPU 201 and the parameters which appropriately change during the time when the CPU is running. These are connected to each other through the host bus 204, includes a CPU bus and the like.

The host bus 204 is connected to the external bus 206, for example a PCI (Peripheral Component Interconnect/Interface) bus via the bridge 205. Here, it is not necessary for the host bus 204, the bridge 205 and the external bus 206 to be formed separately, and these functions may be provided in one bus.

The input apparatus 208 includes an input unit for the user to input information, for example a mouse, a keyboard, a touch panel, a button, a microphone, a switch or a lever, and an input control circuit for generating an input signal on the basis of the input by the user and outputting the signal to the CPU 201. The user of the apparatus 20 mounted in a vehicle operates this input apparatus 208, and thus, can input various types of data into the apparatus 20 mounted in a vehicle and instruct an operation for processing.

The output apparatus 210 includes a display apparatus, for example a CRT (Cathode Ray Tube) display apparatus, a liquid crystal display (LCD) apparatus or a lamp, and a speech sound outputting apparatus, for example a speaker or a headset. The output apparatus 210, for example, outputs a display screen including text and images generated on the basis of the information to be displayed that is received from the information supplying server 10.

The storage apparatus 211 is an apparatus for storing data formed as an example of a storing portion in the apparatus 20 mounted in a vehicle according to the present embodiment, and includes a memory medium, a recording apparatus for recording data in a memory medium, a reading apparatus for reading out data from a memory medium, and a deleting apparatus for deleting data recorded in a memory medium. The storage apparatus 211 includes, for example, an HDD (Hard Disc Drive). This storage apparatus 211 stores programs for driving a hard disc which are run in the CPU 201, as well as various types of data. In addition, this storage apparatus 211 stores map information, map additional information, advertisement information and preference information and the like.

The drive 212 is a reader and writer for a memory medium, and built in inside the apparatus 20 mounted in a vehicle or attached on the outside. The drive 212 reads out information recorded in a magnetic disc, an optical disc or an optical magnetic disc loaded, or a removable memory medium 24, for example a semiconductor memory, and outputs the information to the RAM 203.

The communication apparatus 215 is a communication interface formed of, for example, a communication device for communication with the roadside device 30. In addition, the communication apparatus 215 may be a communication apparatus using wireless LAN (Local Area Network), a communication apparatus using wireless USB, a wired communication apparatus for communication using wires, or a communication apparatus using DSRC. This communication apparatus 215 transmits and receives various types of data, such as information to be displayed, preference information and probe information, to and from the information supplying server 10 via the roadside device 30. That is to say, the communication apparatus 215 may have the same functions as the DSRC protocol portion 222, the extended communication controlling protocol portion 224, the IP based communication portion 226 and the non IP-based communication portion 228, as shown in FIG. 13.

Here, though detailed description is omitted, the information supplying server 10 and the roadside device 30 can be formed so as to be substantially the same as the configuration of hardware of the apparatus 20 mounted in a vehicle.

[3] DESCRIPTION OF FIRST EMBODIMENT OF PRESENT INVENTION (Supply of Advertisement Information on Destination)

Next, the first embodiment of the present invention is described. In the description of the present embodiment, the issues with the related art and the effects of the present embodiment are schematically described, and after that, the configuration and the operation of the apparatus 20 mounted in a vehicle and the information supplying server 10 according to the present embodiment are described in detail.

[3-1] Issue with Related Art and Effects of Present Embodiment

Car navigation systems in the past where advertisement information for a certain store is transmitted to the apparatus mounted in a vehicle which passes through in neighborhood of the area where the store is located and advertisement information for the store is displayed in the apparatus mounted in a vehicle have been proposed.

In apparatuses mounted in a vehicle in the past which form car navigation systems in the past, however, when a vehicle is running toward a certain destination, advertisement information that is transmitted to an unspecified large number of vehicles that pass through a certain location, not necessarily the destination, is displayed. Accordingly, car navigation systems in the past in many cases provide advertisement information having little relation to the user to the user of each vehicle.

In addition, in apparatuses mounted in a vehicle which form car navigation systems in the past, certain advertisement information corresponding to the advertisement display location is displayed when the vehicle passes through a certain advertisement display location. That is to say, in car navigation systems in the past, the advertisement display location and advertisement information displayed by the apparatuses mounted in vehicles which pass through the advertisement display location are set one-to-one. Accordingly, when a number of vehicles pass through the same group of locations where an advertisement is to be displayed, the order of advertisement information which is displayed in the apparatus mounted in each vehicle is different depending on the order in which the vehicles pass through each advertisement display location. That is to say, there is a issue with car navigation systems in the past, such that a number of pieces of advertisement information can hardly be provided to the user of a vehicle in a predetermined order.

Therefore, with the above described issue as a point to improve upon in this invention, an information supplying server 10 and an apparatus 20 mounted in a vehicle according to the first embodiment of the present invention were created. The information supplying server 10 and the apparatus 20 mounted in a vehicle according to the present embodiment can supply advertisement information which relates to the destination of the user to the user of a vehicle 22. In addition, the information supplying server 10 and the apparatus 20 mounted in a vehicle according to the present embodiment can supply a number of pieces of advertisement information to the user of a vehicle 22 in an order which does not depend on the route through which the vehicle travels. In the following, the configuration and operation of the information supplying server 10 and the apparatus 20 mounted in a vehicle according to the present embodiment, which can supply advertisement information having high customer appeal to the user of the vehicle 22 in this manner is described in detail.

Figure 16:
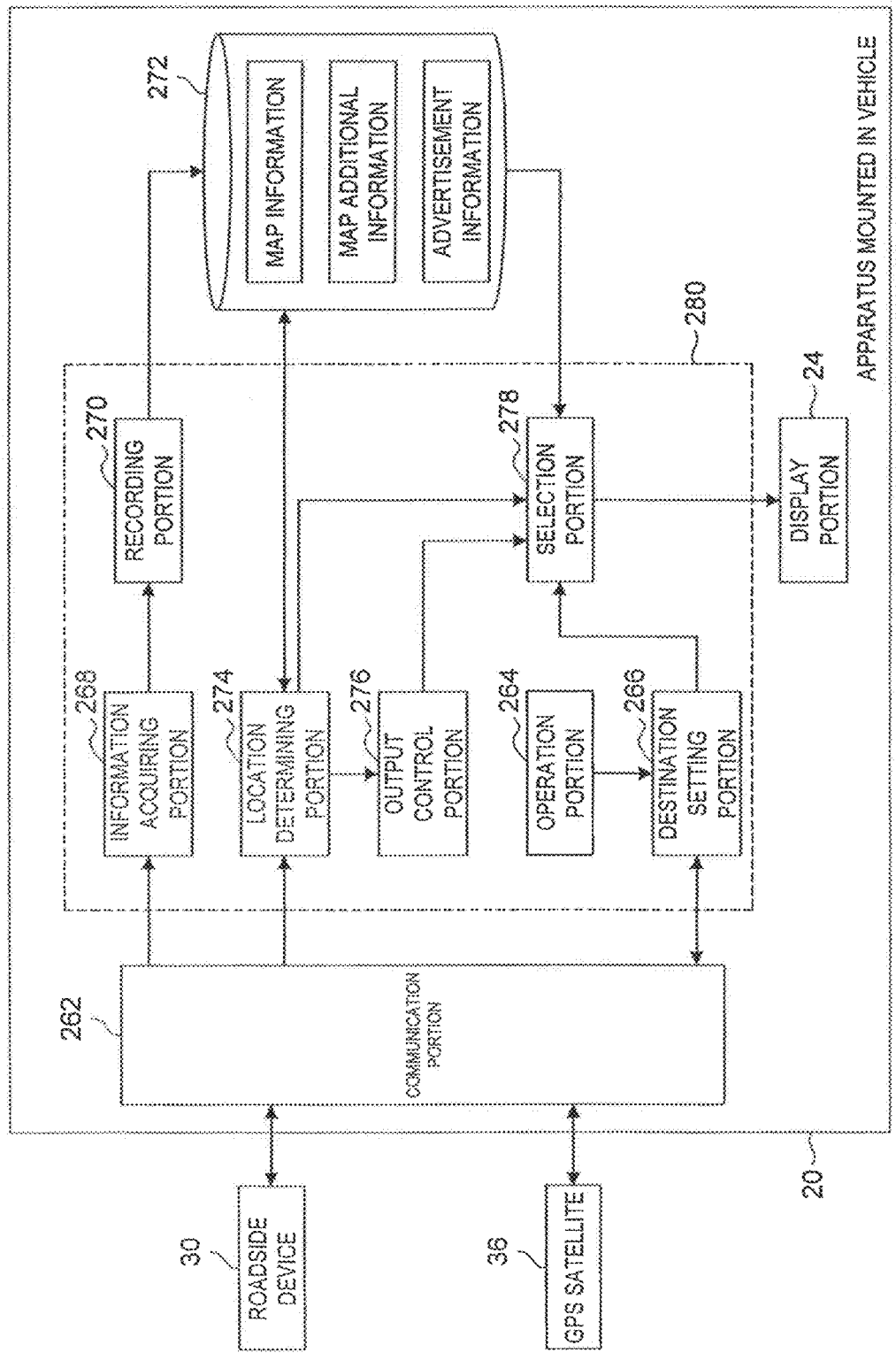
FIG. 16 is a function block diagram showing the configuration of the apparatus mounted in a vehicle according to a first embodiment of the present invention.

[3-2] Detailed Description of Configuration and Operation of First Embodiment of Present Invention FIG. 16 is a function block diagram showing the configuration of the apparatus 20 mounted in a vehicle according to the present embodiment. The apparatus 20 mounted in a vehicle can communicate with a roadside device 30 and a GPS satellite 36, and is provided with a communication portion 262, an operation portion 264, a destination setting portion 266, an information acquiring portion 268, a recording portion 270, a storing portion 272, a location determining portion 274, an output control portion 276, a selection portion 278 and a display portion 24.

The communication portion 262 is an interface between the apparatus 20 mounted in a vehicle and the roadside device 30, as well as between the apparatus 20 mounted in a vehicle and the GPS satellite 36. Specifically, the communication portion 262 receives information to be displayed, including map additional information and an advertisement information group transmitted from the roadside device 30 through DSRC communication. In addition, the communication portion 262 receives radio waves for finding the location from a number of GPS (Global Positioning System) satellites 36. This communication portion 262 may have a configuration corresponding to the communication apparatus 215 or the program for making the communication apparatus 215 function, as shown in FIG. 15.

The operation portion 264 detects various types of operations in the apparatus 23 mounted in a vehicle or the vehicle 22 by the user of the vehicle 22. The operation portion 264, for example, detects an operation of stopping the engine by the user, an operation of moving the windshield wipers, an operation of opening or closing a window, an operation of switching gears, an operation of turning on the blinkers, and an operation of setting the destination for the vehicle 22 and the like.

The destination setting portion 266 sets the destination for the vehicle 22 on the basis of the operation of setting the destination for the vehicle 22, which is detected by the operation portion 264. In addition, the destination setting portion 266 may transmit the set destination for the vehicle 22 to the information supplying server 10 via the roadside device 30.

The information acquiring portion 268 acquires map additional information showing the destination set by the destination setting portion 266 and the advertisement information group corresponding to the map additional information from the information supplying server 10 via the roadside device 30. In the case where the set destination is indicated by the location information, for example the latitude and longitude, the map additional information showing the destination may be map additional information which is to be added to the location indicated by the location information. In addition, in the case where the set destination is an institution, such as a park or a museum, the map additional information showing the destination may be map additional information showing the institution.

Here, in order for the information acquiring portion 268 to acquire information to be displayed relating to the destination that has been set by the destination setting portion 266, it is necessary for the roadside device 30 with which the apparatus 20 mounted in a vehicle can communicate to transmit information to be displayed on the basis of the destination set by the destination setting portion 266. In the case where each roadside device 30 transmits information to be displayed which relates to various destinations, taking the possibility of various destinations being set in the vehicle 22 into consideration, the load of communication in the roadside device 30 becomes enormous.

Therefore, the destination setting portion 266 transmits the set destination together with the location of the vehicle 22 at that time to the information supplying server 10, and the information supplying server 10 may transmit information to be displayed relating to this set destination only to the roadside device 30 which can communicate with the vehicle 22. In this configuration, it is possible to transmit only necessary information to be displayed to the roadside device 30 when necessary, and therefore, the amount of communication in the roadside device 30 can be reduced. In addition, the apparatus 20 mounted in a vehicle can rapidly receive the information to be displayed relating to the set destination. In addition, the information supplying server 10 can transmit the contents to be displayed after updating to the apparatus 20 mounted in a vehicle in real time, even in the case where the content of the information to be displayed is updated in the information supplying server 10.

The recording portion 270 records the information to be displayed acquired by the information acquiring portion 268 in the storing portion 272. The storing portion 272 stores map information, information to be displayed acquired by the information acquiring portion 268, that is to say, map additional information and the advertisement information group. This storing portion 272 may be a memory medium, for example a nonvolatile memory, such as an EEPROM or an EPROM, a magnetic disc, for example a hard disc or a disc type magnetic disc, an optical disc, for example a CD-R/RW, a DVD-R/RW/+R/+RW/RAM, or a BD (Blue-Ray Disc (registered trademark))-R/BD-RE, or an MO disc, as with the storing portion 108 in the information supplying server 10.

In addition, though FIG. 16 shows a single storing portion 272, storing portions which are conceptually or physically different in accordance with the object to be stored, for example a map information storing portion for storing map information, an map additional information storing portion for storing map additional information, or an advertisement information storing portion for storing an advertisement information group, may be provided.

The location determining portion 274 determines whether or not the vehicle 22 at that time has arrived at the advertisement output location. In further detail, the location determining portion 274 estimates the location of the vehicle 22 at that time on the basis of the radio waves for finding the location received from a number of GPS satellites 36 via the communication portion 262. In addition, information on the advertisement display location which corresponds to the map additional information stored in the storing portion 272 is acquired. Then, the location determining portion 274 determines whether or not the vehicle 22 has arrived at or is in the advertisement display location that is indicated by the acquired information on the advertisement display location. Here, a specific example of the advertisement display location is described in reference to FIG. 17.

Figure 17:
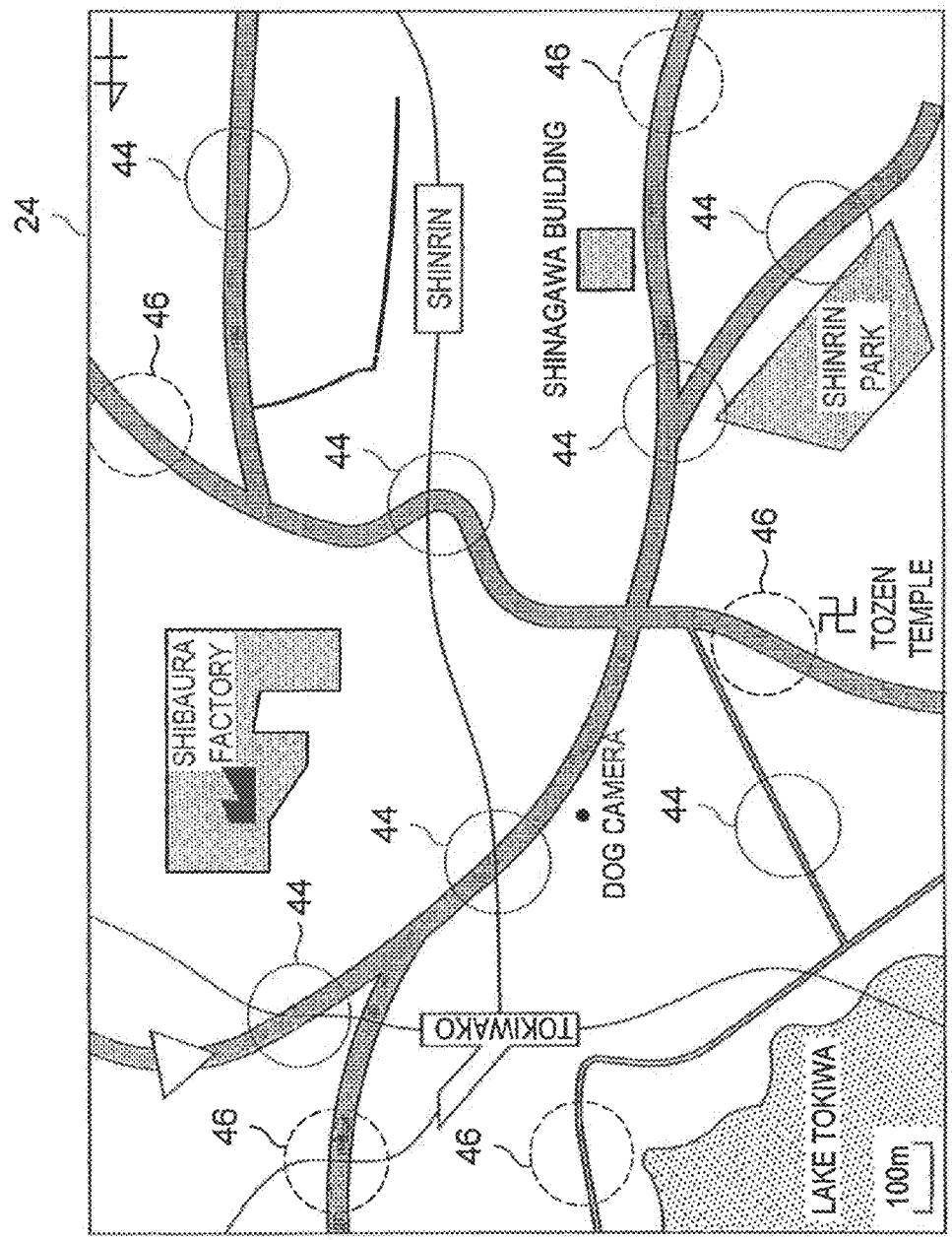
FIG. 17 is a diagram illustrating a specific example of the advertisement display location.

FIG. 17 is a diagram illustrating a specific example of the location where and advertisement is to be displayed. In FIG. 17, the location indicated by the information on the advertisement display location so as to correspond to the map additional information "Shinagawa building" is indicated by the advertisement display location 44, and the location indicated by the information on the advertisement display location so as to correspond to the map additional information "Tozenji" is indicated by the advertisement display location 46. Accordingly, in the case where the Shinagawa building is set as the destination, the location determining portion 274 determines whether or not the vehicle 22 has arrived at the advertisement display location 44.

In the same manner, in the case where Tozenji is set as the destination, the location determining portion 274 determines whether or not the vehicle 22 has arrived at the advertisement display location 46. Here, it is possible for the destination setting portion 266 to set a number of destinations, and in the case where the destination setting portion 266 sets both the Shinagawa building and Tozenji as the destination, the location determining portion 274 determines whether or not the vehicle 22 has arrived either at the advertisement display location 44 or the advertisement display location 46.

Here, as described in "[2] Summary of information supplying system according to one embodiment of present invention," information on the advertisement display location in some cases includes the type of road (general road, highway or the like) and the conditions in terms of the direction in which the vehicle is running (toward Tokyo, from Tokyo or the like). In this case, the location determining portion 274 determines the type of road along which the vehicle 22 is running, and whether or not the direction in which the vehicle is running satisfies the above described conditions.

Returning to the description of the configuration of the apparatus 20 mounted in a vehicle in reference to FIG. 16, when the location determining portion 274 determines that the vehicle 22 has arrived at the advertisement display location, the output control portion 276 displays advertisement information selected by the selection portion 278 on the display portion 24. Specifically, when the location determining portion 274 determines that the vehicle 22 has arrived at the advertisement display location, the output control portion 276 instructs the selection portion 278 to select advertisement information, and thus, the advertisement information selected by the selection portion 278 may be supplied to the display portion 24 for display.

Alternatively, the selection portion 278 may select advertisement information to be supplied to the display portion 24 in advance, and when the location determining portion 274 determines that the vehicle 22 has arrived at the advertisement display location, the output control portion 276 may supply the advertisement information that has been selected by the selection portion 278 in advance to the display portion 24.

In addition, the output control portion 276 may control the display portion 24 to display advertisement information during the period when the vehicle 22 is within the range of the advertisement display location, control the display portion 24 to display the same advertisement information before the vehicle 22 arrives at the next advertisement display location, and control the display portion 24 to display advertisement information for a predetermined period of time after the vehicle 22 has arrived at the advertisement display location.

The selection portion 278 selects advertisement information to be displayed on the display portion 24 from the advertisement information group stored in the storing portion 272. That is to say, the selection portion 278 selects advertisement information to be displayed on the display portion 24 from the advertisement information group corresponding to map additional information showing the set destination. In addition, the selection portion 278 according to the present embodiment selects the next advertisement information on the basis of the advertisement information previously displayed on the display portion 24.

In the case where advertisement information for a certain maker is made up of a sequence of pieces of advertisement information placed in order relative to each other, for example, the selection portion 278 may select advertisement information which is placed next in order to the advertisement information displayed on the display portion 24 directly before as the next advertisement information. In this configuration, a number of pieces of advertisement information can be displayed on the display portion 24 in a predetermined order, independent of the route along which the vehicle 22 travels.

The display portion 24 functions as an output portion and supplies the advertisement information selected by the selection portion 278 to the user of the vehicle 22 on the basis of the control of the output control portion 276. FIG. 16 shows only the display portion 24 as an example of the output portion, and the output portion may be a speech sound outputting portion, for example a speaker, a headset or earphones. The display portion 24 can be also attached to the outside the apparatus 20 mounted in a vehicle, so that the apparatus 20 mounted in a vehicle does not necessarily include the output portion such as the display portion 24.

The configuration of the apparatus 20 mounted in a vehicle according to the present embodiment is described above. Next, specific examples of the advertisement display location and advertisement information displayed in the advertisement display location are described in reference to FIGS. 18 and 19.

Figure 18:
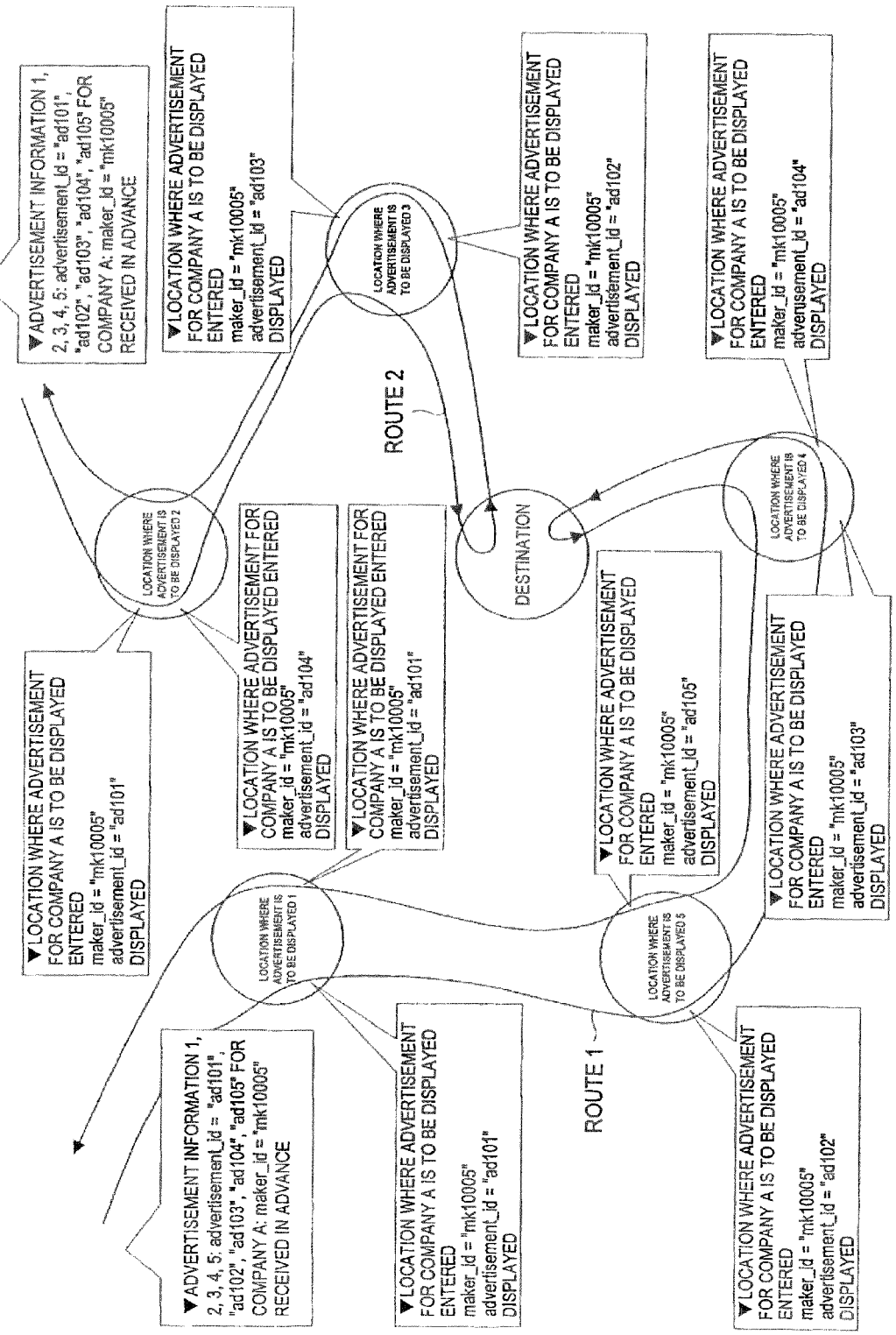
FIG. 18 is a diagram illustrating a specific example of the advertisement display location and the advertisement information displayed in the advertisement display location.

FIG. 18 is a diagram illustrating specific examples of the advertisement display location and advertisement information displayed in the advertisement display location. In detail, FIG. 18 shows the contents of advertisement information displayed in the vehicle 22 which runs through a path 1 toward the destination and returns from the destination, and advertisement information displayed in the vehicle 22 which runs through a path 2 toward the destination and returns from the destination.

The vehicle 22 which runs through the path 1 passes the advertisement display location 1, the advertisement display location 5 and the advertisement display location 4 in this order before arriving at the destination, and passes the advertisement display location 4, the advertisement display location 5 and the advertisement display location 1 in this order before returning from the destination. In addition, the vehicle 22 which runs along the path 1 receives advertisement information 1 for company A (ad101) indicated by "maker id=mk10005," advertisement information 2 (ad102), advertisement information 3 (ad103), advertisement information 4 (ad104) and advertisement information 5 (ad105) in advance, and stores these in the storing portion 272. Here, this advertisement information group includes advertisement information which corresponds to the map additional information showing the destination.

At this time, the apparatus 20 mounted in a vehicle displays advertisement information 1 for company A (ad101) when the vehicle 22 which runs along the path 1 arrives at the advertisement display location 1. Subsequently, when the vehicle 22 which is running along the path 1 arrives at the advertisement display location 5, the advertisement information 2 for company A (ad102), which is placed next in order to the advertisement information 1 (ad101) displayed directly before, is displayed. Furthermore, when the vehicle 22 which is running along the path 1 arrives at the advertisement display location 4, the advertisement information 3 for company A (ad103), which is placed next in order to the advertisement information 2 (ad102) displayed directly before, is displayed.

Next, when the vehicle 22 which is running along the path 1 arrives at the advertisement display location 4 after it arrives at the destination, the advertisement information 4 for company A (ad104), which is placed next in order to the advertisement information 3 (ad103) displayed directly before, is displayed. Subsequently, when the vehicle 22 which is running along the path 1 arrives at the advertisement display location 5, the advertisement information 5 for company A (ad105), which is placed next in order to the advertisement information 4 (ad104) displayed directly before, is displayed. Furthermore, when the vehicle 22 which is running along the path 1 arrives at the advertisement display location 1, the advertisement information 5 (ad105) displayed directly before is the advertisement information which is placed last in order, and therefore, the advertisement information 1 for company A (ad101), which is placed first in order, is displayed.

In addition, the vehicle 22 which is running along the path 2 passes the advertisement display location 2 and the advertisement display location 3 in this order and arrives at the destination, and passes the advertisement display location 3 and the advertisement display location 2 in this order before returning from the destination. In addition, it is assumed that the vehicle 22 which is running along the path 2 receives advertisement information 1 for company A (ad101) which is represented by "maker id=mk10005," advertisement information 2 (ad102), advertisement information 3 (ad103), advertisement information 4 (ad104) and advertisement information 5 (ad105) in advance, and stores these in the storing portion 272.

At this time, the apparatus 20 mounted in a vehicle displays the advertisement information 1 for company A (ad101) when the vehicle 22 which is running along the path 2 arrives at the advertisement display location 2. Subsequently, when the vehicle 22 which is running along the path 2 arrives at the advertisement display location 3, the advertisement information 2 for company A (ad102), which is placed next in order to the advertisement information 1 (ad101) displayed directly before, is displayed.

Next, when the vehicle 22 which is running along the path 2 arrives at the advertisement display location 3 after it arrives at the destination, the advertisement information 3 for company A (ad103), which is placed next in order to the advertisement information 2 (ad102) displayed directly before, is displayed. Subsequently, when the vehicle 22 which is running along the path 2 arrives at the advertisement display location 2, the advertisement information 4 for company A (ad104), which is placed next in order to the advertisement information 3 (ad103) displayed directly before, is displayed.

As described above, the apparatus 20 mounted in a vehicle according to the present embodiment can display advertisement information which corresponds to map additional information relating to the destination. Accordingly, advertisement information relating to the destination which the user is about to visit is supplied to the user of the vehicle 22, and therefore, in many cases, the user is interested in the supplied advertisement information or can effectively use the supplied advertisement information. In addition, as viewed from the advertiser's side, who supplies advertisement information, advertisement information which is determined to have high consumer appeal to the user of the vehicle 22 can be supplied to the user. That is to say, the apparatus 20 mounted in a vehicle supplies advertisement information relating to the destination of the user to the user of the vehicle 22, and therefore, the usefulness of the advertisement information for the user of the vehicle 22 can be increased, and the effects of supplying advertisement by the advertiser can be improved.

Furthermore, the apparatus 20 mounted in a vehicle according to the present embodiment can provide advertisement information to the user in a predetermined order, even when vehicles 22 where the same destination is set run through different paths, as shown in FIG. 18. Therefore, in the case where a number of pieces of advertisement information have a flow sequence, the advertisement information can be supplied to the user of the vehicle 22 in the same order as this flow sequence, and thus, the advertisement can be given high consumer appeal in comparison with the case where each piece of advertisement information is individually or independently supplied.

Figure 19:
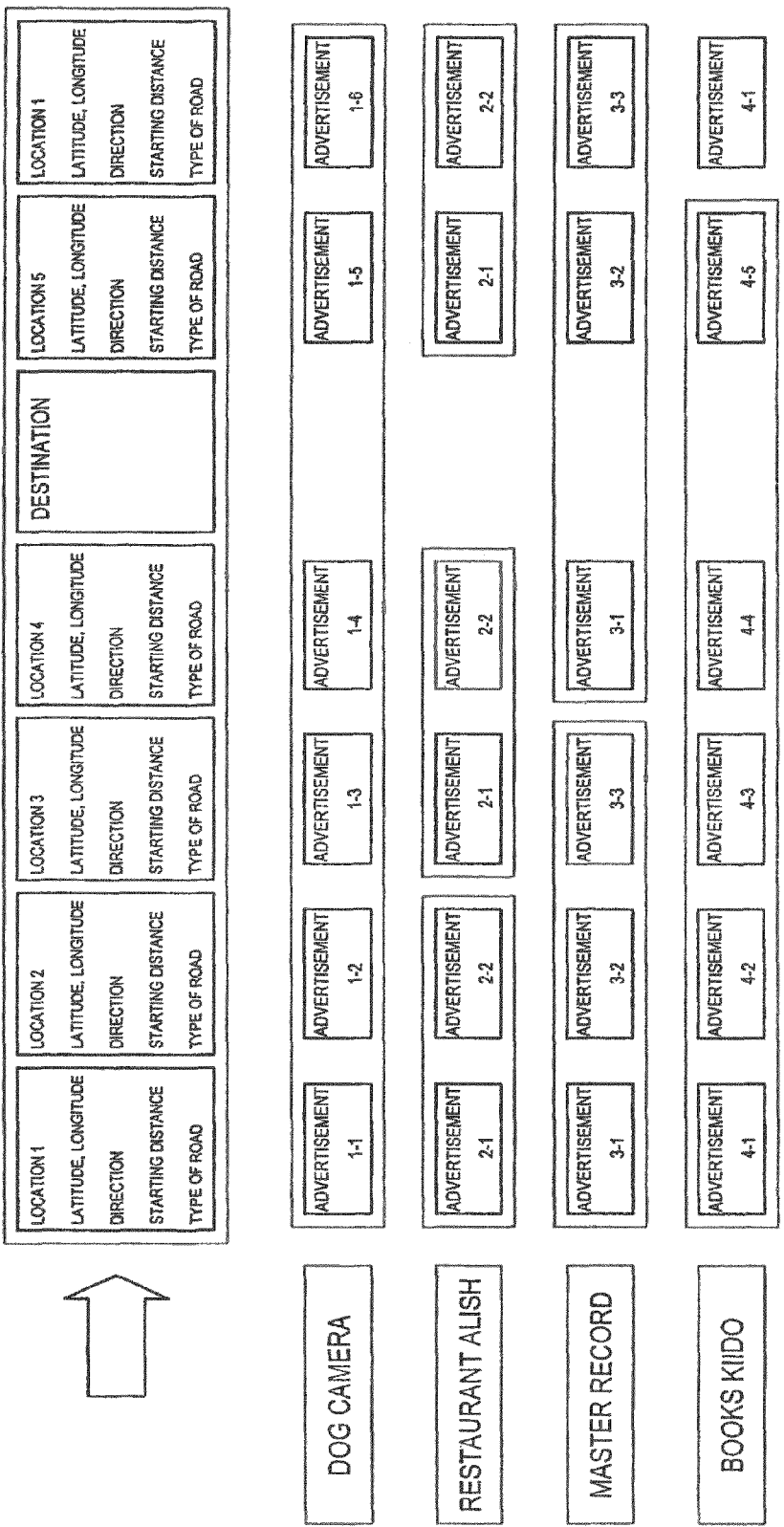
FIG. 19 is a diagram illustrating a specific example of the advertisement display location and a number of pieces of advertisement information displayed in the advertisement display location.

Here, though a case where advertisement information for one company is supplied is described in FIG. 18, the apparatus 20 mounted in a vehicle according to the present embodiment can supply a number of pieces of advertisement information in order in the advertisement display location, as shown in FIG. 19.

FIG. 19 is a diagram illustrating specific examples of a advertisement display location and a number of pieces of advertisement information displayed in the advertisement display location. In further detail, FIG. 19 shows the manner in which advertisement information displayed in the apparatus 20 mounted in a vehicle 22 which runs through the advertisement display location 1, the advertisement display location 2, the advertisement display location 3, the advertisement display location 4, the destination, the advertisement display location 5 and the advertisement display location 1 in this order changes.

First, when the vehicle 22 arrives at the advertisement display location 1, the apparatus 20 mounted in a vehicle displays the advertisement information 1-1 for Dog Camera, the advertisement information 2-1 for Restaurant Alish, the advertisement information 3-1 for Master Records and the advertisement information 4-1 for Books Kiido, and these are supplied to the user of the vehicle 22. Subsequently, when the vehicle 22 arrives at the advertisement display location 2, the apparatus 20 mounted in a vehicle displays the advertisement information 1-2, which is placed next in order to the advertisement information 1-1 displayed immediately before Dog Camera, the advertisement information 2-2, which is placed next in order to the advertisement information 2-1 displayed immediately before Restaurant Alish, the advertisement information 3-2, which is placed next in order to the advertisement information 3-1 displayed immediately before Master Records, and the advertisement information 4-2, which is placed next in order to the advertisement information 4-1 displayed immediately before Books Kiido.

Next, when the vehicle 22 arrives at the advertisement display location 3, the apparatus 20 mounted in a vehicle displays the advertisement information 1-3, which is placed next in order to the advertisement information 1-2 displayed immediately before Dog Camera, the advertisement information 3-3, which is placed next in order to the advertisement information 3-2 displayed immediately before Master Records, and the advertisement information 4-3 which is placed next in order to the advertisement information 4-2 displayed immediately before Books Kiido. In addition, the advertisement information 2-2 displayed immediately before Restaurant Alish is the advertisement information which is placed last in order, and therefore, the apparatus 20 mounted in a vehicle displays the advertisement information 2-1, which is placed first in order.

Furthermore, when the vehicle 22 arrives at the advertisement display location 4, the apparatus 20 mounted in a vehicle displays the advertisement information 1-4, which is placed next in order to the advertisement information 1-3 displayed immediately before Dog Camera, the advertisement information 2-2, which is placed next in order to the advertisement information 2-1 displayed immediately before Restaurant Alish, and the advertisement information 4-4, which is placed next in order to the advertisement information 4-3 displayed immediately before Books Kiido. In addition, the advertisement information 3-3 displayed immediately before Master Records is the advertisement information which is placed last in order, and therefore, the apparatus 20 mounted in a vehicle displays the advertisement information 3-1, which is placed first in order.

Subsequently, when the vehicle 22 arrives at the advertisement display location 5, the apparatus 20 mounted in a vehicle displays the advertisement information 1-5, which is placed next in order to the advertisement information 1-4 displayed immediately before Dog Camera, the advertisement information 3-2, which is placed next in order to the advertisement information 3-1 displayed immediately before Master Records, and the advertisement information 4-5, which is placed next in order to the advertisement information 4-4 displayed immediately before Books Kiido. In addition, the advertisement information 2-2 displayed immediately before Restaurant Alish is the advertisement information which is placed last in order, and therefore, the apparatus 20 mounted in a vehicle displays the advertisement information 2-1, which is placed first in order.

Then, when the vehicle 22 arrives at the advertisement display location 1, the apparatus 20 mounted in a vehicle displays the advertisement information 1-6, which is placed next in order to the advertisement information 1-5 displayed immediately before Dog Camera, the advertisement information 2-2, which is placed next in order to the advertisement information 2-1 displayed immediately before Restaurant Alish, and the advertisement information 3-3, which is placed next in order to the advertisement information 3-2 displayed immediately before Master Records. In addition, the advertisement information 4-5 displayed immediately before Books Kiido is the advertisement information which is placed last in order, and therefore, the apparatus 20 mounted in a vehicle displays the advertisement information 4-1, which is placed first in order.

Subsequently, the information supplying system 1 according to the present embodiment and the information processing method used in the apparatus 20 mounted in a vehicle are described in reference to FIGS. 20 to 22.

Figure 20:
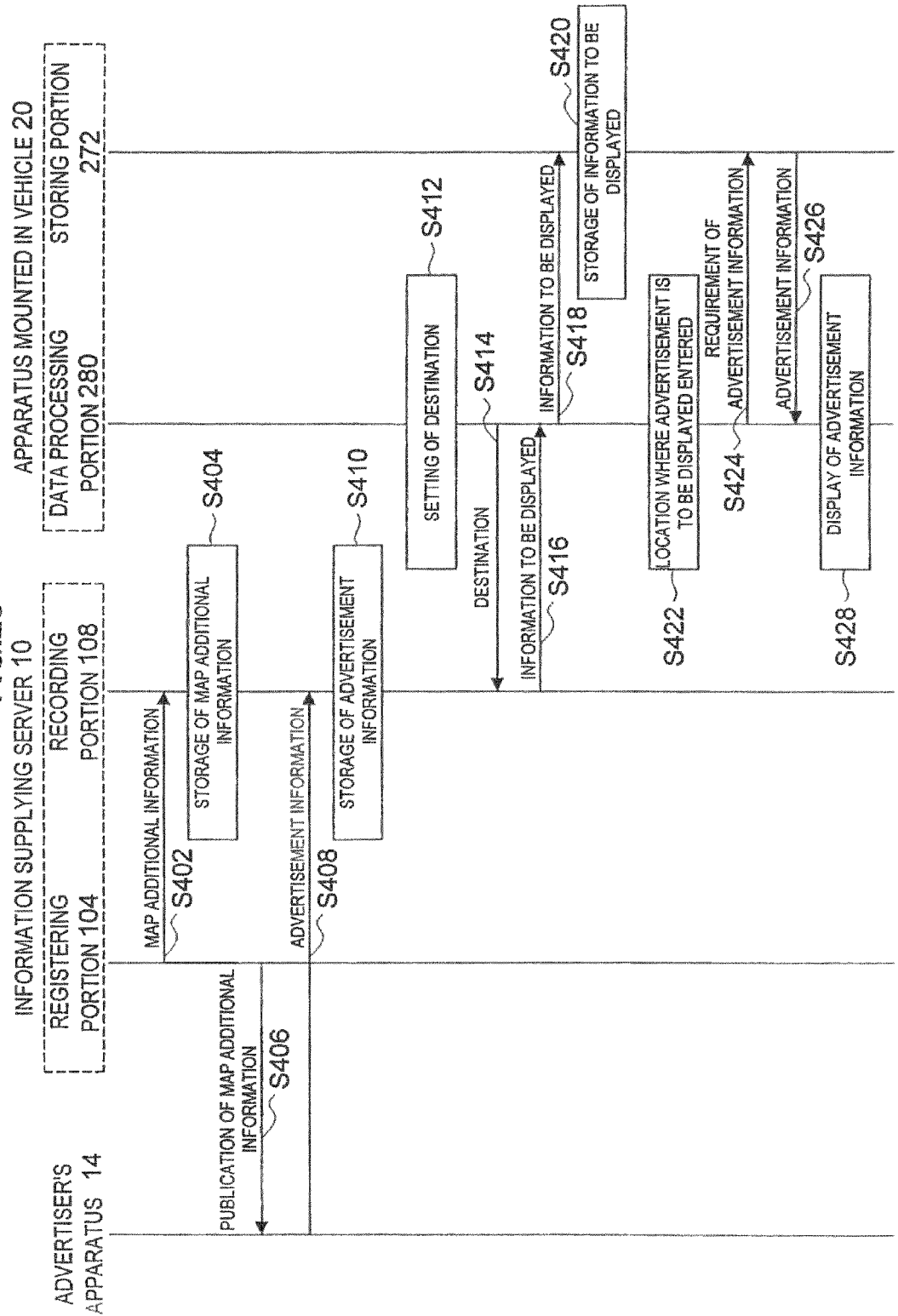
FIG. 20 is a sequence diagram showing the flow of the operation of the information supplying system according to the first embodiment.

FIG. 20 is a sequence diagram showing the flow of the operation of the information supplying system 1 according to the present embodiment. First, a registering portion 104 in the information supplying server 10 outputs map additional information to a storing portion 108 (S402), and the storing portion 108 stores map additional information which is inputted from the registering portion 104 (S404).

Subsequently, the information supplying server 10 publishes the map additional information which is stored in the storing portion 108 so that the advertiser's apparatus 14 can invite an advertiser who desires to add advertisement information to the map additional information (S406).

Then, the advertiser's apparatus 14 of the advertiser who has gained the right to add advertisement information to the map additional information transmits advertisement information to the storing portion 108 (S408), and the storing portion 108 associates the received advertisement information with the map additional information and stores this (S410). Meanwhile, when the data processing portion 280 of the apparatus 20 mounted in a vehicle sets the destination for the vehicle 22 (S412), the set destination is transmitted to the information supplying server 10 (S414). Here, data processing portion 280 of the apparatus 20 mounted in a vehicle is a general term given to the concept relating to the operation portion 264 of the apparatus 20 mounted in a vehicle, the destination setting portion 266, the information acquiring portion 268, the recording portion 270, the location determining portion 274, the output control portion 276 and the selection portion 278.

After that, the information supplying server 10 transmits the information to be displayed relating to the set destination to the apparatus 20 mounted in a vehicle (S416). Then, the data processing portion 280 outputs the information to be displayed which has been received from the information supplying server 10 to the storing portion 272 (S418), and the storing portion 272 stores this information to be displayed (S420).

Next, when it is determined that the vehicle 22 in which the apparatus 20 is mounted has entered the advertisement display location (S422), the data processing portion 280 requests the corresponding advertisement information from the storing portion 272 (S424), receives the corresponding advertisement information from the storing portion 272 (S428) and displays this advertisement information (S428).

Figure 21:
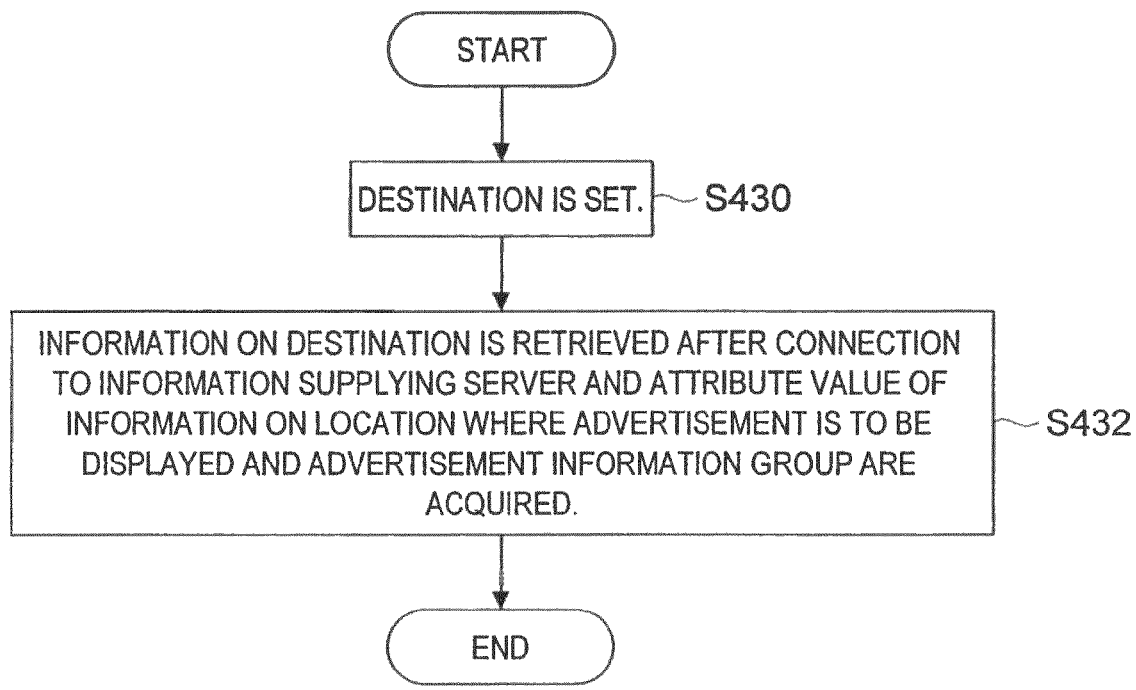
FIG. 21 is a flow chart showing the flow when the apparatus mounted in a vehicle according to the first embodiment acquires information to be displayed in detail.

FIG. 21 is a flow chart showing the flow when the apparatus mounted in a vehicle acquires information to be displayed in detail. First, the apparatus 20 mounted in a vehicle sets the destination for the vehicle 22 in which the apparatus 20 is mounted (S430). After that, the apparatus 20 mounted in a vehicle is connected to the information supplying server 10, retrieves information to be displayed relating to the destination, and acquires information to be displayed, including the attribute values of the information on the advertisement display location an advertisement information (S432).

In further detail, the information showing the destination set by the apparatus 20 mounted in a vehicle is transmitted to the information supplying server 10 and the information to be displayed relating to the destination set by the apparatus 20 mounted in a vehicle is retrieved in the information supplying server 10 so that the retrieved information to be displayed can be acquired. Here, communication between the actual information supplying server 10 and the apparatus 20 mounted in a vehicle is achieved via a roadside device 30. Accordingly, the above described configuration allows the roadside device 30 to transmit only necessary information to be displayed when necessary, and therefore, the amount of communication in the roadside device 30 can be reduced.

Figure 22:
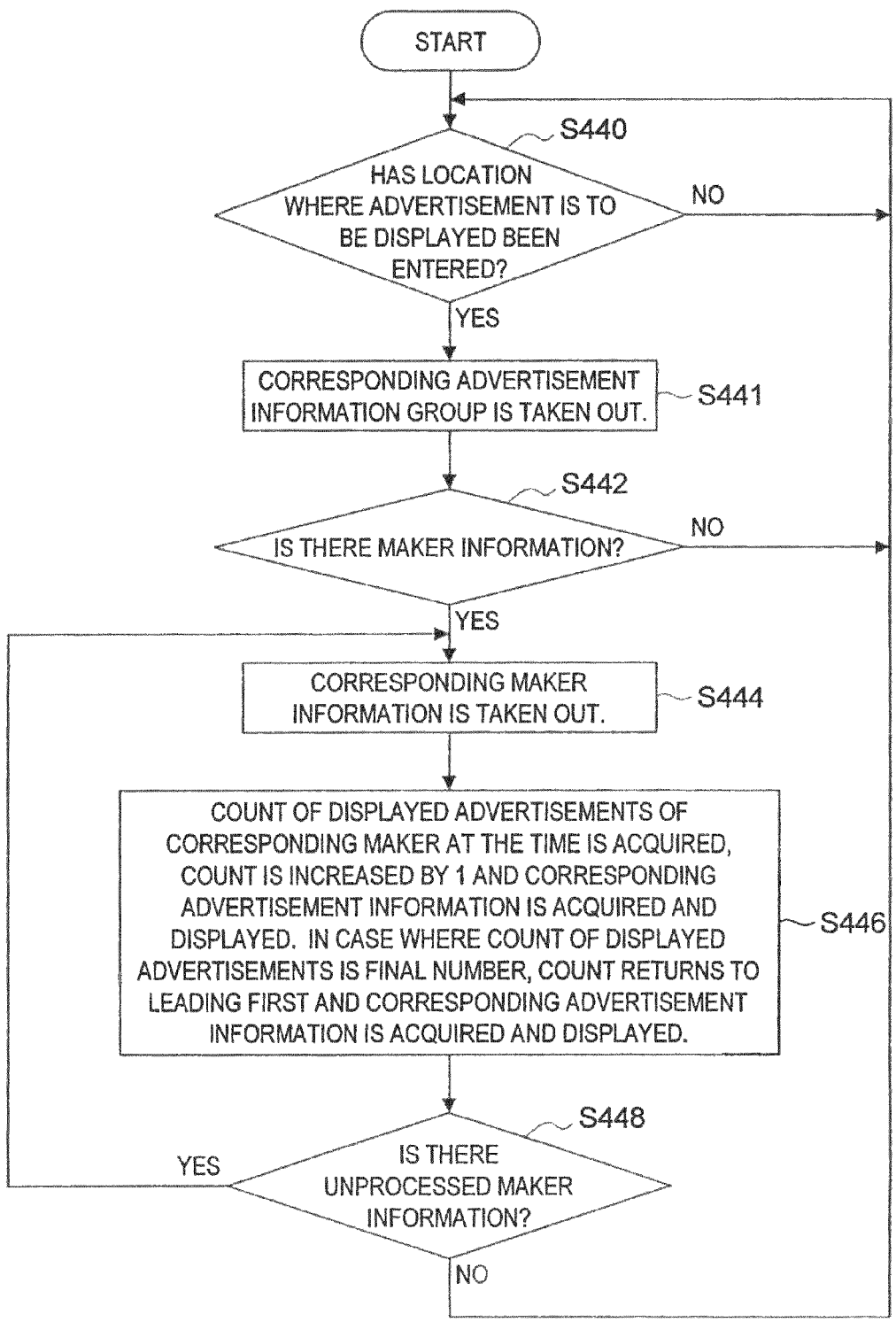
FIG. 22 is a flow chart showing the flow of displays of advertisement information in the apparatus mounted in a vehicle according to the first embodiment.

FIG. 22 is a flow chart showing the flow of display of advertisement information in the apparatus 20 mounted in a vehicle. First, the location determining portion 274 in the apparatus 20 mounted in a vehicle determines whether or not the vehicle 22 in which the apparatus 20 is mounted has entered the advertisement display location (S440). Then, the selection portion 278 acquires an advertisement information group which corresponds to the advertisement location information showing the advertisement display location into which the vehicle has entered (S441). Here, there is usually one advertisement information group corresponding to the advertisement location information showing the advertisement display location into which the vehicle has entered. Though a case where there are a number of advertisement information groups corresponding to the advertisement location information showing the advertisement display location into which the vehicle has entered is possible, in this case, each advertisement information group is processed independently. Subsequently, in the case where maker information is included in the advertisement information group acquired in S441 (S442), the selection portion 278 acquires certain maker information included in the advertisement information group (S444). Here, maker information is information which includes the name of the maker and the ID of the maker, with which the maker can be identified, and includes an advertisement display count showing the advertisement display information of the maker previously displayed on the display portion 24. The advertisement display count may be the advertisement information ID, for example "ad101" or "ad102" shown in FIG. 18.

After that, the selection portion 278 acquires the advertisement display count from the maker information acquired in S444, increases the advertisement display count (by an increment of 1), selects the advertisement information indicated by the advertisement display count, and displays advertisement information selected under the control of the output control portion 276 (S444). In the case where the advertisement display count is "ad101," for example, the selection portion 278 increases the advertisement display count to "ad102" showing the next advertisement information, and selects the advertisement information of which the advertisement information ID is "ad102" so that the selected advertisement information is displayed under the control of the output control portion 276.

In the case where the advertisement display count shows the advertisement information which is placed last in order, the selection portion 278 initializes the advertisement display count (returning to the first count), selects the advertisement information indicated by the advertisement display count, and displays the advertisement information selected under the control of the output control portion 276 (S446). Subsequently, the selection portion 278 determines whether or not there is unprocessed maker information in the advertisement information group acquired in S441 (S448), and in the case where there is unprocessed maker information in the advertisement information group, the unprocessed maker information is acquired (S444). Meanwhile, in the case where there is no unprocessed maker information in the advertisement information group, the procedure returns to the process in S440. Here, the advertisement display count may be held by the selection portion 278 or stored in the storing portion 272.

As described above, the apparatus 20 mounted in a vehicle according to the first embodiment of the present invention acquires advertisement information and location information associated with map additional information showing the destination set by the destination setting portion 266 from the information supplying server 10. In addition, the location determining portion 274 determines whether or not the vehicle 22 has arrived at the advertisement display location which is indicated by the location information acquired by the information acquiring portion 268, and in the case where the location determining portion 274 determines that the vehicle 22 has arrived at the advertisement output location, the output control portion 276 displays the advertisement information acquired by the information acquiring portion 268 on the display portion 24. Accordingly, the apparatus 20 mounted in a vehicle supplies advertisement information relating to the destination of the user to the user of the vehicle 22, and therefore, the usefulness of the advertisement information for the user of the vehicle 22 can be increased, and the effects of supplying advertisement by the advertiser can be improved.

Furthermore, in the apparatus 20 mounted in a vehicle according to the present embodiment, the selection portion 278 selects the next advertisement information to be displayed on the display portion 24 on the basis of the advertisement information previously displayed on the display portion 24. Accordingly, the apparatus 20 mounted in a vehicle according to the present embodiment can supply advertisement information to the user in a predetermined order, independent of the route through which the vehicle 22 travels. Therefore, in the case where a number of pieces of advertisement information have a flow sequence, the advertisement information can be supplied to the user of the vehicle 22 in the same order as this flow sequence, and advertisements can be given high consumer appeal in comparison with the case where each piece of advertisement information is individually or independently supplied.

[3-3] Description of Supplementary Matters for First Embodiment of Present Invention Here, though the first embodiment of the present invention is described in reference to the attached drawings, the present embodiment is not limited to this example. Though a so-called on-demand style where the apparatus 20 mounted in a vehicle transmits the destination to the information supplying server 10 and the information supplying server 10 transmits information to be displayed to the apparatus 20 mounted in a vehicle on the basis of the received destination is described above, the present embodiment is not limited to this example.

The information supplying server 10 may transmit map additional information to which advertisement display information showing the advertisement display location included in the range of use of each roadside device 30 corresponds and the advertisement information group which corresponds to this map additional information to each roadside device 30, for example. A specific example is described in reference to FIG. 23.

FIG. 23 is a diagram illustrating a modification of the present embodiment. A case where locations where an advertisement is to be displayed 48 indicated by the information on the advertisement display location which corresponds to the map additional information showing a certain destination 47 are arranged as in FIG. 23 is considered. Specifically, the locations where an advertisement is to be displayed 48 are arranged in locations which are not included in the range of use of a roadside device 30A, a roadside device 30B, a roadside device 30C, a roadside device 30E and a roadside device 30U, and included in the range of use of a roadside device 30D, a roadside device 30T, a roadside device 30V and a roadside device 30X.

In this case, map additional information showing the destination 47 and advertisement information which corresponds to the map additional information may be transmitted to the roadside device 30D, the roadside device 30T, the roadside device 30V and the roadside device 30X, where the range of use includes the locations where an advertisement is to be displayed 48, while map additional information showing the destination 47 and the advertisement information group which corresponds to the map additional information may not be transmitted to the roadside device 30A, the roadside device 30B, the roadside device 30C, the roadside device 30E and the roadside device 30U, where the range of use does not include the locations where an advertisement is to be displayed 48.

Even in the case where the advertisement information group on the basis of the destination 47 is transmitted to a roadside device 30 where the range of use does not include a advertisement output location which corresponds to map additional information showing the destination 47, the transmitted advertisement information is not immediately displayed on the apparatus 20 mounted in a vehicle, and therefore, in some cases, this is not effective, from the point of view of the amount of communication of data. Therefore, map additional information to which advertisement display information indicating the advertisement display location included in the range of use of each roadside device 30 corresponds and the advertisement information group which corresponds to the map additional information are transmitted to each roadside device 30, and thus, the amount of communication and the scale of the hardware in the roadside device 30 can be reduced.

In addition, the advertisement information displayed in the apparatus 20 mounted in a vehicle may be changed for each time zone. A specific example is described in reference to FIG. 24.

FIG. 24 is a diagram illustrating a modification of the present embodiment. FIG. 24 shows the data structure of certain advertisement information which includes data 462 to data 474. In this advertisement information, as shown in data 462, the maker ID "maker id" is "mk10006," the advertisement information ID "advertisement id" is "ad101," the title "title" is "Restaurant Alish," the start time "start time" is "8:00:00," the time of completion "end time" is "20:00:00," the starting date "start date" is "1/3/2007" and the date of completion "end date" is "30/3/2007." Here, the start time indicates the time when the advertisement information starts being supplied on a certain day, and the time of completion indicates the time when the advertisement information stops being supplied on a certain day.

In addition, in the advertisement information shown in FIG. 24, as shown in the data 464, the title of reference map additional information "map addition information reftitle" is "Shinagawa building," and the ID of the reference map additional information "id ref" is "location100100." In addition, the data "comment=inside Shinagawa building" indicates that Restaurant Alish, which is the object of advertisement of the advertisement information, is inside the Shinagawa building, which is corresponding map additional information. This comment "inside Shinagawa building" may be displayed together with the advertisement information on Restaurant Alish in the apparatus 20 mounted in a vehicle.

In addition, data 466 to data 474 are data for displaying advertisement information having different contents for each time zone. The data 466 indicates that the text "How about a good value breakfast?!!! Restaurant Alish" is supplied between 8 o'clock and 10 o'clock, as indicated by "content start time=8:00:00, end time=10:00:00."

In the same manner, the data 468 indicates that the text "How about a good value Lunch?!!! Restaurant Alish" is supplied between 10 o'clock and 13 o'clock, as indicated by "content start time=10:00:00, end time=13:00:00." In addition, the data 470 indicates that the text "We have prepared rich courses and are waiting for you!!! Restaurant Alish" is supplied between 13 o'clock and 20 o'clock, as indicated by "content start time=13:00:00, end time=20:00:00."

In addition, the data 472 indicates that the text "How about a cake set for a brief break?!!! Restaurant Alish" is supplied between 13 o'clock and 20 o'clock, as indicated by "content start time=13:00:00, end time=20:00:00." In addition, the data 474 indicates that the text "We do breakfast from 8 in the morning!!! Restaurant Alish" is supplied between 13 o'clock and 20 o'clock, as indicated by "content start time=13:00:00, end time=20:00:00."

Here, the advertisement information that can be effectively used by the user of the vehicle 22 is in some cases different, depending on the time zone. Therefore, advertisement information which follows the change in time is supplied, as described above, and thus, advertisement information having high customer appeal at that time can be supplied to the user of the vehicle 22.

Here, in order to implement the above described supply of advertisement information following the change in time, the information supplying server 10 may transmit only advertisement information corresponding to the transmission time, or an extraction portion for extracting advertisement information in accordance with the time from the advertisement information stored in the storing portion 272 may be provided.

[4] DESCRIPTION OF SECOND EMBODIMENT OF PRESENT INVENTION (Supply of Advertisement Information During Normal Running)

Next, the second embodiment of the present invention is described. In the description of the present embodiment, the object of the apparatus 20 mounted in a vehicle according to the present embodiment is described, and after that, the operation of the apparatus 20 mounted in a vehicle according to the present embodiment is described in detail. Here, the apparatus 20 mounted in a vehicle according to the present embodiment and the configuration of the information supplying server 10 are largely the same as in the description of the first embodiment, and therefore, the difference is emphasized in the description.

[4-1] Object of Second Embodiment of Present Invention

In the first embodiment of the present invention, a system where advertisement information relating to the set destination is supplied to the user of the vehicle 22 in the case where the destination of the vehicle 22 is set is described. However, the user of the vehicle 22 does not necessarily run with a set destination. Accordingly, in the first embodiment of the present invention, advertisement information is sometimes not supplied in the case where the destination of the vehicle 22 is not set.

Therefore, the second embodiment of the present invention is proposed in view of the above described situation. An purpose of the second embodiment of the present invention is to provide advertisement information to the user of the vehicle 22 independent of whether or not a destination has been set. Another purpose of the second embodiment of the present invention is to supply a number of pieces of advertisement information to the user of the vehicle 22 in a predetermined order. In the following, the second embodiment of the present invention having these objects is described in reference to the drawings.

[4-2] Detailed Description of Operation of Second Embodiment of Present Invention The configuration of the information supplying system 1, the information supplying server 10, the apparatus 20 mounted in a vehicle and the roadside device 30 according to the second embodiment of the present invention is largely the same as in the description of the first embodiment, and therefore, description using a function block diagram is omitted. Here, the configuration of map additional information and the advertisement information group are substantially the same as in the description of the first embodiment.

In the present embodiment, each roadside device 30 transmits both area information on an area 32 which is the range of use of each roadside device 30 and area information on an area 32 surrounding the area of use of surrounding roadside devices 30. In the case where roadside device 30A to roadside device 30E, roadside device 30T, roadside device 30U, roadside device 30V and roadside device 30X are arranged as shown in FIG. 10, for example, the roadside device 30A may transmit both area information showing institutions and the state of traffic jams included in the area 32A which is the range of use of the roadside device 30A and area information on area 32B, area 32T, area 32U, area 32V and area 32X, which are the range of use of the roadside device 30B, the roadside device 30T, the roadside device 30U, the roadside device 30V and the roadside device 30X around the roadside area 30A.

Alternatively, each roadside device 30 may transmit area information on an area within a radius of 10 km with the roadside device 30A at the center on the detail level 3, area information on an area within a range of a radius from 10 km to 20 km on the detail level 2, area information on an area within a range of a radius from 20 km to 30 km on the detail level 1, and area information on an area within a radius of 30 km or more on a general level.

Here, the detail level of area information indicates that the higher the value attached, the more detailed the area information is, and the lower the value attached, the vaguer the area information is. The detail level 3, for example, may include all pieces of map additional information relating to the area which is the object, as well as an advertisement information group which corresponds to the map additional information, the detail level 2 may include map additional information showing large-scale institutions included in the area which is the object, and the detail level 3 may include map additional information showing well-known institutions included in the area which is the object, as well as an advertisement information group which corresponds to the map additional information.

Accordingly, the information acquiring portion 268 of the apparatus 20 mounted in a vehicle according to the present embodiment acquires the map additional information showing a certain institution before the vehicle 22 passes close to the institution, as well as the advertisement information group which corresponds to the map additional information, and the recording portion 270 can record the map additional information and the advertisement information group acquired by the information acquiring portion 268 in the storing portion 272.

The apparatus 20 mounted in a vehicle according to the present embodiment is different from the first embodiment mainly in that the location determining portion 274 determines whether or not the vehicle 22 has arrived at the advertisement display location which corresponds to the map additional information showing the neighborhood where the vehicle 22 is running, independent of the destination, for example, and the selection portion 278 selects advertisement information which corresponds to the map additional information showing the neighborhood where the vehicle 22 is running, independent of the destination, for example. In the following, this is described in detail.

When the location of the vehicle 22 is estimated on the basis of the radio waves for finding the location received from a GPS satellite, the location determining portion 274 determines whether or not the estimated location has become the advertisement display location indicated by any one piece of information on the advertisement display location which is recorded in the storing portion 272. Then, when it is determined that the estimated location has become the advertisement display location indicated by a certain piece of information on the advertisement display location which is recorded in the storing portion 272, the location determining portion 274 notifies the selection portion 278 of the map additional information to which the information on the advertisement display location corresponds.

The selection portion 278 selects the next advertisement information for a certain maker on the basis of advertisement information for the maker previously displayed on the display portion 24 from the advertisement information group corresponding to the map additional information notified by the location determining portion 274. The selection portion 278, for example, holds the advertisement display count indicating advertisement information for a certain maker previously displayed on the display portion 24, and the advertisement information for the maker indicated by the advertisement display count which is increased from this advertisement information display count by one may be selected as the next advertisement information.

In addition, when the location determining portion 274 determines that the estimated location of the vehicle 22 has become the advertisement display location indicated by a certain piece of information on the advertisement display location which is recorded in the storing portion 272, the output control portion 276 carries out control so that the next advertisement information which is selected by the selection portion 278 is displayed on the display portion 24.

In this configuration, the apparatus 20 mounted in a vehicle can supply a sequence of pieces of advertisement information corresponding to certain map additional information in a predetermined order, independent of whether or not the destination is set. Here, a sequence of pieces of advertisement information associated with map additional information may be placed in order so that a certain object of advertisement is advertised step by step.

The sequence of pieces of advertisement information may be placed in order in such a manner that the description gradually shifts from general to detailed, for example in the order: advertisement information generally showing a certain product/advertisement information showing the detail (1) of the product/advertisement information showing the detail (2) of the product/advertisement information showing the detail (3) of the product, or advertisement information generally showing a certain product/advertisement information showing a portion (1) of the product/advertisement information showing a portion (2) of the product/advertisement information showing a portion (3) of the product.

Alternatively, the sequence of pieces of advertisement information may be placed in order so as to have a story. The sequence of pieces of advertisement information may include a number of pieces of advertisement information which are placed in order, for example in the order:

general description of a certain product/purpose of the product/application for the product/effects of the product (sequence of pieces of advertisement information which promote a certain product), historical background on a certain building/anecdote relating to the construction of the building/incidents relating to the building/state of the building at the time (sequence of pieces of advertisement information which promote the building, for example Kinkakuji), general description of a certain music album/introduction of a song 1 included in the album/introduction of a song 2 included in the album/introduction of a song 3 included in the album (sequence of pieces of advertisement information which promote a certain album), the plot of a certain movie/shooting of the movie/impression of the movie/awards won the movie (sequence of pieces advertisement information which promote a certain movie), product 1 (toothpaste) having certain attributes (for example prevention of tooth decay)/product 2 (toothbrush) having the same attributes/product 3 (interdental brush) having the same attributes/product 4 (spray for preventing mouth odor) having the same attributes (sequence of pieces of advertisement information that promote products having a common purpose in sequence), product 1 (television) produced by a certain maker (for example a home electronics maker)/product 2 (PC: Personal Computer) produced by the same maker/product 3 (digital camera) produced by the same maker/product 4 (portable speech sound reproducer) produced by the same maker (sequence of pieces of advertisement information which promote products produced by a certain maker in order).

In addition, though a case where the location determining portion 274 determines whether or not the location of the vehicle that is estimated on the basis of the radio waves for finding the location received from a GPS satellite has become the advertisement display location indicated by any one piece of information on the advertisement display location recorded in the storing portion 272 is described in the above, the present embodiment is not limited to this example. The location determining portion 274, for example, extracts map additional information indicating an institution close to the location of the vehicle 22 which is estimated on the basis of the radio waves for finding the location received from a GPS satellite from the storing portion 272. In addition, the location determining portion 274 may determine whether or not the vehicle 22 has arrived at the advertisement display location indicated by the information on the advertisement display location which corresponds to the map additional information extracted from the storing portion 272.

In addition, the selection portion 278 may select the next advertisement information from the advertisement information group which corresponds to the map additional information extracted from the storing portion 272 by the location determining portion 274, and the output control portion 276 may carry out control so that the next advertisement information selected by the selection portion 278 is displayed on the display portion 24 when the location determining portion 274 determines that the estimated location of the vehicle 22 has become the above described advertisement display location.

Figure 26:
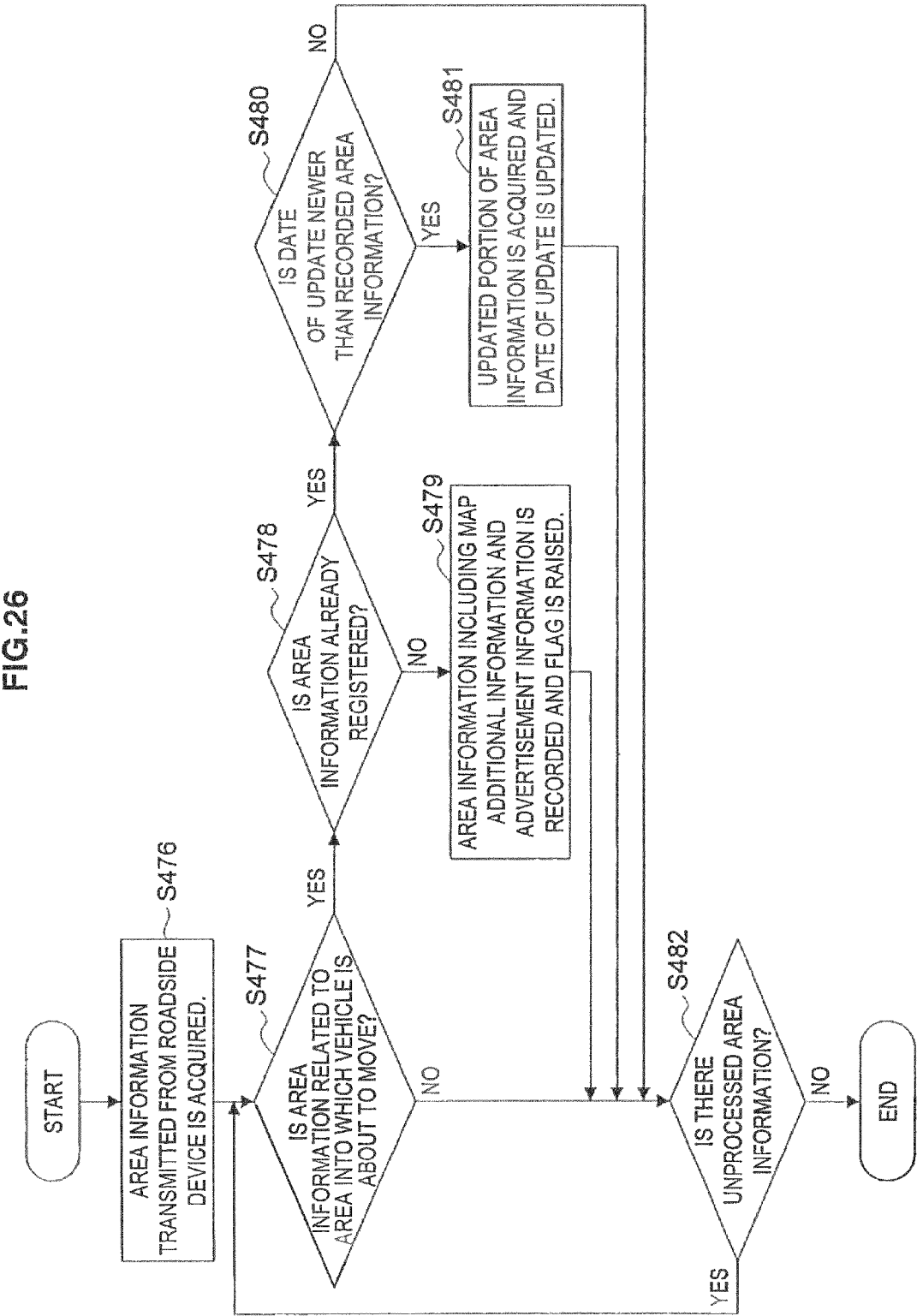
FIG. 26 is a flow chart showing the flow of acquisition and recording of area information transmitted from a roadside device in an apparatus mounted in a vehicle.
Figure 27:
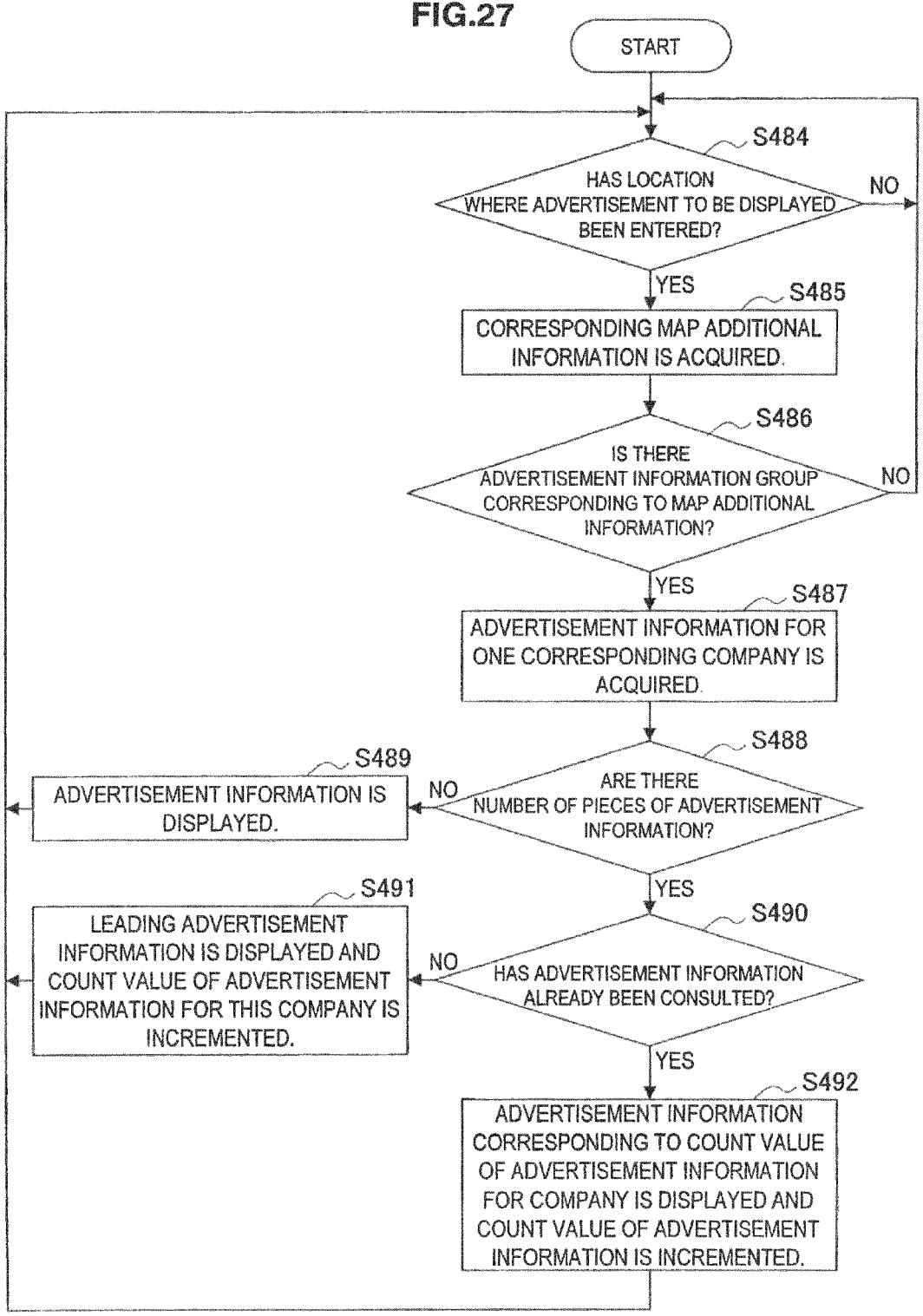
FIG. 27 is a flow chart showing the flow of displays of advertisement information in an apparatus mounted in a vehicle.

The above described operation of the information supplying system 1 and the apparatus 20 mounted in a vehicle according to the present embodiment is organized in reference to FIGS. 25 to 27.

FIG. 25 is a sequence diagram schematically showing the flow in the information processing method used in the information supplying system 1 according to the present embodiment. First, the registering portion 104 of the information supplying server 10 outputs map additional information to the storing portion 108 (S450), and the storing portion 108 stores the map additional information inputted through the registering portion 104 (S452). Subsequently, the information supplying server 10 publishes the map additional information stored in the storing portion 108 to the advertiser's apparatus 14 so that an advertisement who desires to add advertisement information to the map additional information can be invited (S454).

Then, the advertiser's apparatus 14 of the advertiser who gained the right to add advertisement information to the map additional information transmits advertisement information to the storing portion 108 (S456), and the storing portion 108 makes the received advertisement information correspond to the map additional information before storage (S458). After that, the information supplying server 10 registers and updates the information to be displayed which is transmitted by each roadside device 30 (S460). Then, the roadside device 30 transmits the information to be displayed registered and updated by the information supplying server 10 to the apparatus 20 mounted in a vehicle (S462).

Subsequently, the data processing portion 280 of the apparatus 20 mounted in a vehicle outputs the information to be displayed received from the information supplying server 10 via the roadside device 30 to the storing portion 272 (S464), and the storing portion 272 stores this information to be displayed (S466).

Next, when it is determined that the vehicle 22 in which the apparatus 20 is mounted has entered the advertisement display location (S468), the data processing portion 280 requests the corresponding advertisement information from the storing portion 272 (S470), receives the corresponding advertisement information from the storing portion 272 (S472) and displays this advertisement information (S474).

FIG. 26 is a flow chart showing the flow of acquisition and recording of area information (including information to be displayed) transmitted from the roadside device 30 in the apparatus 20 mounted in a vehicle. First, the information acquiring portion 268 acquires area information (as described above, a number of pieces of area information on a number of areas 32) transmitted from a roadside device 30 which can communicate with the information acquiring portion 268 (S476). Subsequently, the information acquiring portion 268 determines whether or not one piece of area information from among those acquired is a piece of area information on the area to which the vehicle 22 is about to go at the time taking the direction in which the vehicle 22 is moving into consideration (S477).

When it is determined that one piece of area information from among those acquired is a piece of area information on the area to which the vehicle 22 is about to go at the time, the information acquiring portion 268 determines whether or not this area information is area information that has been recorded (S478). Then, in the case where it is determined that the area information is not are information that has been recorded, the recording portion 270 records this area information in the storing portion 272 (S479).

Meanwhile, in the case where it is determined that the area information is area information that has been recorded in S478, the information acquiring portion 268 determines whether or not the date when the area information was updated is newer than the date when the area information that has been recorded was updated (S480). When the date when the area information was updated is newer than the date when the area information that is recorded was updated, the recording portion 270 records the updated portion in the storing portion 272, and at the same time, the date of update is updated (S481).

In the case where it is determined that the area information is not area information on the area to which the vehicle 22 is about to go at the time in S477, and in the case where it is determined that the date when the area information was updated is not newer than the date when the area information that is recorded was updated after the process in S479, after the process in S481 or in the S480, the information acquiring portion 268 determines whether or not there is unprocessed area information in the acquired area information (S482). In the case where it is determined that there is unprocessed area information, the procedure returns to the process in S477, and this process is completed when it is determined that there is no unprocessed area information.

FIG. 27 is a flow chart showing the flow of display of advertisement information in the apparatus 20 mounted in a vehicle. First, the location determining portion 274 determines whether or not the vehicle 22 has arrived at the advertisement display location indicated by any one piece of information on the advertisement display location which is recorded in the storing portion 272 (S484). Then, when it is determined that the vehicle 22 has arrived at the advertisement display location indicated by a certain piece of information on the advertisement display location which is recorded in the storing portion 272, the location determining portion 274 acquires the map additional information to which the information on the advertisement display location corresponds, and notifies the selection portion 278 (S485).

Subsequently, the selection portion 278 determines whether or not there is an advertisement information group which corresponds to the map additional information of which it was notified by the location determining portion 274 (S486). Then, when it is determined that there is an advertisement information group which corresponds to the information added to the maps as notified by the location determining portion 274, the selection portion 278 acquires advertisement information for one of the makers included in the advertisement information group (S487). After that, the selection portion 278 determines whether or not there are a number of pieces in the acquired advertisement information (S488), and in the case where the acquired advertisement information is a single piece, this advertisement information is displayed on the display portion 24 under the control of the output control portion 276 (S489).

Meanwhile, in the case where it is determined that the advertisement information acquired in S487 is a number of pieces, the selection portion 278 determines whether or not any pieces of advertisement information from among those acquired have already been supplied (S490). In the case where none of the pieces of advertisement information that have been acquired have yet been supplied, the selection portion 278 selects the advertisement information which is placed first in order, and the value of the advertisement information count for the company is increased by one (S491). The advertisement information which is placed first in order may be, for example, the one to which the advertisement information ID having the smallest value is added. In addition, the value of the advertisement information count may be the advertisement information ID.

Meanwhile, in the case where it is determined that a piece of advertisement information that has been acquired has already been supplied, the selection portion 278 selects the advertisement information which corresponds to the value of the advertisement information count for the company, and the value of the advertisement information count is increased by one (S492). Here, the value of the advertisement information count may indicate advertisement information which is displayed directly before and indicate the advertisement information which is placed next in order after the advertisement information displayed directly before. In addition, according to the present embodiment, a process which is substantially the same as the flow described in reference to FIG. 22 may be carried out.

As described above, in the information supplying server 10 or the apparatus 20 mounted in a vehicle according to the second embodiment of the present invention, the location determining portion 274 determines whether or not the vehicle 22 has arrived at the advertisement display location which corresponds to, for example, the map additional information showing the neighborhood where the vehicle 22 is running, independent of the destination, and the selection portion 278 selects advertisement information which corresponds to, for example, the map additional information showing the neighborhood where the vehicle 22 is running, independent of the destination. Therefore, according to the present embodiment, advertisement information which corresponds to the map additional information indicating an institution in the vicinity of the vehicle 22 in which the apparatus 20 is mounted can be supplied to the user of the vehicle 22 in a predetermined order, independent of whether or not the destination has been set.

[5] DESCRIPTION OF THIRD EMBODIMENT OF PRESENT INVENTION (Supply of Information to be Displayed in Accordance with Preference Information or State of Vehicle)

Next, the third embodiment of the present invention is described. In the description of the present embodiment, the issues with the related art and the effects of the present embodiment are schematically described, and after that, the configuration and the operation of the apparatus 20 mounted in a vehicle and the information supplying server 10 according to the present embodiment are described in detail.

[5-1] Issues with Related Art and Effects of Present Embodiment

Car navigation systems in the past which transmit advertisement information for a certain store to an apparatus mounted in a vehicle which passes through the neighborhood of a region where the store is located so that the advertisement information for the store is displayed in the apparatus mounted in a vehicle have been proposed.

However, apparatuses mounted in a vehicle, which form a car navigation system in the past, display information to be displayed, such as map additional information and advertisement information transmitted to an unspecified large number of apparatuses mounted in a vehicle from an information supplying server. Accordingly, car navigation systems in the past, in some cases, merely supply information to be displayed to the users of the vehicles, which may be unnecessary for the users.

Figure 28:
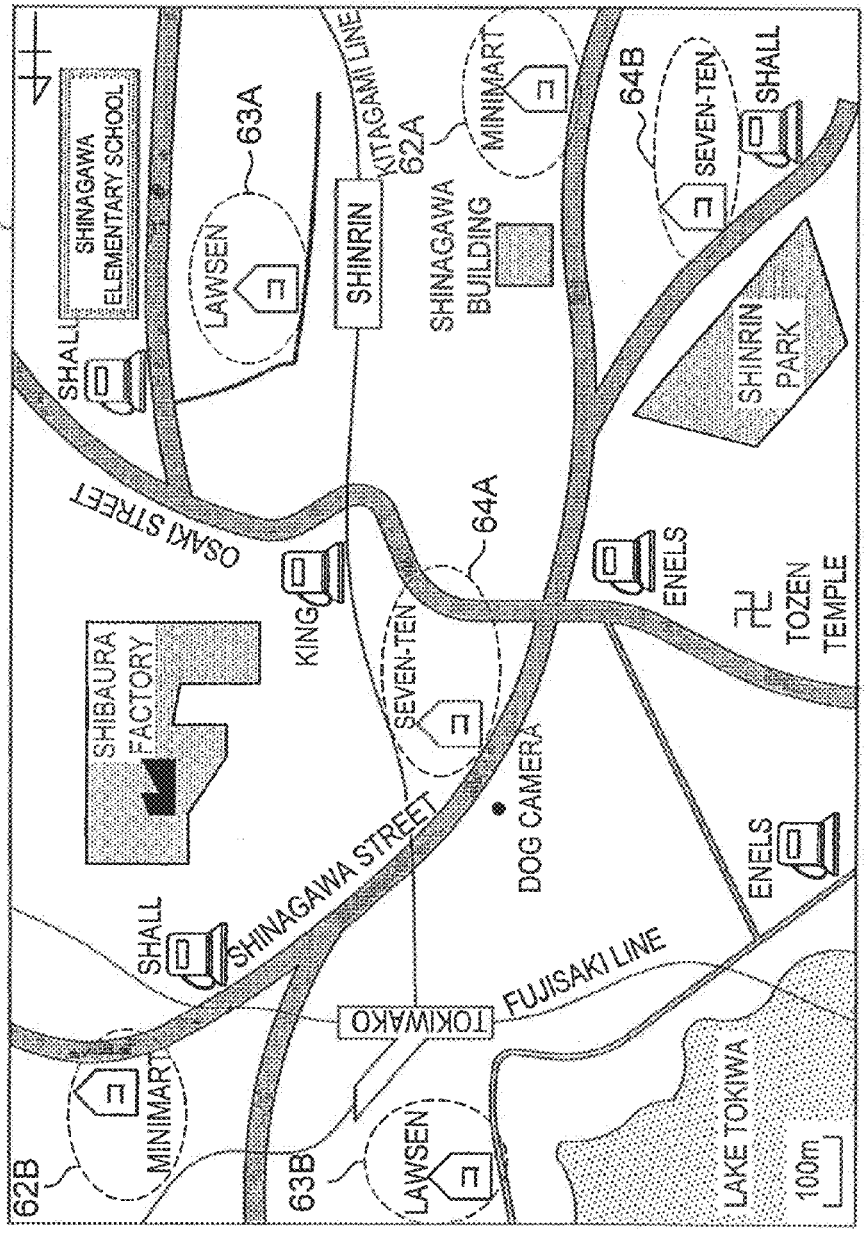
FIG. 28 is a diagram illustrating an example of a screen displayed in an apparatus mounted in a vehicle in a system in the past.

FIG. 28 is a diagram illustrating an example of the map screen displayed on the apparatus mounted in a vehicle in a system in the past. As shown in FIG. 28, a great number of pieces of map additional information showing convenience stores, for example Minimart 62A, Minimart 62B, Lawsen 63A, Lawsen 63B, Seven-Ten 64A and Seven-Ten 64B, are added to a previous map screen. In the case where the user of the vehicle 22 likes Seven-Ten and does not use other convenience stores, map additional information including Minimart 62A, Minimart 62B, Lawsen 63A, Lawsen 63B and the like is unnecessary. Furthermore, it is necessary for the user of the vehicle 22 to extract the map additional information showing Seven-Ten from the map additional information showing a great number of convenience stores, and therefore, this extraction operation is troublesome for the user of the vehicle 22.

In order to avoid this issue, a method for prompting individual users of the vehicle 22 to input necessary preference information, such as map additional information or advertisement information, and providing map additional information or advertisement information in accordance with the preference of the user of the vehicle 22 on the basis of the inputted preference information is possible. However, the input operation of such preference information is very troublesome for the user of the vehicle 22. Furthermore, it is possible that the preference of the user of the vehicle 22 might change as time elapses, and it is not practical to prompt the user to re-input preference information whenever their preference changes.

Thus, in view of the above described situation, the third embodiment of the present invention is proposed. According to the third embodiment of the present invention, the user of the vehicle 22 can supply the information to be displayed in accordance with the travel history or the state of the vehicle 22 at that time. In the following, the configuration and operation of the information supplying server 10 and the apparatus 26 mounted in a vehicle according to the present embodiment are described in detail.

[5-2] Detailed Description of Configuration and Operation of Third Embodiment of Present Invention In the third embodiment of the present invention, as described above, it is possible to supply information to be displayed in accordance with the travel history of the vehicle 22, as well as to supply information to be displayed in accordance with the state of the vehicle 22 at that time. Therefore, in the description of the present embodiment, first, the configuration and operation for supplying information to be displayed in accordance with the travel history (preference information) of the vehicle 22 is described, and after that, the configuration and operation for supplying information to be displayed in accordance with the state of the vehicle 22 at that time is described. Here, the configuration of the apparatus 26 mounted in a vehicle and the information supplying server 10 according to the present embodiment have many portions which are the same as described in the first and second embodiments, and therefore, the description focuses on the differences.

(Supply of Information to be Displayed on Basis of Preference Information)

Figure 29:
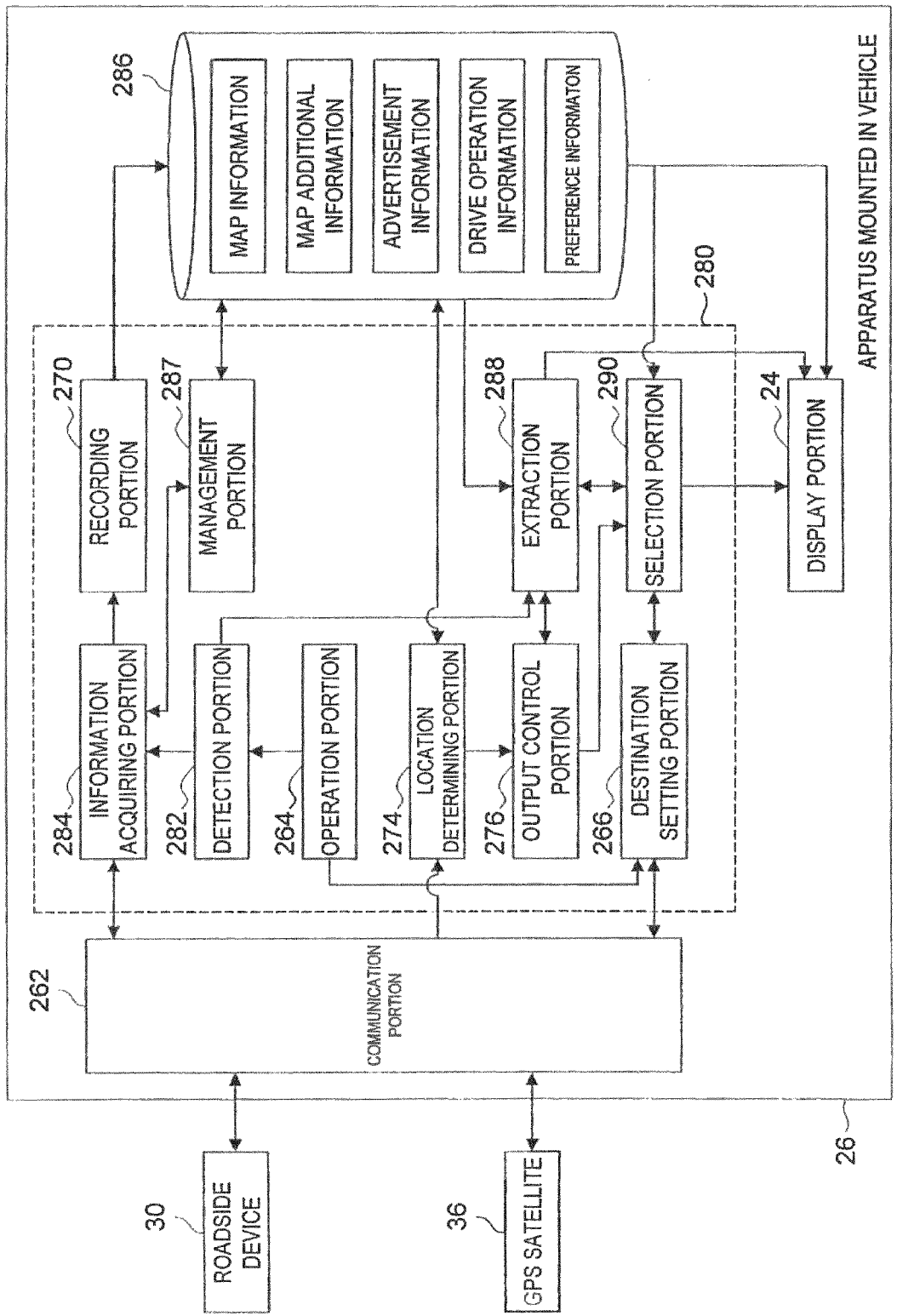
FIG. 29 is a function block diagram showing the configuration of the apparatus mounted in a vehicle according to the third embodiment of the present invention.

FIG. 29 is a function block diagram showing the configuration of the apparatus 26 mounted in a vehicle according to the present embodiment. The apparatus 26 mounted in a vehicle is provided with a communication portion 262, an operation portion 264, a destination setting portion 266, a recording portion 270, a location determining portion 274, an output control portion 276, a detection portion 282, an information acquiring portion 284, a storing portion 286, a management portion 287, an extraction portion 288, a selection portion 290 and a display portion 24.

The detection portion 282 detects a predetermined process carried out by the vehicle 22 and the state of the vehicle, including the state of operation of the vehicle 22 and the state of the environment. A process for stopping the engine, a process for operating the windshield wipers, a process for opening and closing the window, a process for switching gears, a process for turning on the blinkers, a process for automatic settlement and a process for setting the destination of the vehicle 22 can be cited as predetermined processes carried out in the vehicle 22.

In addition, the speed at which the vehicle 22 is being driven, the state of operation of the windshield wipers, the state of use of the brakes, the state of use of the horn, the state of use of the power windows, the state of use of the rear window, the state of use of the lamp inside the vehicle and the like can be cited as the state of operation of the vehicle 22. In addition, the remaining amount of gas in the vehicle 22, the time, the outside temperature, the outside humidity and the like can be cited as the state of the environment of the vehicle 22.

The information acquiring portion 284 acquires information to be displayed including map additional information and advertisement information from the information supplying server 10 through the roadside device 30. In addition, when the detection portion 282 detects a predetermined process, the information acquiring portion 284 according to the present embodiment acquires driving operation information to which a predetermined process, the location information indicating the location where the predetermined process was carried out and the time and date when the predetermined process was carried out correspond. Here, the location information indicating the location where the predetermined process was carried out can be estimated by receiving radio waves for finding a location from a GPS satellite 36.

The recording portion 270 records information to be displayed and driving operation information acquired by the information acquiring portion 284 in the storing portion 286. In addition, the recording portion 270 records the below described preference information acquired by the information acquiring portion 284 in a memory medium.

In addition, the information acquiring portion 284 periodically acquires preference information from the driving operation information recorded in the storing portion 286. Specifically, the information acquiring portion 284 may retrieve map additional information which is to be added to the location shown by the location information included in the driving operation information from the information supplying server 10 or from the map additional information recorded in the storing portion 286, and thus, acquire the title of the retrieved map additional information as preference information. Here, both the driving operation information and the preference information can specify an institution in the location where a predetermined process is carried out, and therefore, it is appropriate to express these as institution information and express the information acquiring portion 284 for acquiring the driving operation information as an institution information acquiring portion.

Figure 30:
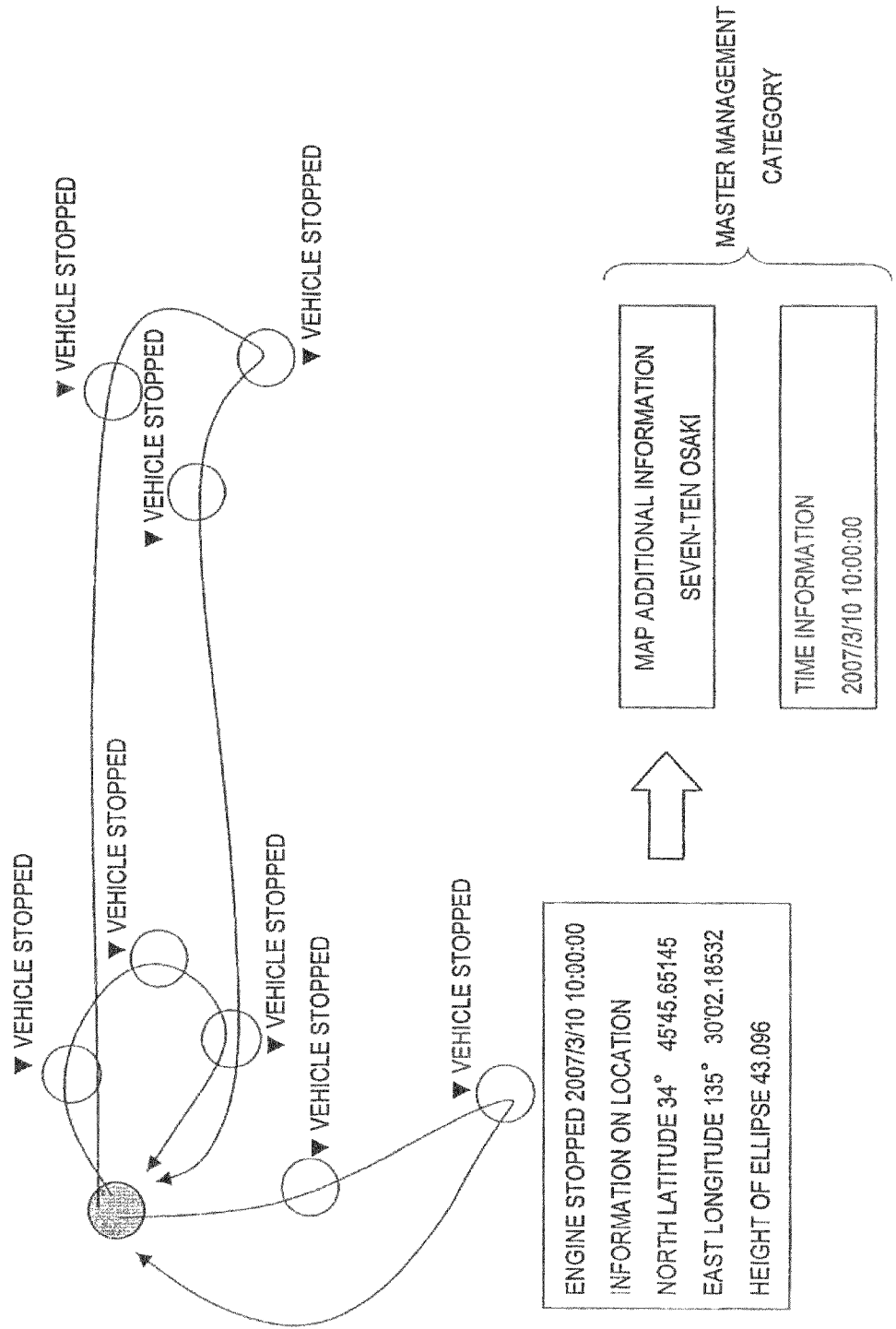
FIG. 30 is a diagram illustrating the flow of acquisition of drive operation information and preference information.

FIG. 30 is a diagram illustrating the flow for acquiring the driving operation information and the preference information. When the engine of the vehicle 22 is stopped and the vehicle is parked, the detection portion 282 detects the process for stopping the engine and the information acquiring portion 284 acquires the location information where the engine is stopped, as well as the time and date as the driving operation information. FIG. 30 shows driving operation information indicating that the time and date when the engine is stopped is "10:00:00 10/3/2007" and the location where the engine is stopped is "north latitude 34° 45'45.65145, east longitude 135° 30'02.18532, height of ellipsis: 43.096."

In addition, the information acquiring portion 284 acquires preference information, for example "Seven-Ten Osaki, 10:00:00 10/3/2007," on the basis of the location information included in the driving operation information. It is considered that the user of the vehicle 22 in many cases stops the engine in front of the used institution. Accordingly, it is appropriate to handle this preference information indicating the institution where the engine is stopped as the information showing the preference of the user of the vehicle 22.

Figure 31:
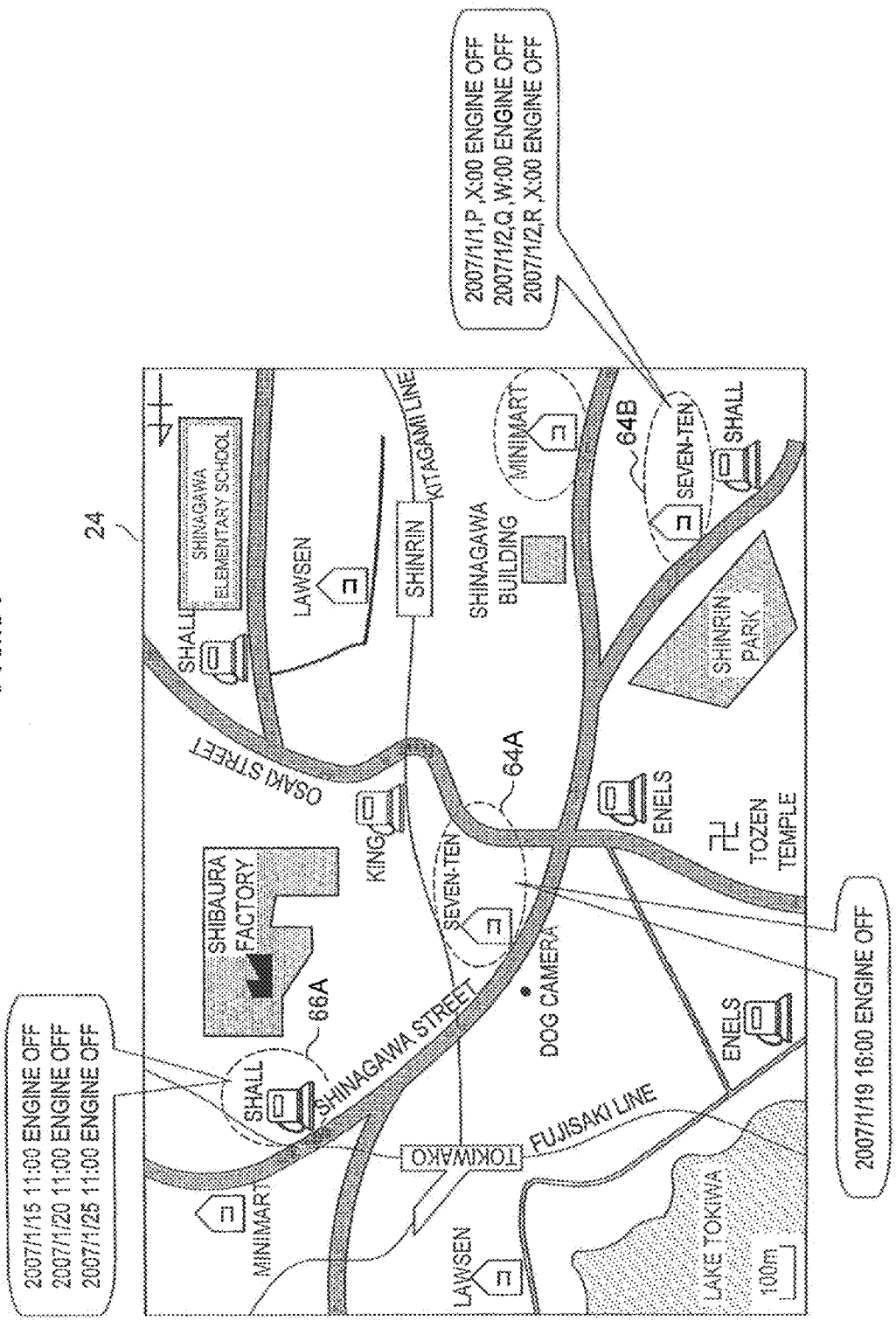
FIG. 31 is a diagram schematically illustrating the contents of drive operation information recorded in a storing portion.

FIG. 31 is a diagram schematically showing the driving operation information recorded in the storing portion 286. FIG. 31 shows that driving operation information indicating that the engine of the vehicle 22 was stopped at Seven-Ten 64A at "16:00 19/1/2007," at Seven-Ten 64B at "91:00 11/1/2007," "8:00 22/1/2007" and "9:00 23/1/2007," and at Shall 66A at "11:00 15/1/2007," "11:00 20/1/2007" and "11:00 25/1/2007" is stored.

In reference to FIG. 31, the engine of the vehicle 22 is frequently stopped in the vicinity of Seven-Ten, while the engine is not stopped in the vicinity of other convenience stores, such as Lawsen and Minimart. In addition, the engine of the vehicle 22 is stopped in the vicinity of Shall, while the engine is not stopped in the vicinity of other gas stations, such as Enels and King. Under these circumstances, it can be assumed that the user of the vehicle 22 prefers Seven-Ten to other convenience stores, and prefers Shall to other gas stations.

FIG. 32 is a diagram schematically showing the preference information recorded in the storing portion 286. As shown in FIG. 32, the preference information is information to which the name of institutions, the time and the date correspond for each category. Specifically, FIG. 32 shows the preference information relating to convenience stores, and includes such information as "Seven-Ten 9:00 23/1/2007," "Lawsen 18:00 22/1/2007," "Seven-Ten 8:00 22/1/2007," "Seven-Ten 16:00 19/1/2007," "Seven-Ten 11:00 13/1/2007," "Seven-Ten 9:00 11/1/2007," "Seven-Ten 11:00 30/12/2006," "Seven-Ten 11:00 25/12/2006" and "Minimart 11:00 20/12/2006."

FIG. 33 is a diagram illustrating an example of the structure of data on preference information. FIG. 33 shows preference information of which the category is convenience stores, as indicated by the data "category type=convenience store." In addition, the data "content name=Seven-Eleven, point=15" indicates that a predetermined process has previously been carried out fifteen times at Seven-Ten.

In addition, the data "event date=20061225, time=11:00:00" in FIG. 33 indicates that a predetermined process was carried out at Seven-Ten at 11:00:00 on December 25$^{th}$, 2006. Likewise, the data "event date=20061230, time=11:00:00" indicates that a predetermined process was carried out at Seven-Ten at 11:00:00 on December 30$^{th}$, 2006, and the data "event date=20070111, time=09:00:00" indicates that a predetermined process was carried out at Seven-Ten at 9:00:00 on January 11$^{th}$, 2007.

FIG. 34 is a diagram illustrating an example of the structure on other data of preference information. The data "preference id=car00100, car model=BMV" in FIG. 34 indicates that the preference information is the preference information of the vehicle 22 having an ID "car00100," of which the type is "BMV."

In addition, the data "category type=convenience store" in FIG. 34 indicates that preference information relating to convenience stores is described in the following category. In addition, the data "content name=Seven-Eleven, point=15" in FIG. 34 indicates that a predetermined process has previously been carried out fifteen times at Seven-Ten. Likewise, the data "content name=Lawsen, point=3" in FIG. 34 indicates that a predetermined process has previously carried out three times at Lawsen.

In addition, the data "category type=gas station" in FIG. 34 indicates that preference information relating to gas stations is described in the following category. In addition, the data "content name=Shall, point=8" in FIG. 34 indicates that a predetermined process has previously been carried out eight times at Shall. Likewise, the data "content name=Enels, point=1" in FIG. 34 indicates that a predetermined process has previously been carried out once at Enels.

Accordingly, in reference to FIG. 34, the user of the vehicle 22 often uses Seven-Ten from among other convenience stores and often uses Shall from among other gas stations, and therefore, it can be assumed that the user of the vehicle 22 prefers Seven-Ten to other convenience stores and prefers Shall to other gas stations.

Here, though FIGS. 32 to 34 show a case where "Seven-Ten Osaki" and "Seven-Ten Shinagawa," for example, are managed as the same "Seven-Ten," they may be managed independently.

Here, returning to the description of the configuration of the apparatus 26 mounted in a vehicle in reference to FIG. 29, the storing portion 286 stores map information, map additional information, advertisement information, the above described driving operation information, and preference information. This storing portion 286 may be a memory medium, for example a nonvolatile memory, such as an EEPROM or an EPROM, a magnetic disc, for example a hard disc or a disc type magnetic disc, an optical disc, for example a CD-R/RW, a DVD-R/RW/+R/+RW/RAM or a BD (Blue-Ray Disc (registered trademark))-R/BD-RE, or an MO disc, as the storing portion 108 of the information supplying server 10.

In addition, though FIG. 29 shows a single storing portion 286, conceptually or physically different storing portions may be provided depending on the object to be stored, for example a map information storing portion which stores map information, an map additional information storing portion which stores map additional information, advertisement information storing portion which stores advertisement information, a driving operation information storing portion which stores driving operation information and a preference information storing information which stores preference information.

The management portion 287 carries out an updating process on the preference information stored in the storing portion 286. The management portion 287 may delete, for example, the preference information to which the date outside the range of that time to the set time corresponds in the storing portion 286. In this configuration, the preference of the user of the vehicle 22 may change as the time or the season changes, and therefore, the apparatus 26 mounted in a vehicle can allow the preference information following the change in the preference of the user of the vehicle 22 to be stored in the storing portion 286.

Here, the above described set time may be one month, half a year or one year. Alternatively, the management portion 287 may delete the preference information indicating a certain institution in the case where the newest data from among the dates corresponding to the preference information showing the institution which is stored in the storing portion 286 is a date outside the range of a predetermined period starting from that time. That is to say, an institution the user of the vehicle 22 has not visited for a predetermined period of time or longer can be determined as being an institution the user of the vehicle 22 previously preferred by does not prefer at that time, and therefore, the management portion 287 can delete the institution information indicating the institution and follow the change in the preference of the user.

Figure 35:
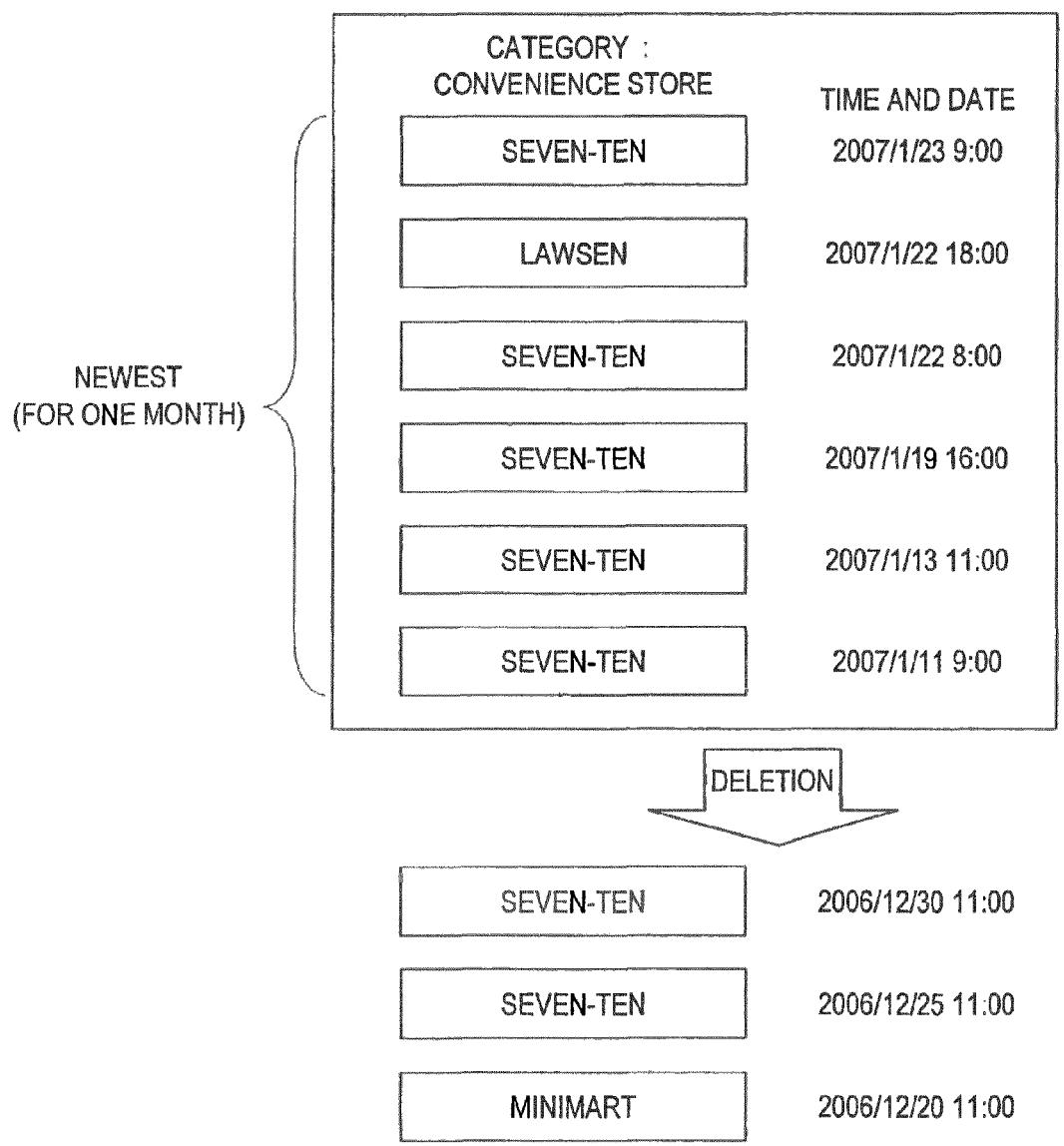
FIG. 35 is a diagram illustrating a specific example of a process in a management portion.

FIG. 35 is a diagram illustrating a specific example of a process in this management portion 287. In the case where the storing portion 286 stores the preference information shown in FIG. 32 and the time is February $1^{st}$, 2007, the management portion 287 deletes the preference information recorded on the basis of the process before January $1^{st}$, 2007, which is, for example, one month earlier, from the storing portion 286, as shown in FIG. 35.

Specifically, in the example shown in FIG. 35, the preference information indicating Seven-Ten to which "1:00 30/12/2006" corresponds, the preference information indicating Seven-Ten to which "11:00 25/12/2006" corresponds and the preference information indicating Minimart to which "11:00 20/12/2006" corresponds are deleted from the storing portion 286 by the management portion 287.

As a result, the storing portion 286 stores preference information on the basis of such processes as stopping of the engine and automatic settlement that were carried out within the preceding month, and therefore, the change can be followed even in the case where the preference of the user of the vehicle 22 changes as the time and season change.

Figure 36:
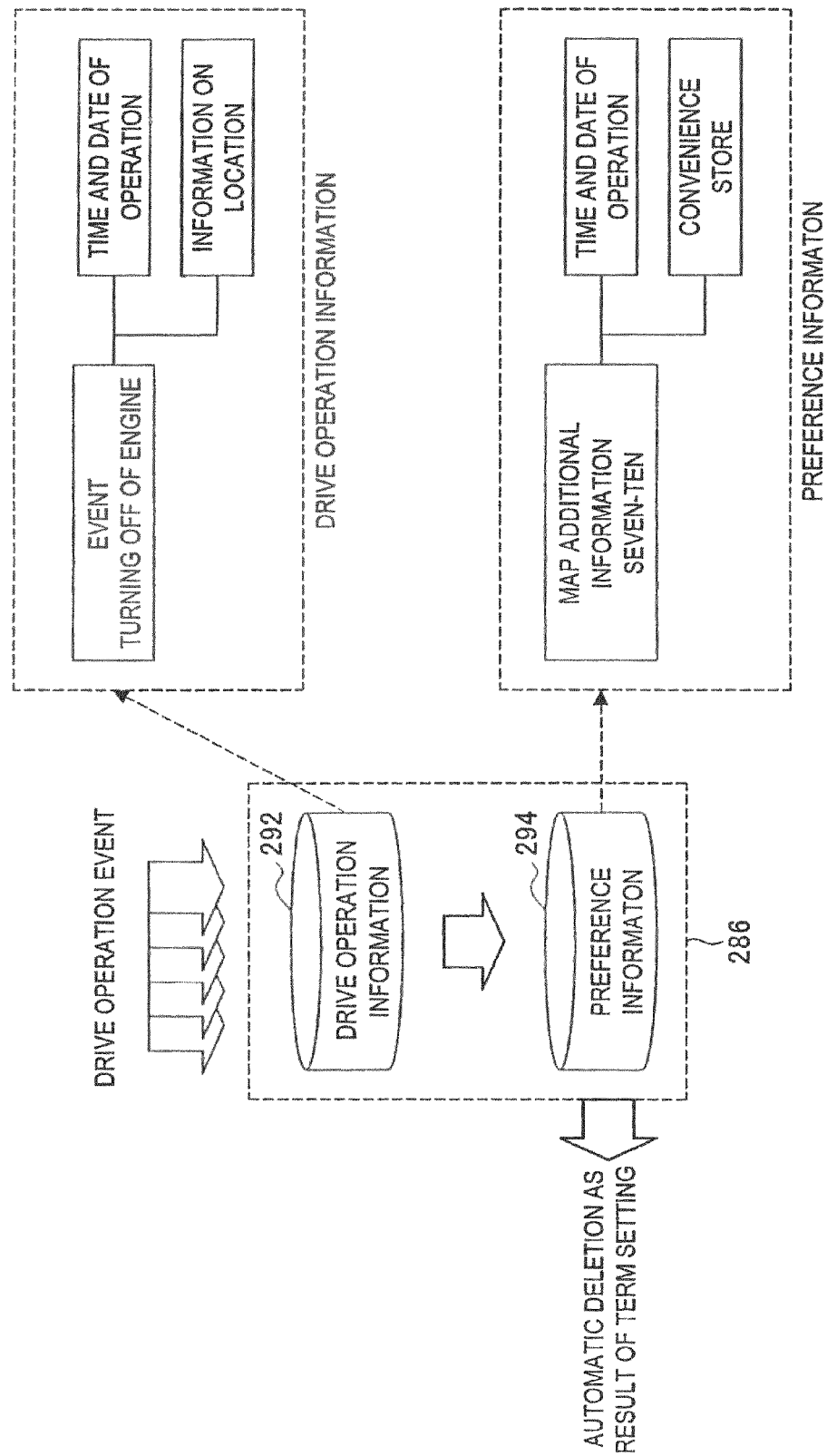
FIG. 36 is a diagram schematically illustrating the flow through which preference information is stored and managed in a storing portion.

FIG. 36 is a diagram schematically showing the flow through which the above described preference information is stored in the storing portion 286 and managed. First, when a driving operation event (a predetermined process) occurs, the detection portion 282 detects the driving operation event and the information acquiring portion 284 acquires the driving operation information relating to this driving operation event. This driving operation information includes information indicating that an event has occurred, for example "engine turned off," the time and date (date) when the event occurred, and location information indicating where the event occurred, and is recorded in the driving operation information storing portion 292.

In addition, the preference information, for example, is periodically acquired on the basis of the drive operation information stored in the drive operation information storing portion 292, and recorded in the preference information storing portion 294. The name of the institution, for example "Seven-Ten," the time and date (date) when an event which triggered acquisition of the preference information occurred, and the category information, for example "convenience store," correspond to this preference information.

In addition, the preference information recorded in the preference information storing portion 294 is automatically and periodically deleted by the management portion 287.

Figure 37:
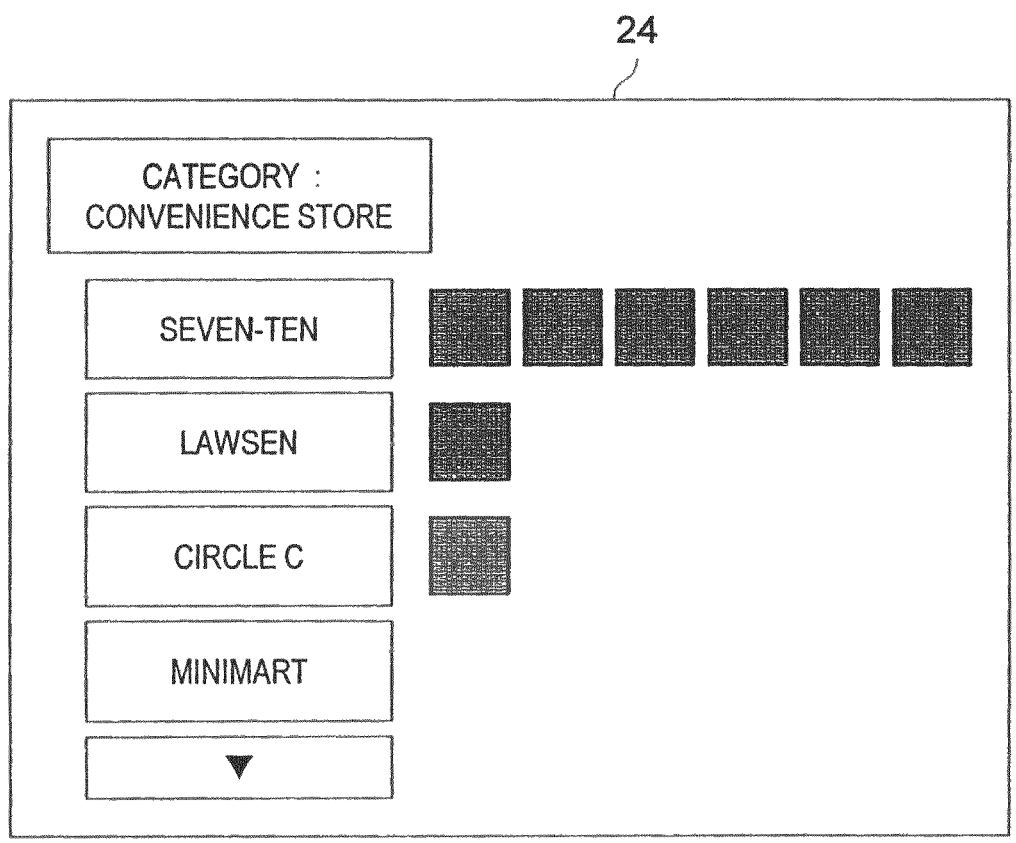
FIG. 37 is a diagram illustrating an example of a screen showing the contents of preference information and displayed in a display portion.

Here, the user of the vehicle 22 can confirm the contents of the preference information recorded in the storing portion 286 via the display portion 24. FIG. 37 shows an example of a display screen showing the contents of the preference information displayed on the display portion 24.

FIG. 37 is a diagram showing an example of a display screen showing the contents of the preference information displayed on the display portion 24. FIG. 37 shows a display screen showing the state of storage of the preference information of which the category is convenience stores. Here, the colored squares in FIG. 37 are indicators which increase as the preference information is stored.

In reference to this display screen, it can be confirmed that the preference information indicating Seven-Ten is stored and a small amount of preference information indicating Lawsen and Circle C is stored, and preference information indicating Minimart is not stored. Here, the display format for the display screen is not limited to the example shown in FIG. 37, and the display may use a pie chart, figures or letters of different sizes showing "Seven-Ten" and "Lawsen," for example.

Here, returning to the description of the configuration of the apparatus 26 mounted in a vehicle in reference to FIG. 29, the extraction portion 288 extracts map additional information or advertisement information relating to an institution indicated by the preference information which is stored in the storing portion 286 and satisfies a predetermined criterion from the map additional information or the advertisement information group recorded in the storing portion 286. Here, the mode can be switched between one where an extraction process is carried out by the extraction portion 288 and one where no extraction process is carried out.

The above described predetermined criterion may be such that the "point" shown in, for example, FIG. 34, is 5 or greater, the "point" is the highest within the same category, or the "point" is higher than the average value. Alternatively, the extraction portion 288 may extract the map additional information or advertisement information relating to the institution indicated by the preference information within the category where the "total points" exceeds a predetermined value on the basis of the "total points" for each category.

In the case where, for example, the "total points" for the category "convenience stores" is 18, the "total points" for the category "gas stations" is "9" and the predetermined value is 12, the extraction portion 288 may extract the map additional information or advertisement information relating to the preference information, such as "Seven-Ten" or "Lawsen" within the category "convenience stores."

In addition, the categories are not limited to "convenience stores" and "gas stations," and may be "hospitals," "parking lots," "department stores," "supermarkets," "schools," "stations," "parks," "amusement parks," "various types of retailers," "restaurants," "banks" and the like.

In addition, map additional information or advertisement information relating to an institution indicated by the preference information which satisfies the predetermined criterion may be map additional information indicating an institution indicated by the preference information which satisfies a predetermined criterion, advertisement information which corresponds to the map additional information or advertisement information for promoting an institution indicated by the preference information which satisfies the predetermined criterion.

In the case where the institution indicated by the preference information which satisfies the predetermined criterion is, for example, "Seven-Ten," the map additional information or advertisement information relating to an institution indicated by the preference information which satisfies a predetermined criterion may be map additional information indicating "Seven-Ten," advertisement information which corresponds to the map additional information indicating "Seven-Ten," advertisement information for promoting "Seven-Ten" and the like.

The output control portion 276 carries out control so that the map additional information extracted by the extraction portion 288 is displayed on the display portion 24. Here, there is a high possibility that the map additional information extracted by the extraction portion 288 may indicate an institution the user of the vehicle 22 prefers, and therefore, in this configuration, the map additional information following the preference of the user of the vehicle 22 can be selectively displayed on the display portion 24. As a result, the number of cases where a large amount of map additional information which is unnecessary for the user of the vehicle 22 is displayed on the display portion 24 can be reduced, and thus, it becomes possible for the user of the vehicle 22 to easily discover and retrieve desired from the screen displayed on the display portion 24.

The selection portion 290 selects the next advertisement information on the basis of the advertisement information previously displayed on the display portion 24 from among the advertisement information extracted by the extraction portion 288. In addition, the selection portion 290 displays the next selected advertisement information on the display portion 24 under the control of the output control portion 276. The function of this selection portion 290 is substantially the same as the content described in the first embodiment, except that the advertisement information which is the object of selection for the next advertisement information is the advertisement information extracted by the extraction portion 288, and therefore, the description thereof is omitted.

Figure 38:
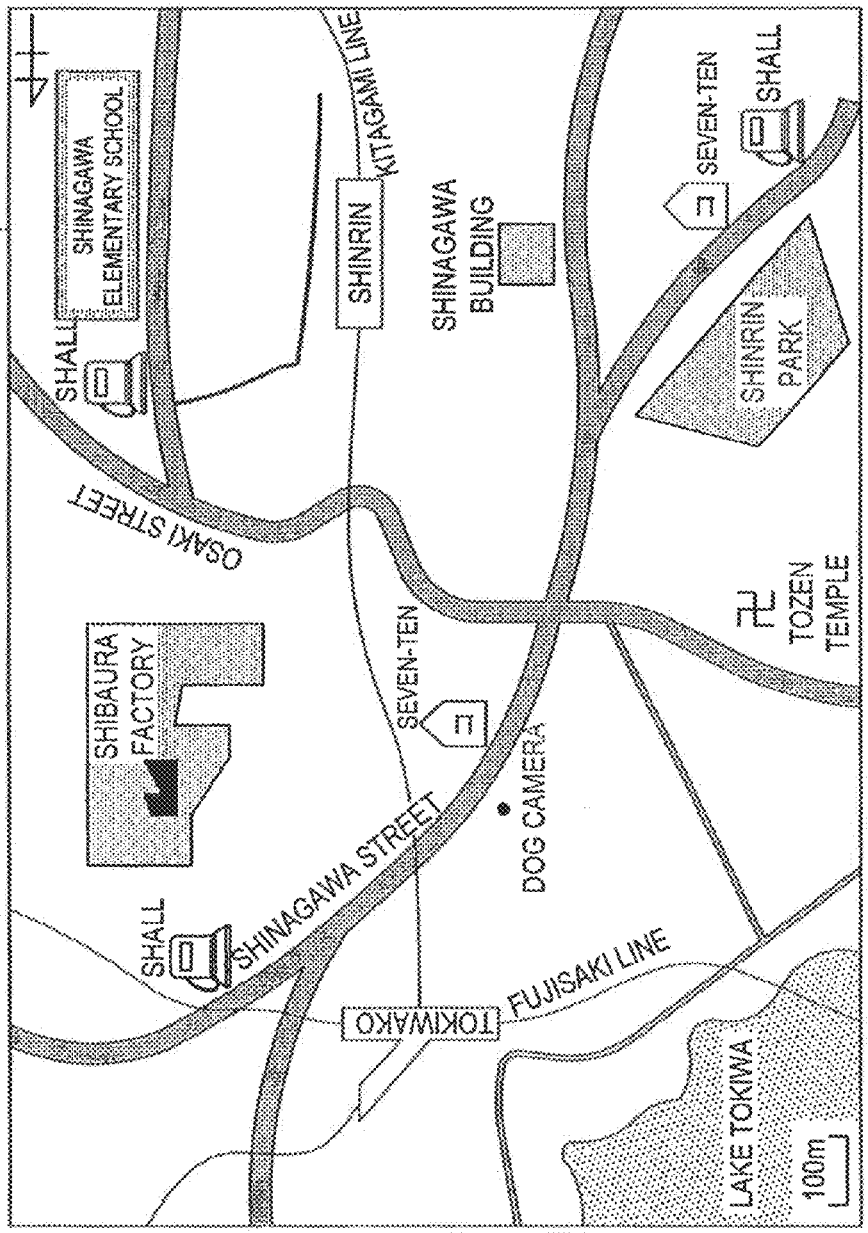
FIG. 38 is a diagram illustrating an example of a screen displayed on the apparatus mounted in a vehicle according to the third embodiment.

In the above described apparatus 26 mounted in a vehicle according to the present embodiment, the display screen shown in, for example, FIG. 38 can be displayed on the display portion 24 without requiring an additional operation by the user of the vehicle 22.

FIG. 38 is a diagram showing an example of a display screen displayed on the apparatus 26 mounted in a vehicle according to the present embodiment. When the display screen displayed in the apparatus mounted in a vehicle in the past shown in FIG. 28 is compared with that in FIG. 38, it can be seen that gas stations, for example "Enels" and "King," as well as convenience stores, such as "Lawsen" and "Minimart" which are included in the display screen displayed on the apparatus mounted in a vehicle in the past shown in FIG. 28 are excluded from the display screen displayed on the apparatus 26 mounted in a vehicle according to the present embodiment shown in FIG. 38.

Accordingly, the user of the vehicle 22 can easily find the map additional information showing "Seven-Ten" and "Shall," which they like, on the display screen displayed in the apparatus 26 mounted in a vehicle without being distracted by other map additional information, such as "Lawsen" or "King."

As can be understood from the above description, the preference information is based on the history of processes in the vehicle 22, and therefore, different depending on the vehicle 22. As a result, there is an apparatus 26 mounted in a vehicle displaying a display screen as that shown in FIG. 38, and there can be an apparatus 26 mounted in a vehicle which generates a display screen as shown in, for example, FIG. 39.

Here, though omitted above, advertisement information relating to "Seven-Ten" and "Shall," which is determined to be the preference of the user of the vehicle 22, is displayed on the apparatus 26 mounted in a vehicle, and advertisement information relating to "Lawsen" and "King," which does not match the preference of the user of the vehicle 22, may not be displayed.

Figure 39:
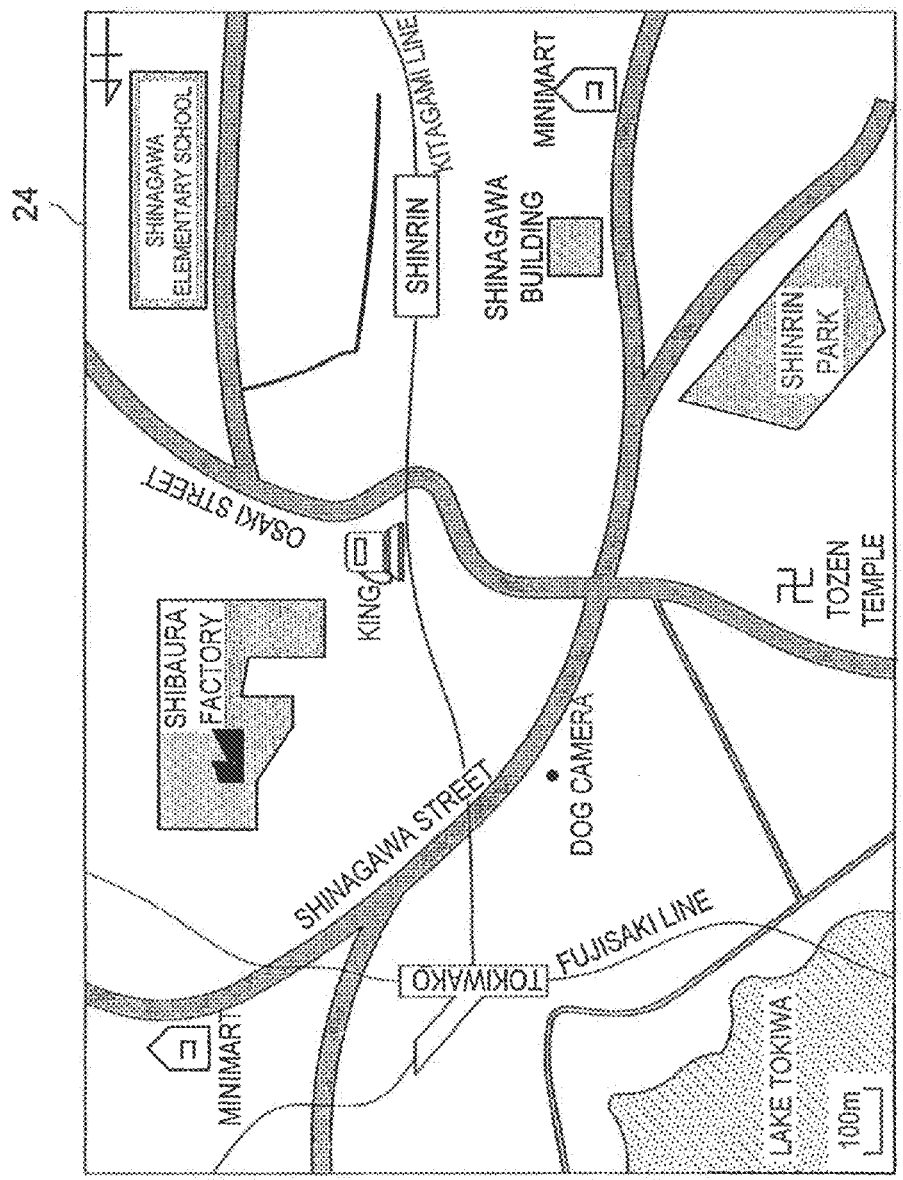
FIG. 39 is a diagram illustrating another example of a screen displayed on the apparatus mounted in a vehicle according to the third embodiment.

FIG. 39 is a diagram showing an example of another display screen displayed in the apparatus 26 mounted in a vehicle according to the present embodiment. When the display screen displayed on the apparatus mounted in a vehicle in the past shown in FIG. 28 is compared with that in FIG. 39, it can be seen that gas stations, for example "Enels" and "Shall," as well as convenience stores, such as "Lawsen" and "Seven-Ten" which are included in the display screen displayed on the apparatus mounted in a vehicle in the past shown in FIG. 28 are excluded from the display screen displayed on the apparatus 26 mounted in a vehicle according to the present embodiment shown in FIG. 39.

Accordingly, the user of the vehicle 22 can easily find the map additional information showing "Minimart" and "King," which they like, on the display screen displayed on the apparatus 26 mounted in a vehicle without being distracted by other map additional information, such as "Lawsen" or "Shall."

Furthermore, in the case where the same user uses a number of different vehicles 22, the preference information storing portion 294 for storing preference information may be formed in such a manner as to be removable from the apparatus 26 mounted in a vehicle, so that the preference information storing portion 294 can be connected to the apparatus 26 mounted in the vehicle 22 used by the user. In the case where the same user uses a number of different vehicles 22 in this configuration, the display portion 24 can display map additional information or advertisement information which matches the preference of the user.

In addition, it is not necessary for the preference information used by the apparatus 26 mounted in a vehicle for processing to be stored by the user of the vehicle 22 in which the apparatus 26 is mounted. A certain publisher may supply preference information which matches a special edition of a magazine, for example, and distribute preference information on well-known people so that a process can be carried out on the basis of the distributed preference information in the apparatus 26 mounted in a vehicle.

Next, the information processing method used in the information supplying system 1 and the apparatus 26 mounted in a vehicle according to the present embodiment is described in reference to FIGS. 40 to 44.

Figure 40:
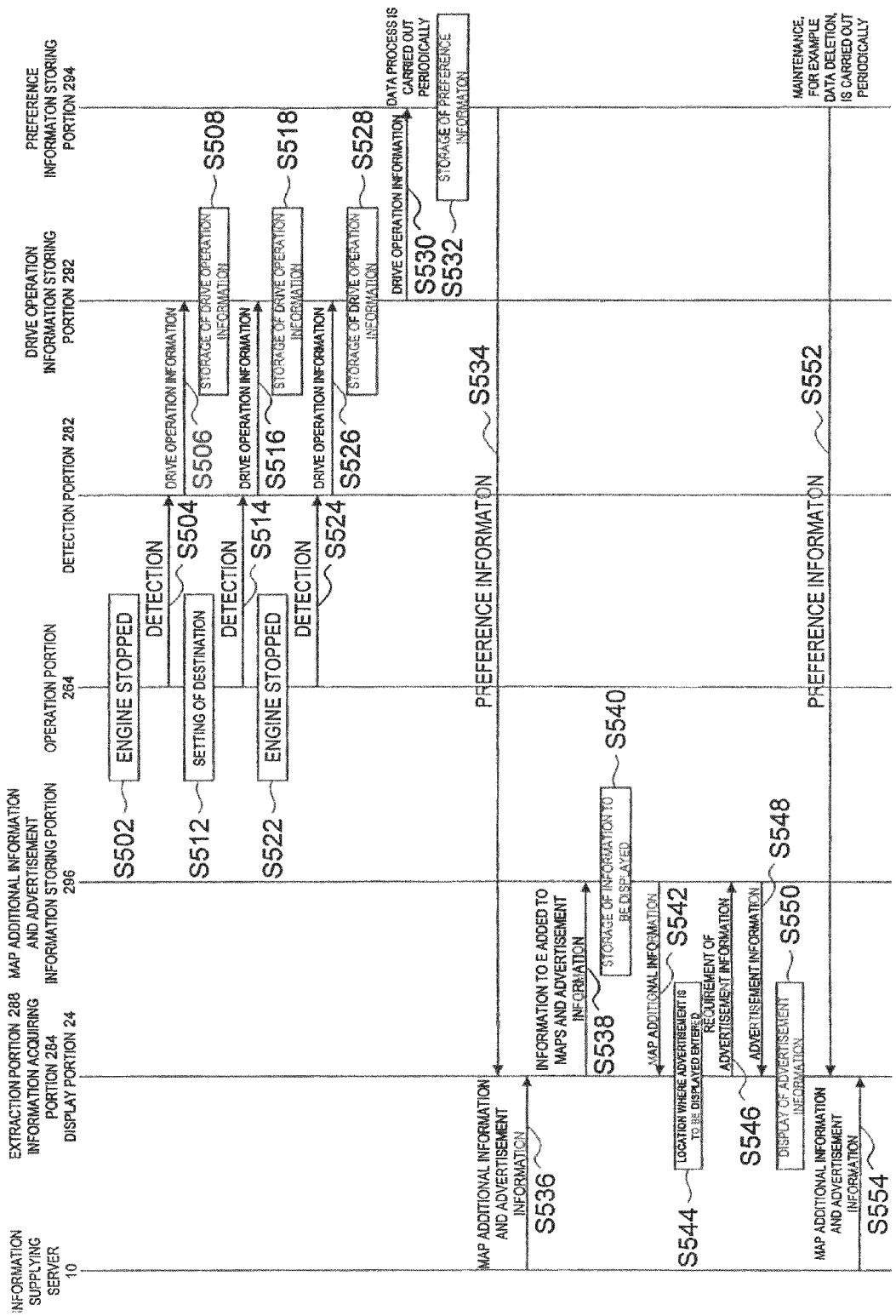
FIG. 40 is sequence diagram showing the flow of the operation of the information supplying system according to the third embodiment.

FIG. 40 is a sequence diagram showing the flow of the operation of the information system 1 according to the present embodiment. First, when an engine stopping operation is inputted into the operation portion 264 (S502), the detection portion 282 detects that the engine has been stopped (S504). Then, the driving operation information acquired by the information acquiring portion 284 is outputted to the driving operation information storing portion 292 (S506) and the driving operation information storing portion 292 stores the driving operation information (S508). Here, in the description, the flow chart shows, for the sake of convenience, that the storing portion 286 is formed in such a manner as to be divided into the driving operation information storing portion 292, the preference information storing portion 294 and the map additional information, and the advertisement information storing portion 296.

Subsequently, when an operation for setting the destination is inputted into the operation portion 264 (S512), the detection portion 282 detects that the destination has been set (S514). Then, the driving operation information acquired by the information acquiring portion 284 is outputted to the driving operation information storing portion 292 (S516) and the driving operation information storing portion 292 stores the driving operation information (S518). Furthermore, when the engine stopping operation is inputted into the operation portion 264 (S522), the detection portion 282 detects that the engine has been stopped (S524). Then, the driving operation information acquired by the information acquiring portion 284 is outputted to the driving operation information storing portion 292 (S526) and the driving operation information storing portion 292 stores the driving operation information (S528).

The driving operation information stored by the driving operation information storing portion 292 is periodically converted to preference information and stored in the preference information storing portion 294 (S530, S532). Then, the preference information stored in the preference information storing portion 294 is outputted to the extraction portion 288 (S534).

Meanwhile, when the information acquiring portion 284 acquires map additional information and advertisement information from the information supplying server 10 (S536), the acquired map additional information and advertisement information are recorded in the map additional information and advertisement information storing portion 296 via the recording portion 270 (S538, S540).

Then, the extraction portion 288 extracts map additional information in accordance with the preference information inputted from the preference information storing portion 294 from the map additional information stored in the map additional information and advertisement information storing portion 296 (S542). After that, when the vehicle 22 arrives at the advertisement display location (S544), the extraction portion 288 requests advertisement information in accordance with preference information from the map additional information and advertisement information storing portion 296 (S546), and advertisement information in accordance with the preference information is outputted from the map additional information and advertisement information storing portion 296 in accordance with the request.

Subsequently, the display portion 24 displays a map screen on which pieces of map additional information gained from the map additional information and advertisement information storing portion 296 overlap and a display screen including advertisement information under the control of the output control portion 276 (S550). After that, the management portion 287 periodically updates the preference information storing portion 294, and the updated preference information is outputted to the extraction portion 288 (S552). In addition, a process in which the information acquiring portion 284 acquires map additional information and advertisement information from the information supplying server 10 is repeated (S554).

Figure 41:
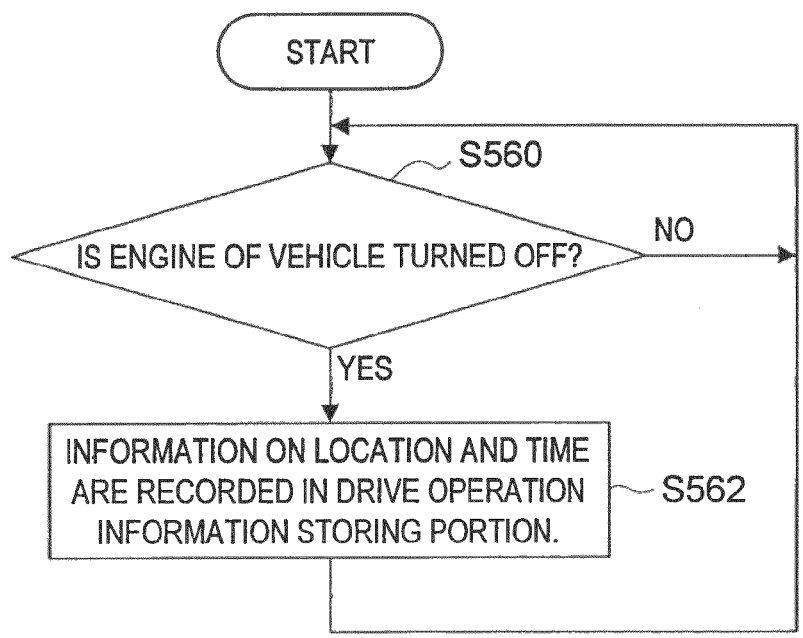
FIG. 41 is a flow chart showing the flow after a predetermined process is carried out in a vehicle and before drive operation information is recorded.
Figure 42:
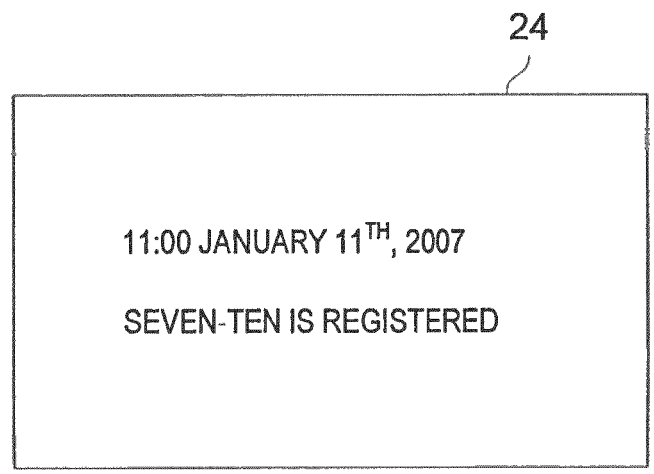
FIG. 42 is a diagram illustrating an example of a screen displayed in the case where drive operation information or preference information is recorded.

FIG. 41 is a flow chart showing the flow after a predetermined process is carried out in the vehicle 22 before the driving operation information is recorded. FIG. 42 is a diagram illustrating an example of the screen displayed in the case where the driving operation information and preference information are recorded. First, the detection portion 282 determines whether or not the engine of the vehicle 22 has been turned off (S560). When the detection portion 282 determines that the engine of the vehicle 22 has been turned off, the information acquiring portion 284 acquires location information indicating the location where the engine was turned off and the driving operation information including the information showing the time when the engine was turned off and the recording portion 270 records the driving operation information in the driving operation information storing portion 292 (S562).

When the driving operation information is recorded in the driving operation information storing portion 292 as described above, the display portion 24 may display a screen showing that new driving operation information is recorded. Here, the user of the vehicle 22 may be notified that the engine was turned off at Seven-Ten at 11 o'clock on January $11^{th}$ 2007, and the driving operation information or preference information to which the information where Seven-Ten and 11 o'clock, January $11^{th}$, 2007 correspond is recorded via the screen, as shown in FIG. 42.

Figure 43:
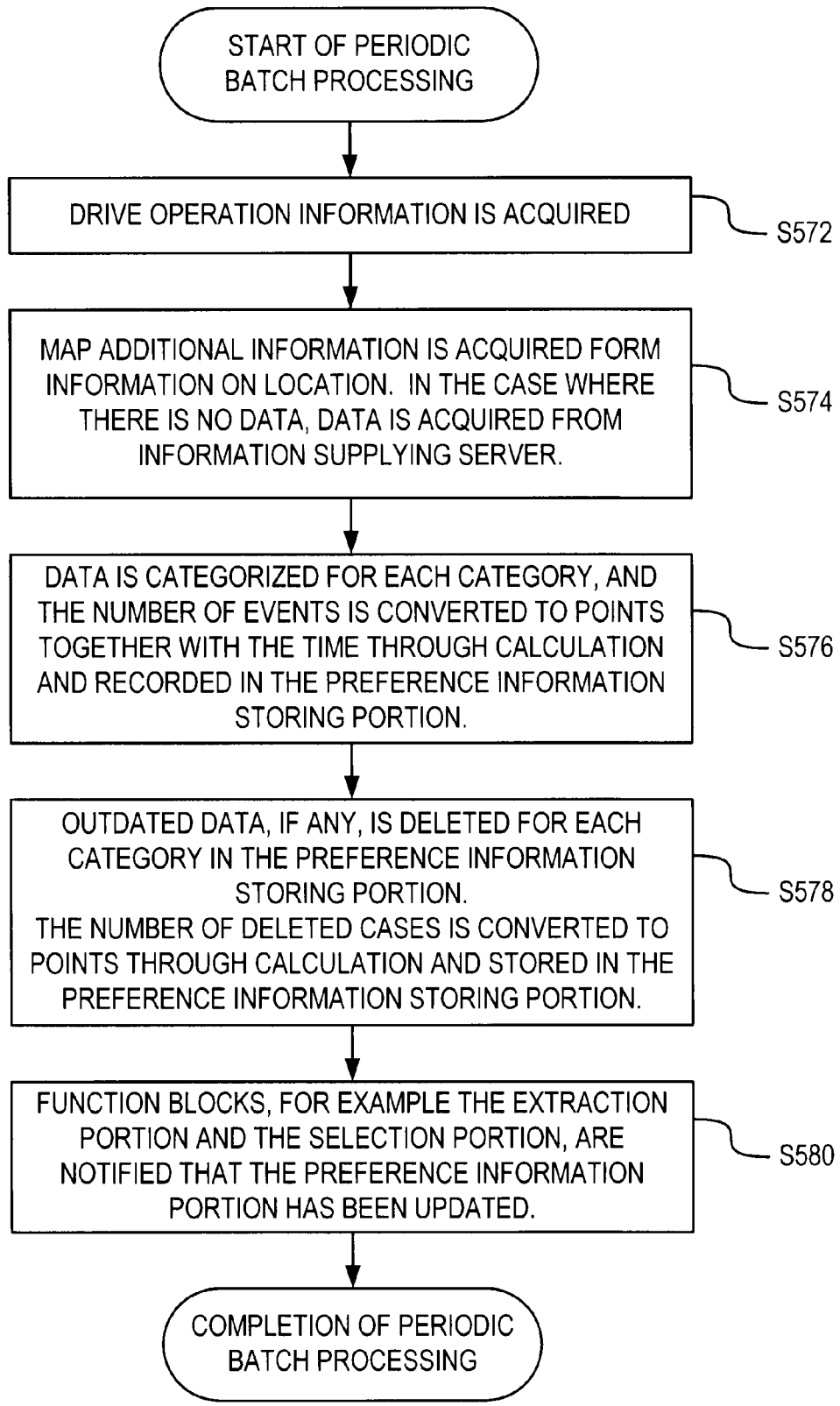
FIG. 43 is a flow chart showing the flow of recording and updating of preference information in an apparatus mounted in a vehicle.

FIG. 43 is a flow chart showing the records and the flow of updating of preference information in the apparatus 26 mounted in a vehicle. First, the information acquiring portion 284 acquires the driving operation information when a predetermined process is carried out in the vehicle 22 (S572). Subsequently, the information acquiring portion 284 acquires map additional information which is added to the location indicated by the location information included in the driving operation information (S574). Here, the information acquiring portion 284 may acquire the map additional information from the map additional information and advertisement information storing portion 296, or from the information supplying server 10.

Then, the recording portion 270 classifies the institutions indicated by the map additional information acquired by the information acquiring portion 284 by category, and records these in the preference information storing portion 294 as preference information together with the time when a predetermined process was carried out (S576). In addition, the recording portion 270 records the number of times a predetermined process was carried out in these institutions in the preference information storing portion 294 as a point.

Subsequently, the management portion 287 deletes preference information to which information showing the date outside the allowed period in the preference information stored in the preference information storing portion 294 corresponds (S578). Here, the allowed period may be different depending on the category of the preference information. In addition, the management portion 287 reflects the number of pieces of deleted preference information in the above described point.

After that, each block, for example the extraction portion 288, the selection portion 290 and the like, is notified that the preference information stored by the preference information storing portion 294 has been updated, and the process is completed (S580).

FIG. 44 is a flow chart showing the flow through which the apparatus 26 mounted in a vehicle displays information to be displayed on the basis of the preference information. First, the extraction portion 288 reads in preference information from the preference information storing portion 294 (S582). Subsequently, the location determining portion 274 determines whether or not the vehicle 22 has entered the advertisement display location (S584).

In the case where it is determined that the vehicle 22 has entered the advertisement display location, it is determined whether or not there is map additional information or advertisement information to which location information where an advertisement is to be displayed indicating the advertisement display location corresponds (S586). In the case where it is determined that there is no map additional information or advertisement information to which location information where an advertisement is to be displayed indicating the advertisement display location corresponds, the procedure returns to the process shown in S584.

Meanwhile, when the extraction portion 288 determines that there is map additional information or advertisement information to which the location information where an advertisement is to be displayed indicating the advertisement display location corresponds, the map additional information and advertisement information storing portion 296 reads in the map additional information or advertisement information to which the location information where an advertisement is to be displayed indicating the advertisement display location corresponds (S588).

Subsequently, the extraction portion 288 determines whether or not the mode for displaying on the basis of the preference information is in effect (turned on) (S590). In the case where the mode for displaying on the basis of the preference information is in effect, the extraction portion 288 extracts the map additional information and advertisement information which match the preference information (S592). Specifically, the extraction portion 288 confirms whether the preference information of which the points are higher than the threshold value within a category and the map additional information and advertisement information match for each category, and extracts map additional information and advertisement information which are determined to match. That is to say, the extraction portion 288 extracts the map additional information and advertisement information relating to the institution showing the preference information of which the points are higher than the threshold value within the category for each category.

After that, the display portion 24 displays a map screen on which pieces of map additional information extracted from the extraction portion 288 overlap and advertisement information selected from the information extracted by the extraction portion 288 by the selection portion 290 (S594).

As described above, the apparatus 26 mounted in a vehicle can acquire preference information on the user of the vehicle 22 from the history of the processes in the vehicle 22 and display the map additional information and advertisement information which match the preference of the user of the vehicle 22 on the basis of the preference information. As a result, the number of cases where a large amount of map additional information and advertisement information which are unnecessary for the user of the vehicle 22 are displayed on the display portion 24 can be reduced, and it becomes possible for the user of the vehicle 22 to easily discover and retrieve desired map additional information from the screen displayed on the display portion 24.

(Supply of Information to be Displayed on Basis of State of Vehicle)

Next, the apparatus 26 mounted in a vehicle which can select the map additional information or advertisement information displayed on the basis of the state of the vehicle, including the state of operation of the vehicle 22 and the state of the environment is described. Here, as described above, the state of operation of the vehicle 22 indicates how the vehicle operates and performs, while the state of the environment of the vehicle 22 shows the environment inside or outside the vehicle 22.

When the state of the vehicle 22 is detected, the detection portion 282 notifies the extraction portion 288 of the detected state of the vehicle. The detection portion 282 detects, for example, that the brakes of the vehicle 22 are being applied and the blinkers of the vehicle 22 are turned on, and detects the outside temperature and the like, and notifies the extraction portion 288 of this. Therefore, though FIG. 29 shows the detection portion 282 as one block, the detection portion 282 may, in reality, include a number of detection portions, for example a brake operation detection portion, a blinker turned on detection portion and an outside temperature sensor.

The extraction portion 288 extracts map additional information and advertisement information in accordance with the state of the vehicle 22 at that time from the map additional information and advertisement information stored in the storing portion 286 on the basis of the state of the vehicle as notified by the detection portion 282. Then, the map additional information extracted by the extraction portion 288, the advertisement information extracted by the extraction portion 288, the advertisement information selected by the selection portion 290 and the like are displayed on the display portion 24 under the control of the output control portion 276.

An example of the information extracted by the extraction portion 288 in accordance with the state of the vehicle 22 is described in reference to FIG. 45.

FIG. 45 is a diagram illustrating an example of the relationship between the state of the vehicle 22 and the map additional information extracted by the extraction portion 288. In the case where the detection portion 282 detects that the gauge of the vehicle 22 indicates that the gas is low or has become of a predetermined value or less, for example, it is possible that the user of the vehicle 22 may desire to fill up the vehicle 22 with gas. Therefore, in the case where the detection portion 282 detects that the gauge of the vehicle 22 indicates that the gas is low or has become of a predetermined value or less, the map additional information indicating gas stations may be extracted from the map additional information stored in the storing portion 286. As a result, the display portion 24 can selectively display the map additional information indicating gas stations where the user of the vehicle 22 may desire to drop in at that time.

In addition, in the case where the detection portion 282 detects that the driving time of the vehicle 22 is long or has exceeded a predetermined time as the state of the vehicle, it is possible that the user of the vehicle 22 may be tired and desire to take a rest. Therefore, in the case where the detection portion 282 detects that the driving time of the vehicle 22 is long or has exceeded a predetermined time as the state of the vehicle, the extraction portion 288 may extract the map additional information indicating cafes from the map additional information stored in the storing portion 286. As a result, the display portion 24 can selectively display the map additional information indicating cafes where the user of the vehicle 22 may desire to drop in at that time.

In addition, in the case where the detection portion 282 detects that the time has become 12 o'clock or 18 o'clock, which are times to have a meal, as the state of the vehicle, it is possible that the user of the vehicle 22 may be hungry and desire to have a meal. Therefore, in the case where the detection portion 282 detects that the time has become 12 o'clock or 18 o'clock, which are times to have a meal, as the state of the vehicle, the extraction portion 288 may extract the map additional information indicating restaurants from the map additional information stored in the storing portion 286. As a result, the display portion 24 can selectively display the map additional information indicating restaurants where the user of the vehicle 22 may desire to drop in at that time.

In addition, in the case where the detection portion 282 detects operation of the windshield wipers in the vehicle 22 as the state of the vehicle, it is possible that it may be raining or the humidity may be high at that time. Therefore, in the case where the detection portion 282 detects operation of the windshield wipers in the vehicle 22 as the state of the vehicle, the extraction portion 288 may extract the map additional information indicating rest areas with a roof and stores from the map additional information stored in the storing portion 286. As a result, the display portion 24 can selectively display the map additional information indicating rest areas with a roof and stores where the user of the vehicle 22 may desire to drop in at that time.

In addition, in the case where the detection portion 282 detects that the brakes are frequently being used in a short period of time in the vehicle 22, there is a possibility that the vehicle 22 may be stuck in a traffic jam. Therefore, in the case where the detection portion 282 detects that the brakes are frequently being used in a short period of time in the vehicle 22, the extraction portion 288 may extract the map additional information indicating stores having a restroom and stores along side roads from the map additional information stored in the storing portion 286. As a result, the display portion 24 can selectively display the map additional information indicating stores having a restroom and stores along side roads where the user of the vehicle 22 may desire to drop in at that time.

In addition, in the case where the detection portion 282 detects that the parking lamp is turned on in the vehicle 22 as the state of the vehicle, there is a possibility that the user of the vehicle 22 may desire to park the vehicle 22. Therefore, in the case where the detection portion 282 detects that the parking lamp is turned on in the vehicle 22 as the state of the vehicle, the extraction portion 288 may extract the map additional information indicating parking lots and stores in the vicinity of the parking lots from the map additional information stored in the storing portion 286. As a result, the display portion 24 can selectively display the map additional information indicating parking lots and stores in the vicinity of the parking lots where the user of the vehicle 22 may desire to drop in at that time.

In addition, in the case where the detection portion 282 detects that the horn is being used in the vehicle 22 as the state of the vehicle, there is a possibility that the user of the vehicle 22 may be tired or irritated. Therefore, in the case where the detection portion 282 detects that the horn is being used in the vehicle 22 as the state of the vehicle, the extraction portion 288 may extract the map additional information indicating cafes and institutions where the user can rest from the map additional information stored in the storing portion 286. As a result, the display portion 24 can selectively display the map additional information indicating cafes and institutions where the user of the vehicle 22 can rest where the user may desire to drop in at that time.

In addition, in the case where the detection portion 282 detects that the power windows are being opened in the vehicle 22 as the state of the vehicle, it is possible that the user of the vehicle 22 may be feeling well. Therefore, in the case where the detection portion 282 detects that the power windows are being opened in the vehicle 22 as the state of the vehicle, the extraction portion on 288 may extract the map additional information indicating faraway stores and sightseeing spots with nice scenery from the map additional information stored in the storing portion 286. As a result, the display portion 24 can selectively display the map additional information indicating faraway stores and sightseeing spots with nice scenery where the user of the vehicle 22 may desire to drop by at that time.

In addition, in the case where the detection portion 282 detects that the rear window is being opened in the vehicle 22 as the state of the vehicle, there is a possibility that a great number of people may be on board in the vehicle 22. Therefore, in the case where the detection portion 282 detects that the rear window is being opened in the vehicle 22 as the state of the vehicle, the extraction portion 288 may extract the map additional information indicating stores which can accommodate a great number of people from the map additional information stored in the storing portion 286. As a result, the display portion 24 can selectively display the map additional information indicating stores which can accommodate a great number of people where the user of the vehicle 22 may desire to drop in at that time.

In addition, in the case where the detection portion 282 detects that the lamp inside the vehicle 22 is turned on as the state of the vehicle, there is a possibility that the user of the vehicle 22 may desire to look for something. Therefore, in the case where the detection portion 282 detects that the lamp inside the vehicle 22 is turned on as the state of the vehicle, the extraction portion 288 may extract the map additional information indicating parking lots and stores where the vehicle 22 can be parked from the map additional information stored in the storing portion 286. As a result, the display portion 24 can selectively display the map additional information indicating parking lots and stores where the vehicle 22 can be parked and the user of the vehicle may desire to drop in at that time.

In addition, in the case where the detection portion 282 detects that the maintenance error lamp in the vehicle 22 is turned on as the state of the vehicle, it is possible that it may be necessary to repair the vehicle 22. Therefore, in the case where the detection portion 282 detects that the maintenance error lamp in the vehicle 22 is turned on as the state of the vehicle, the extraction portion 288 may extract the map additional information indicating dealers and gas stations for the vehicle 22 from the map additional information stored in the storing portion 286. As a result, the display portion 24 can selectively display the map additional information indicating dealers and gas stations for the vehicle 22 where the user of the vehicle 22 may desire to drop in at that time.

In addition, in the case where the detection portion 282 detects that the outside temperature of the vehicle 22 is low as the state of the vehicle, there is a possibility that the user of the vehicle 22 may desire to have warm meal. Therefore, in the case where the detection portion 282 detects that the outside temperature of the vehicle 22 is low as the state of the vehicle, the extraction portion 288 may extract map additional information indicating ramen stands from the map additional information stored in the storing portion 286. As a result, the display portion 24 can selectively display the map additional information indicating ramen stands where the user of the vehicle 22 may desire to drop in at that time.

It is also possible to combine the extraction of the map additional information in accordance with the state of the vehicle by the extraction portion 288 with the extraction of the map additional information on the basis of the above described preference information. In the following, an example of the map additional information selectively displayed on the basis of the state of the vehicle and the preference information is shown in reference to FIG. 46.

FIG. 46 is a diagram illustrating an example of map additional information selectively displayed on the basis of the state of the vehicle and the preference information. FIG. 46A schematically shows a previous screen where the map additional information is not extracted on the basis of the state of the vehicle and the preference information. A1, A2 and A3 in FIG. 46A indicate restaurants, B1 and B2 indicate gas stations, and C1 and C2 indicate convenience stores. As shown in FIG. 46A, in the case where the preference mode (selection display of map additional information on the basis of preference information) is turned off, a great number of pieces of map additional information are displayed, and therefore, it is difficult for the user of the vehicle 22 to find desired map additional information from the displayed map additional information.

Figure 46C:
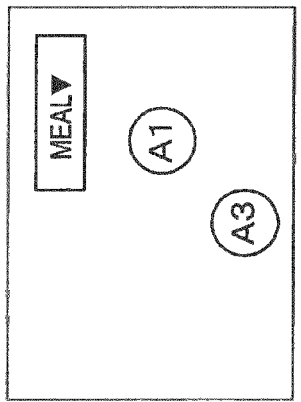
FIGS. 46A-E are diagrams illustrating examples of map additional information selectively displayed on the basis of the state of the vehicle and preference information.
Figure 46D:
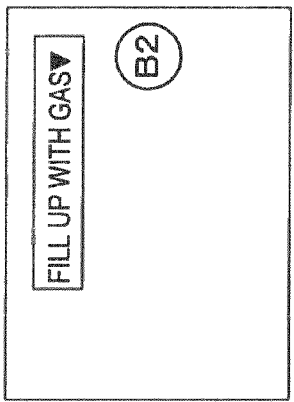
Figure 46E:
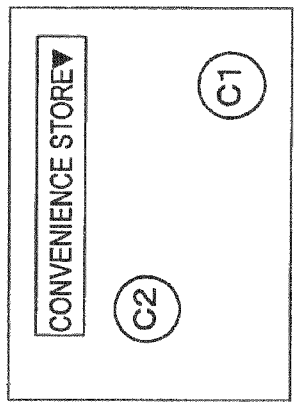
Figure 46B:
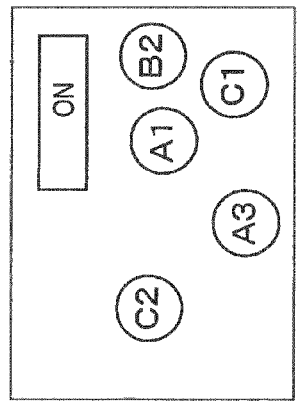
Figure 46A:
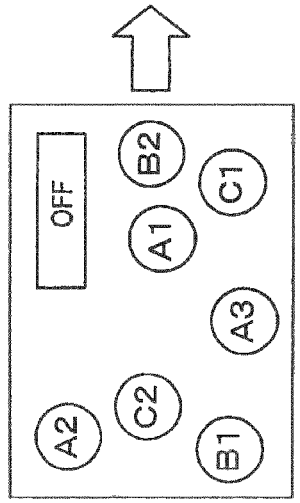

FIG. 46B shows the screen which is displayed in the case where the preference mode is turned on. When FIG. 46B is compared with the previous screen shown in FIG. 46A, the map additional information indicating A2 and B1 is excluded, and therefore, it can be seen that the usability of the vehicle 22 increases.

Furthermore, the apparatus 26 mounted in a vehicle can display a screen where more overlapping map additional information is excluded, as shown in FIGS. 46C to 46E, in accordance with the state of the vehicle 22.

FIG. 46C shows an example where the extraction portion 288 extracts map additional information indicating A1 and A3, which are restaurants, on the basis of the state of the vehicle 22, and the display portion 24 displays the map additional information indicating A1 and A3 under the control of the output control portion 276, for example. In addition, FIG. 46D shows an example where the extraction portion 288 extracts map additional information indicating B2, which is a gas station, on the basis of the state of the vehicle 22, and the display portion 24 displays the map additional information indicating B2 under the control of the output control portion 276. Likewise, FIG. 46E shows an example where the extraction portion 288 extracts map additional information indicating C1 and C2, which are convenience stores, on the basis of the state of the vehicle 22, and the display portion 24 displays the map additional information indicating C1 and C2 under the control of the output control portion 276.

In this manner, the extraction of the map additional information in accordance with the state of the vehicle and the extraction of the map additional information on the basis of the above described preference information are combined, and thus, a smaller number of pieces of map additional information which is effective for the user can be supplied to the user of the vehicle 22.

Here, in the case where the preference mode is turned off and the extraction portion 288 extracts restaurants on the basis of the state of the vehicle 22, the display portion 24 displays the map additional information indicating A1, A2 and A3 under the control of the output control portion 276. In this manner, it is, naturally, possible to turn off the preference mode and supply the information to be displayed on the basis of the state of the vehicle 22.

In addition, a case where the display portion 24 displays the map additional information extracted by the extraction portion 288 and the display portion 24 does not display the map additional information which is not extracted by the extraction portion 288 is described above. As shown in FIG. 47, however, the map additional information extracted by the extraction portion 288 may be distinguished from other map additional information for display.

FIG. 47 is a diagram illustrating an example of a screen displayed on the display portion 24. In further detail, FIG. 47 shows a case where Shall 68A, Shall 68B and Shall 68C from among the gas stations are displayed and Seven-Ten 64A and Seven-Ten 64B from among the convenience stores are displayed as a result of the extraction of the map additional information on the basis of the preference information.

Here, it is assumed that the extraction portion 288 extracts map additional information indicating convenience stores when the driving time of the vehicle 22 becomes long and the time becomes around 12 o'clock. At this time, the output control portion 276 may control the display portion 24 to selectively display the map additional information indicating Seven-Ten 64A and Seven-Ten 64B, which are convenience stores, or as shown in FIG. 47, the map additional information indicating Seven-Ten 64A and Seven-Ten 64B may be displayed in such a manner as to be visually conspicuous, with red letters.

In the same manner, it is assumed that the extraction portion 288 extracts map additional information indicating gas stations when the gauge of the vehicle 22 indicates that the gas is low. At this time, the output control portion 276 may control the display portion 24 to selectively display the map additional information indicating Shall 68A, Shall 68B and Shall 68C, which are gas stations, or as shown in FIG. 47, the map additional information indicating Shall 68A, Shall 68B and Shall 68C may be displayed in such a manner as to be visually conspicuous, with red letters.

Figure 48:
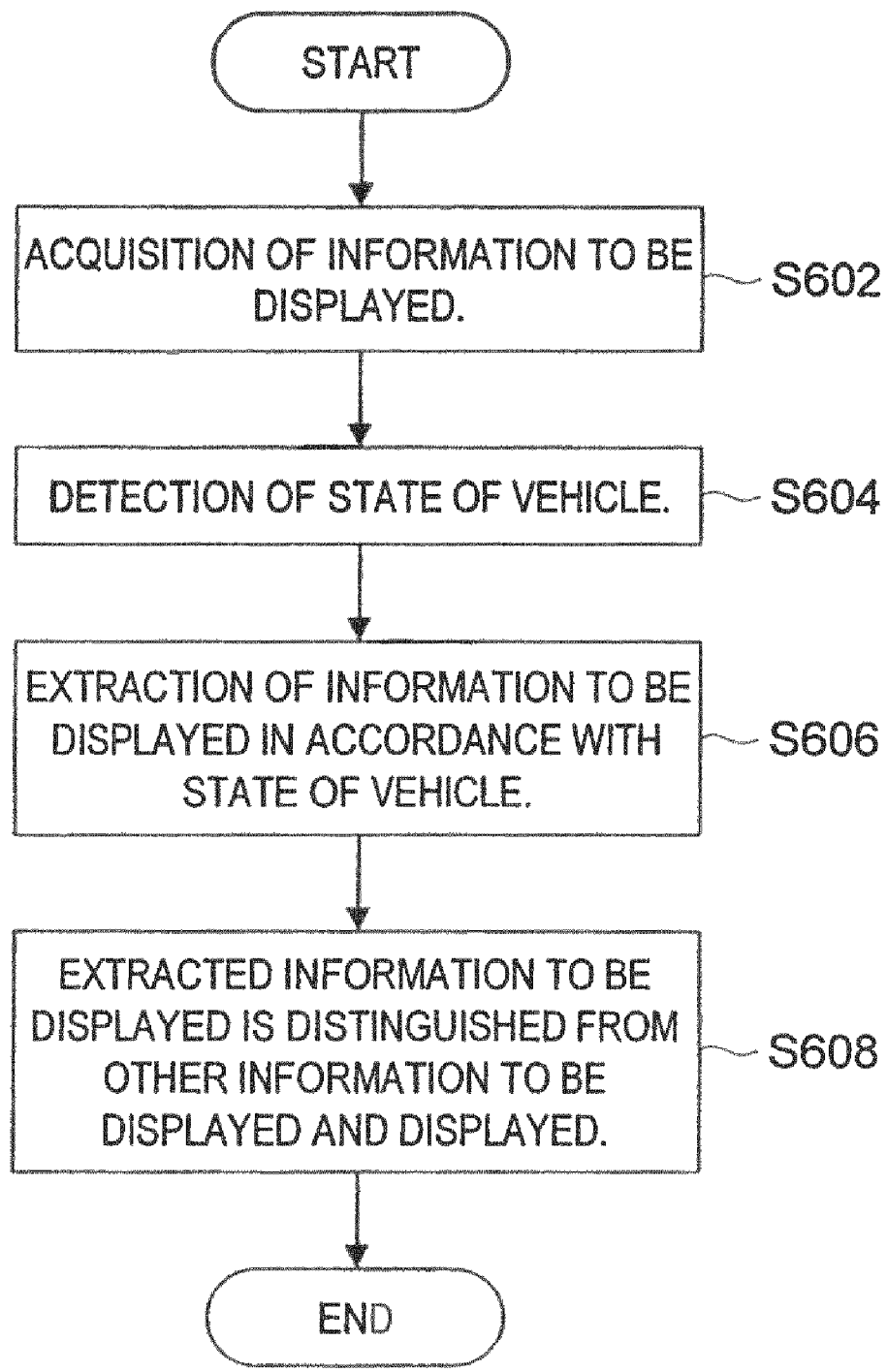
FIG. 48 is a flow chart showing the flow through which information to be displayed is supplied on the basis of the state of a vehicle in an apparatus mounted in a vehicle.

Next, in reference to FIG. 48, the flow of supply of information to be displayed on the basis of the state of the vehicle in the apparatus 26 mounted in a vehicle is described in reference to FIG. 48.

FIG. 48 is a flow chart showing the flow of supply of information to be displayed on the basis of the state of the vehicle in the apparatus 26 mounted in a vehicle. First, the information acquiring portion 284 in the apparatus 26 mounted in a vehicle acquires the information to be displayed, including map additional information and advertisement information, from the information supplying server 10 (S602). Subsequently, the detection portion 282 detects the state of the vehicle 22 in which the apparatus 26 is mounted (S604).

After that, the extraction portion 288 extracts the information to be displayed in accordance with the state of the vehicle from the information to be displayed acquired by the information acquiring portion 284 on the basis of the state of the vehicle extracted by the detection portion 282 (S606). In addition, the display portion 24 distinguishes the information to be displayed extracted by the extraction portion 288 from other information to be displayed for display under the control of the output control portion 276 (S608).

As described above, the extraction portion 288 extracts information to be displayed in accordance with the state of the vehicle 22 and the display portion 24 selectively displays the information to be displayed extracted by the extraction portion 288 under the control of the output control portion 276, or the information to be displayed extracted by the extraction portion 288 is distinguished from other information to be displayed for display, and thus, it becomes possible for the user of the vehicle 22 to efficiently gain the information to be displayed in accordance with the state of the vehicle 22 at that time.

Here, though an example of information to be displayed extracted by the extraction portion 288 is described focusing on the map additional information above, the same process can be carried out on advertisement information. In the case where, for example, the detection portion 282 detects that the gauge of the vehicle 22 indicates that the gas is low, the extraction portion 288 may extract advertisement information for promoting a gas station.

[5-3] Description of Supplementary Matter for Third Embodiment of Present Invention Though a case where the apparatus 26 mounted in a vehicle extracts information to be displayed from the information to be displayed acquired from the information supplying server 10 by the apparatus 26 mounted in a vehicle in accordance with the preference information of the vehicle 22 or the state of the vehicle is described above in the above described third embodiment of the present invention, the present embodiment is not limited to this example. As described in the following in reference to FIG. 47, for example, the information to be displayed may be extracted in accordance with the preference information of the vehicle 22 or the state of the vehicle on the information supplying server 10 side, and the information to be displayed may be extracted by the apparatus 26 mounted in the vehicle 22.

Figure 49:
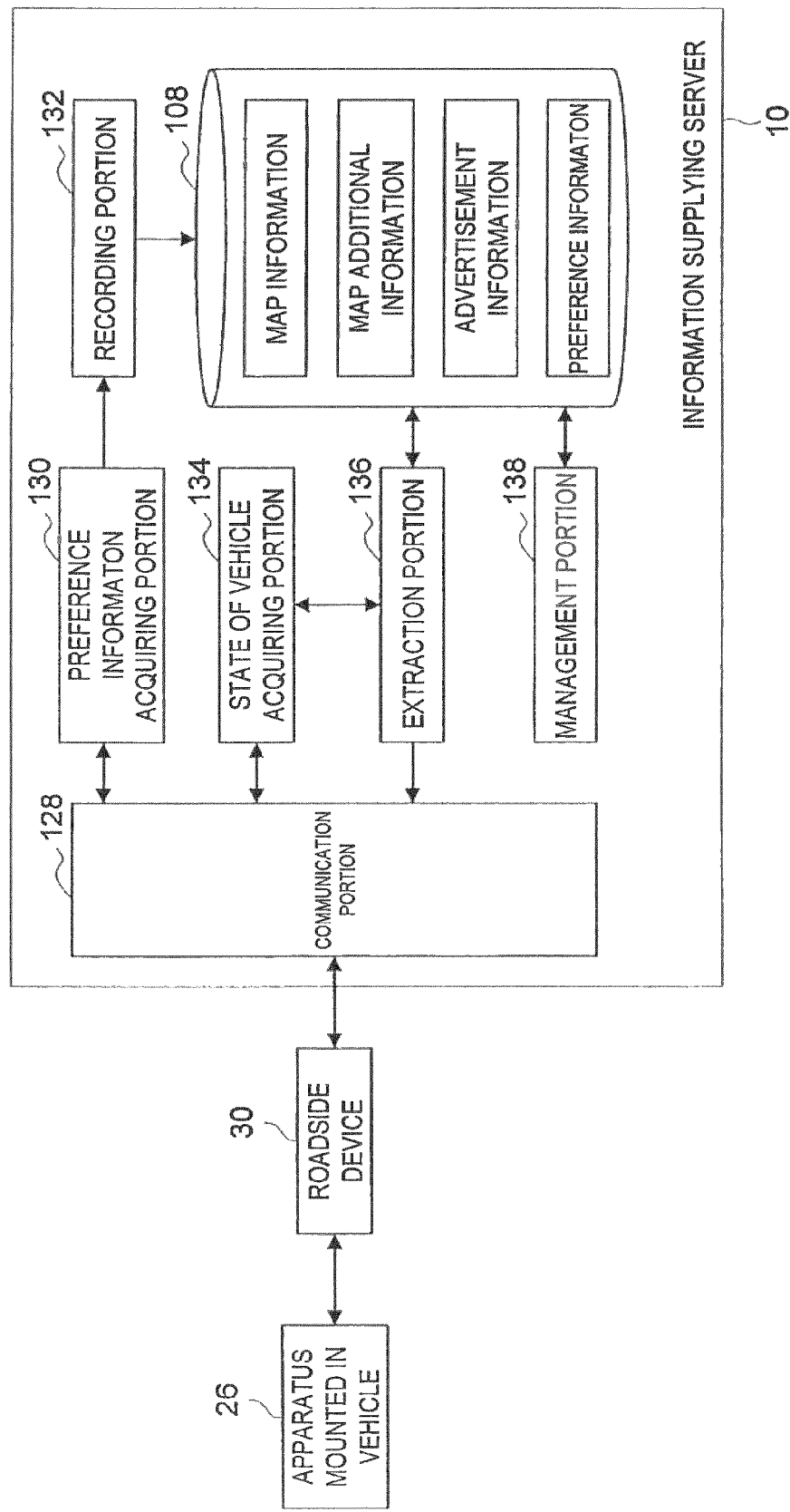
FIG. 49 is a diagram illustrating a modification of the third embodiment.

FIG. 49 is a diagram illustrating a modification of the present embodiment. In this modification, the information supplying server 10 is provided with a storing portion 108, a communication portion 128, a preference information acquiring portion 130, a recording portion 132, a vehicle state detection portion 134, an extraction portion 136 and a management portion 138.

The communication portion 128 is an interface for communicating with the apparatus 26 mounted in a vehicle via a roadside device 30, and functions as a transmission portion and a reception. This communication portion 128 corresponds to the information to be displayed transmitting portion 120 shown in FIG. 4, for example.

The preference information acquiring portion 130 acquires information indicating an institution in a location where a predetermined process was carried out and preference information, with which the date when the process was carried out associated in the case where the process was carried out in the vehicle 22 in which the apparatus 26 is mounted. The detailed configuration of the preference information is substantially the same as in the contents described in reference to FIGS. 32 to 34, and therefore, the description thereof is omitted. The recording portion 132 records the preference information acquired by the preference information acquiring portion 130 in the storing portion 108. Here, the preference information can specify an institution in a location where a predetermined process was carried out in the vehicle 22, and therefore, it is also appropriate to express the preference information as institution information and the information acquiring portion 130 which acquires the preference information as an institution information acquiring portion.

In addition, the vehicle state acquiring portion 134 acquires the state of the vehicle, including the state of operation and the state of the environment of the vehicle 22 in which the apparatus 26 is mounted. The state of the vehicle is substantially the same as in the contents described in the detailed description of the above [5-2] Configuration and operation of third embodiment of present invention (supply of information to be displayed on basis of state of vehicle), and therefore, the description thereof is omitted.

The extraction portion 136 extracts the information to be displayed transmitted to the apparatus 26 mounted in a vehicle from the storing portion 108 on the basis of the preference information recorded in the storing portion 108 and the state of the vehicle acquired by the vehicle state acquiring portion 134. In addition, the transmission portion 128 transmits the information to be displayed extracted by the extraction portion 136 to the apparatus 26 mounted in a vehicle. As a result, in the apparatus 26 mounted in a vehicle, information to be displayed in accordance with the preference information or the state of the vehicle can be supplied to the user of the vehicle 22 without extracting the information to be displayed in accordance with the preference information of the vehicle 22 or the state of the vehicle from the information to be displayed received from the information supplying server 10.

In addition, the management portion 138 carries out a process for updating the preference information stored in the storing portion 108. The management portion 138 may, for example, delete the preference information to which the date outside the range of that time to the set time corresponds from the storing portion 108. In this configuration, the preference of the user of the vehicle 22 may change as the time or season changes, and therefore, the information supplying server 10 can allow the preference information following the change in the preference of the user of the vehicle 22 to be stored in the storing portion 108.

Here, the communication portion 128 determines the roadside device 30 which can communicate with the vehicle on the basis of the probe information that has been uplinked from the vehicle 22 in which the apparatus 26 is mounted, and may transmit the information to be displayed extracted by the extraction portion 136 to this roadside device 30.

[6] DESCRIPTION OF FLOW OF DISPLAY SCREEN WHICH CAN BE APPLIED TO EMBODIMENTS OF PRESENT INVENTION

Next, examples of switching screens displayed on the display portion 24 are described in reference to FIGS. 50 to 52. Specifically, the manner in which a map screen and a screen including advertisement information switch to a detailed screen of the map additional information or advertisement information as well as a manner in which the user retrieves advertisement information or map additional information are described.

Figure 50A:
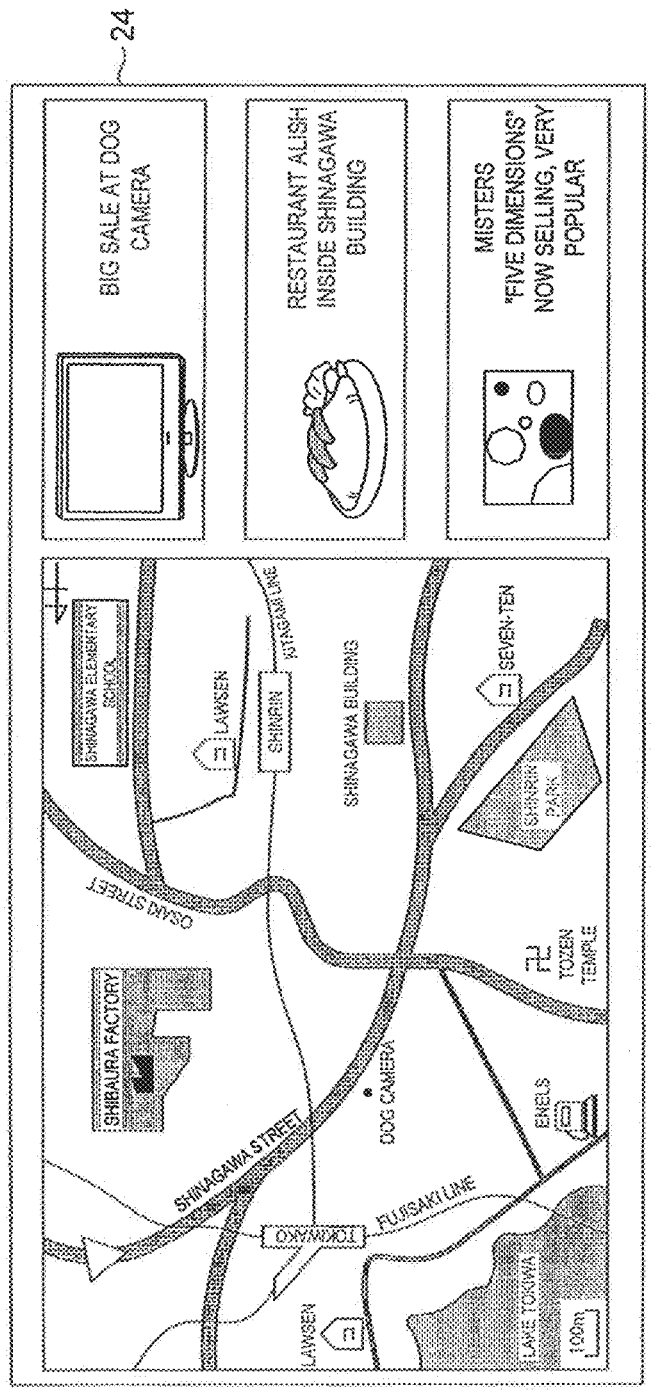
FIGS. 50A-C are diagrams illustrating the manner in which a screen showing map additional information or advertisement information in detail is switched from a map screen and a screen including advertisement information.
Figure 50B:
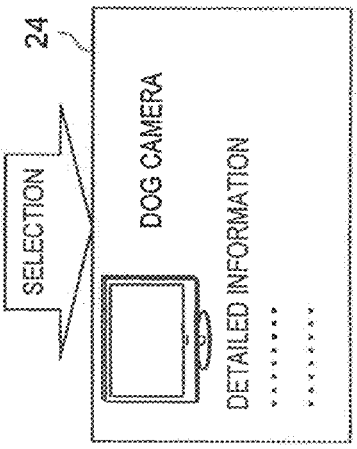

FIG. 50 is a diagram illustrating a manner in which a map screen and a screen including advertisement information switch to a detailed screen of map additional information or advertisement information. When the user of the vehicle 22 selects the desired map additional information, for example, the Shinagawa building, from the map screen and the screen (FIG. 50A) including advertisement information, the detailed screen of the Shinagawa building shown in FIG. 50B can be displayed on the display portion 24.

Figure 50C:
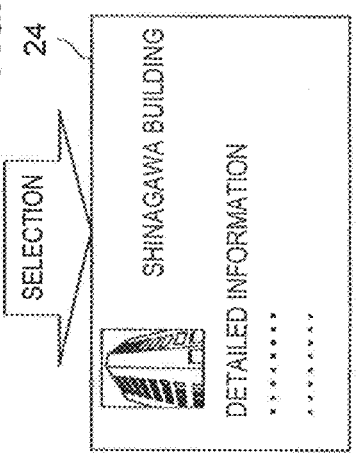

In addition, when the user of the vehicle 22 selects the advertisement information for promoting desired advertisement information, for example, Dog Camera, from the map screen and the screen including advertisement information (FIG. 50A), the detailed screen of the advertisement information for promoting Dog Camera, as shown in FIG. 50C, can be displayed on the display portion 24.

FIG. 51 is a diagram illustrating an example of a screen for retrieving the map additional information and advertisement information. On the screen shown in FIG. 51A, the left column includes the map additional information and the right column includes one or more pieces of advertisement information associated with the map additional information on which the cursor is placed. Specifically, the cursor is placed on the map additional information B, and the right column on the screen includes advertisement information 1-1 to advertisement information 5-1, associated with the map additional information B.

On the screen shown in FIG. 51A, when the cursor is placed on advertisement information 2-1 and the right key is pressed, a screen which includes advertisement information 1-1 to advertisement information 5-1 in the left column and advertisement information 2-1 to advertisement information 2-5 in the right column is displayed on the display portion 24 as shown in FIG. 51B. In addition, when the left key is pressed on the screen shown in FIG. 51B, the screen returns to the one shown in FIG. 51A.

In addition, when the map additional information B is selected on the screen shown in FIG. 51A, the detailed screen of the map additional information B is displayed on the display portion 24 as shown in FIG. 51C. In addition, when the return key is pressed on the screen shown in FIG. 51C, the screen shown in FIG. 51A is displayed. In the same manner, when advertisement information 2-1 is selected on the screen shown in FIG. 51B, the detailed screen of advertisement information 2-1 is displayed on the display portion 24 as shown in FIG. 51D. In addition, when the return key is pressed on the screen shown in FIG. 51D, the screen shown in FIG. 51B is displayed. In addition, it is also possible to switch the detailed screen of advertisement information 2-1 shown in FIG. 51D to the detailed screen of the map additional information B shown in FIG. 51C.

FIG. 52 is a diagram illustrating an example of a screen for retrieving regions and institutions in each region. The screen shown in FIG. 52A includes region 1 to region 4 in the left column and institutions 1 to 5 in region 2 where the cursor is placed on in the right column. When the cursor is placed on institution 2 and the right key is pressed on the screen shown in FIG. 52A, the screen which includes institutions 1 to 5 in the left column and store AAA, store BBB, store CCC, store DDD and store EEE, which are the stores in institution 2 in the right column, is displayed as shown in FIG. 52B. In addition, when the left key is pressed on the screen shown in FIG. 52B, the screen shown in FIG. 52A is displayed.

In addition, when region 2 is selected on the screen shown in FIG. 52A, the detailed screen of region 2 is displayed on the display portion 24 as shown in FIG. 52C. In addition, when the return key is pressed on the screen shown in FIG. 52 C, the screen shown in FIG. 52A is displayed. In the same manner, when institution 2 is selected on the screen shown in FIG. 52B, the detailed screen of institution 2 is displayed on the display portion 24 as shown in FIG. 52D. In addition, when the return key is pressed on the screen shown in FIG. 52 D, the screen shown in FIG. 52B is displayed. In addition, it is also possible to switch the detailed screen of institution 2 shown in FIG. 52D to the detailed screen of region 2 shown in FIG. 52C.

[7] CONCLUSIONS

A number of embodiments of the present invention are described in the above. In the following, the summary and modifications of the above described respective embodiments of the present invention are described.

[7-1] Summary of Effects of Respective Embodiments of the Present Invention

The apparatus 20 mounted in a vehicle according to the first embodiment of the present invention acquires advertisement information and location information, associated with map additional information showing the destination set by the destination setting portion 266, from the information supplying server 10. In addition, the location determining portion 274 determines whether or not the vehicle 22 has arrived at the advertisement display location, indicated by the location information acquired by the information acquiring portion 268, and when the location determining portion 274 determines that the vehicle has arrived at the advertisement output location, the output control portion 276 displays the advertisement information acquired by the information acquiring portion 268 on the display portion 24. Accordingly, the apparatus 20 mounted in a vehicle supplies advertisement information relating to the destination of the user to the user of the vehicle 22, and therefore, the usefulness of the advertisement information for the user of the vehicle 22 can be very high, and the effects of supplying advertisements by the advertisers can be increased.

Furthermore, in the apparatus 20 mounted in a vehicle according to the first embodiment of the present invention, the selection portion 278 selects the next advertisement information to be displayed on the display portion 24 on the basis of the advertisement information previously displayed on the display portion 24. Accordingly, the apparatus 20 mounted in a vehicle according to the present embodiment can supply advertisement information to the user in a predetermined order independent of the route along which the vehicle 22 travels. Therefore, in the case where a number of pieces of advertisement information have a flow sequence, the advertisement information can be supplied to the user of the vehicle 22 in the same order as this flow sequence, and thus, the advertisement can be given high consumer appeal in comparison with the case where each piece of advertisement information is individually or independently supplied.

In addition, in the information supplying server 10 or the apparatus 20 mounted in a vehicle according to the second embodiment of the present invention, the location determining portion 274 determines, for example, whether or not the vehicle 22 has arrived at the advertisement display location which is associated with the map additional information showing the neighborhood where the vehicle 22 is running independent of the destination, and the selection portion 278 selects, for example, advertisement information which associated with the map additional information showing the neighborhood where the vehicle 22 is running independent of the destination. Therefore, according to the present embodiment, the advertisement information associated with the map additional information indicating an institution in the neighborhood of the vehicle 22, in which the apparatus 20 is mounted, can be supplied to the user of the vehicle 22 in a predetermined order independent of selection of a destination.

In addition, the information supplying server 10 or the apparatus 26 mounted in a vehicle according to the third embodiment of the present invention extracts the information to be displayed in accordance with the preference information or the state of the vehicle 22 gained from the travel history of the vehicle 22 in which the apparatus 26 is mounted and displays the extracted information to be displayed selectively on the display portion 24, or distinguishes the extracted information to be displayed from other information to be displayed before displaying on the display portion 24. Therefore, in accordance with the information supplying server 10 or the apparatus 26 mounted in a vehicle according to the present embodiment, the information to be displayed which is assumed desirable for the user of the vehicle 22 can be efficiently supplied to the user of the vehicle 22 without requiring a specific setting operation by the user of the vehicle 22.

[7-2] Description of Modifications of Embodiments of Present Invention

It should be understood by those skilled in the art that various modifications, combinations, sub-combinations and alterations may occur depending on design requirements and other factors insofar as they are within the scope of the appended claims or the equivalents thereof.

Though a case where different pieces of advertisement information are displayed on the display portion 24 in order is described in the above embodiments, for example, the present invention is not limited to these examples. The user of the vehicle 22, in some cases, has a desire to purchase the object of the advertisement in the advertisement information when the same advertisement information is supplied intermittently more often, and therefore, certain advertisement information may be displayed on the display portion 24 more frequently than other advertisement information.

In addition, though the above embodiments are described as an example where the location of the vehicle 22 is estimated using radio waves for finding the location transmitted from a GPS satellite 36, the present invention is not limited to these examples. The apparatus 20 mounted in a vehicle may estimate the location of the vehicle 22 on the basis of any other location estimating technology using, for example, the reception intensity of the radio waves transmitted from a cellular phone or a base station of a PHS.

In addition, it is not necessary for each step in the process in the apparatus 20 mounted in a vehicle, the apparatus 26 mounted in a vehicle and the information supplying server 10 in the present specification to be processed chronologically following the order described in the flow chart or the sequence diagram, and a process which is carried out in parallel or separately (for example, a parallel process or a process by means of an object) may be included. For example, the order of the process in S604 and the process in S602 shown in FIG. 48 may be switched.

In addition, it is possible to prepare a computer program for making hardware, such as a CPU, a ROM and a RAM, built in into the apparatus 20 mounted in a vehicle, the apparatus 26 mounted in a vehicle and the information supplying server 10 function in the same manner as the configuration of each of the above described apparatus 20 mounted in a vehicle, apparatus 26 mounted in a vehicle and information supplying server 10. In addition, a memory medium for storing this computer program is also provided.

In addition, each function block, such as the destination setting portion 266, the information acquiring portion 268, the recording portion 270, the location determining portion 274, the output control portion 276 and the selection portion 278 which are indicated in the function block diagram of FIG. 16, can be made of hardware so that a sequence of processes can be carried out with the hardware. In addition, an integrated circuit for implementing the function of the data processing portion 280, which includes the destination setting portion 266, the information acquiring portion 268, the recording portion 270, the location determining portion 274, the output control portion 276 and the selection portion 278, can be provided. This is the same for the function block diagram of FIG. 29.

What is claimed is:

1. An information supplying system including an apparatus mountable in a vehicle and an information supplying server which can communicate with the apparatus while mounted in a vehicle, comprising:
a detection portion for detecting that a predetermined process is carried out in the vehicle;
an institution information acquiring portion for acquiring institution information indicating an institution in a location where the process is carried out;
a recording portion for recording the institution information acquired by the institution information acquiring portion in a memory medium; and
an extraction portion for extracting information to be outputted relating to an institution indicated by the institution information recorded in the memory medium from information to be outputted, which is recorded in the information supplying server and includes map additional information to be added to maps and advertisement information, the extraction portion (1) determining institution information, of which a recorded number of pieces satisfies a predetermined criterion, from among institution information indicating a same type of institutions recorded in the memory medium, and (2) extracting the information to be outputted relating to the institution indicated by the determined institution information.

2. An apparatus mountable in a vehicle which can communicate with an information supplying server, comprising:
a detection portion for detecting that a predetermined process is carried out in the vehicle;
an institution information acquiring portion for acquiring institution information indicating an institution in a location where the process is carried out;
a recording portion for recording the institution information acquired by the institution information acquiring portion in a memory medium;
an information acquiring portion for acquiring information to be outputted from an information supplying server which stores information to be outputted, including map additional information to be added to maps or advertisement information; and
an extraction portion for extracting information to be outputted relating to an institution indicated by the institution information recorded in the memory medium from the information to be outputted acquired by the information acquiring portion, the extraction portion (1) determining institution information, of which a recorded number of pieces satisfies a predetermined criterion, from among institution information indicating a same type of institutions recorded in the memory medium, and (2) extracting the information to be outputted relating to the institution indicated by the determined institution information.

3. The apparatus according to claim 2, further comprising an output control portion for controlling an output apparatus to output the information to be outputted extracted by the extraction portion.

4. The apparatus according to claim 2, wherein
the recording portion records time information indicating the time when the process is carried out associated with the institution information in the memory medium, and
the apparatus further comprises a management portion for deleting institution information, with which time information indicating the time out of the range from the present time to the set time before is associated in the memory medium.

5. An information supplying server which can communicate with an apparatus mountable in a vehicle, comprising:
  an institution information acquiring portion for acquiring institution information indicating an institution in the location where a predetermined process is carried out in the vehicle;
  a storing portion for storing information to be outputted, which includes map additional information to be added to maps or advertisement information, and the institution information acquired by the institution information acquiring portion;
  an extraction portion for extracting information to be outputted relating to an institution indicated by the institution information recorded in the memory medium from the information to be outputted stored in the storing portion, the extraction portion extracting information to be outputted relating to an institution indicated by the institution information, of which a stored number of pieces satisfies a predetermined criterion from institution information indicating a same type of institutions stored in the storing portion; and
  a transmission portion for transmitting the information to be outputted extracted by the extraction portion to the apparatus.

6. The information supplying server according to claim 5, wherein
  the storing portion stores time information indicating the time when the process is carried out in the vehicle associated with the institution information, and
  the apparatus further comprises a management portion for deleting institution information, with which time information indicating the time out of the range from the present time to the set time before is associated in the storing portion.

7. A tangible computer-readable medium having stored thereon a program, which when executed by a processor, causes a computer to function as an apparatus mountable in a vehicle, which can communicate with an information supplying server, and perform a method comprising:
  detecting that a predetermined process is carried out in the vehicle;
  acquiring institution information indicating an institution in a location where the process is carried out;
  recording the acquired institution information in a memory medium;
  acquiring information to be outputted from an information supplying server which stores information to be outputted, including map additional information to be added to maps or advertisement information; and
  extracting information to be outputted relating to an institution indicated by the institution information recorded in the memory medium from the acquired institution information to be outputted, the extraction portion extracting including (1) determining institution information, of which a recorded number of pieces satisfies a predetermined criterion, from among institution information indicating a same type of institutions recorded in the memory medium, and (2) extracting the information to be outputted relating to the institution indicated by the determined institution information.

8. A tangible computer-readable medium having stored thereon a program, which when executed by a processor, causes a computer to function as an information supplying server, which can communicate with an apparatus mountable in a vehicle, and perform a method comprising:
  acquiring institution information indicating an institution in the location where a predetermined process is carried out in the vehicle;
  recording information to be outputted, which includes map additional information to be added to maps or advertisement information, and the acquired institution information in a memory medium;
  extracting information to be outputted relating to an institution indicated by the institution information recorded in the memory medium from the information to be outputted stored in the memory medium, the extracting including (1) determining institution information, of which a recorded number of pieces satisfies a predetermined criterion, from among institution information indicating a same type of institutions recorded in the memory medium, and (2) extracting the information to be outputted relating to the institution indicated by the determined institution information; and
  a transmission portion for transmitting the information to be outputted extracted by the extraction portion to the apparatus.

9. An information processing method used in an apparatus mountable in a vehicle which can communicate with an information supplying server, comprising:
  detecting that a predetermined process is carried out in the vehicle;
  acquiring institution information indicating an institution in the location where the process is carried out;
  recording the institution information in a memory medium;
  acquiring information to be outputted from an information supplying server which stores information to be outputted, including map additional information to be added to maps or advertisement information; and
  extracting information to be outputted relating to an institution indicated by the institution information recorded in the memory medium from the information to be outputted, the extracting including (1) determining institution information, of which a recorded number of pieces satisfies a predetermined criterion, from among institution information indicating a same type of institutions recorded in the memory medium, and (2) extracting the information to be outputted relating to the institution indicated by the determined institution information.

10. An information processing method in an information supplying server which can communicate with an apparatus mountable in a vehicle, comprising:
  recording information to be outputted, which includes map additional information to be added to maps or advertisement information, in a memory medium;
  acquiring institution information indicating an institution in the location where a predetermined process is carried out in the vehicle;
  recording the institution information in the memory medium;
  extracting information to be outputted relating to an institution indicated by the institution information from the information to be outputted recorded in the memory medium, the extracting including (1) determining institution information, of which a recorded number of pieces satisfies a predetermined criterion, from among institution information indicating a same type of institutions recorded in the memory medium, and (2) extracting the information to be outputted relating to the institution indicated by the determined institution information; and transmitting information to be outputted extracted from the information to be outputted recorded in the memory medium to the apparatus.

11. An information supplying system including an apparatus mountable in a vehicle and an information supplying server which can communicate with the apparatus while mounted in a vehicle, comprising:
   a detection portion for detecting the state of the vehicle, which includes the state of the operation of the vehicle or the state of the environment; and
   an extraction portion for extracting information to be outputted in accordance with the state of the vehicle detected by the detection portion from information to be outputted, which includes map additional information to be added to maps or advertisement information stored in the information supplying server, the extraction portion (1) determining institution information, of which the state of the operation of the vehicle or the state of the environment satisfies a predetermined criterion, and (2) extracting the information to be outputted relating to the institution indicated by the determined institution information.

12. An apparatus mountable in a vehicle which can communicate with an information supplying server, comprising:
   a detection portion for detecting the state of the vehicle, which includes the state of the operation of the vehicle or the state of the environment;
   an information acquiring portion for acquiring information to be outputted from the information supplying server which stores information to be outputted, including map additional information to be added to maps or advertisement information; and
   an extraction portion for extracting information to be outputted in accordance with the state of the vehicle detected by the detection portion from the information to be outputted acquired by the information acquiring portion, the extraction portion (1) determining institution information, of which the state of the operation of the vehicle or the state of the environment satisfies a predetermined criterion, and (2) extracting the information to be outputted relating to the institution indicated by the determined institution information.

13. The apparatus according to claim 12, further comprising an output control portion for controlling the information to be outputted extracted by the extraction portion distinguished from other information to be outputted in an output apparatus when outputted.

14. An information supplying server which can communicate with an apparatus mountable in a vehicle, comprising:
   a vehicle state acquiring portion for acquiring the state of the vehicle, which includes the state of the operation of the vehicle or the state of the environment;
   a storing portion for storing information to be outputted, which includes map additional information to be added to maps or advertisement information;
   an extraction portion for extracting information to be outputted in accordance with the state of the vehicle acquired by the vehicle state acquiring portion from the information to be outputted stored in the storing portion, the extraction portion (1) determining institution information, of which the state of the operation of the vehicle or the state of the environment satisfies a predetermined criterion, and (2) extracting the information to be outputted relating to the institution indicated by the determined institution information; and
   a transmission portion for transmitting the information to be outputted extracted by the extraction portion to the apparatus.

15. A tangible computer-readable medium having stored thereon a program, which when executed by a processor, causes a computer to function as an apparatus mountable in a vehicle, which can communicate with an information supplying server, and perform a method comprising:
   detecting the state of the vehicle, which includes the state of the operation of the vehicle or the state of the environment;
   acquiring information to be outputted from the information supplying server which stores information to be outputted, including map additional information to be added to maps or advertisement information; and
   an extraction portion for extracting information to be outputted in accordance with the detected state of the vehicle from the acquired information to be outputted, the extracting including (1) determining institution information, of which the state of the operation of the vehicle or the state of the environment satisfies a predetermined criterion, and (2) extracting the information to be outputted relating to the institution indicated by the determined institution information.

16. A tangible computer-readable medium having stored thereon a program, which when executed by a processor, causes a computer function as an information supplying server, which can communicate with an apparatus mountable in a vehicle, and perform a method comprising:
   acquiring the state of the vehicle, which includes the state of the operation of the vehicle or the state of the environment;
   recording information to be outputted, which includes map additional information to be added to maps or advertisement information, in a memory medium;
   extracting information to be outputted in accordance with the acquired state of the vehicle from the information to be outputted stored in the memory medium, extracting including (1) determining institution information, of which the state of the operation of the vehicle or the state of the environment satisfies a predetermined criterion, and (2) extracting the information to be outputted relating to the institution indicated by the determined institution information; and
   transmitting the information to be outputted extracted by the extraction portion to the apparatus.

17. An information processing method used in an apparatus mountable in a vehicle which can communicate with an information supplying server, comprising:
   detecting the state of the vehicle, which includes the state of the operation of the vehicle or the state of the environment;
   acquiring information to be outputted from the information supplying server which stores information to be outputted, including map additional information to be added to maps or advertisement information; and
   extracting information to be outputted in accordance with the state of the vehicle from the information to be outputted, the extracting including (1) determining institution information, of which the state of the operation of the vehicle or the state of the environment satisfies a predetermined criterion, and (2) extracting the information to be outputted relating to the institution indicated by the determined institution information.

18. An information processing method used in an information supplying server which can communicate with an apparatus mountable in a vehicle, comprising:
  recording information to be outputted, which includes map additional information to be added to maps or advertisement information in a memory medium;
  acquiring the state of the vehicle, which includes the state of the operation of the vehicle or the state of the environment;
  extracting information to be outputted in accordance with the state of the vehicle from the information to be outputted recorded in the memory medium, the extracting including (1) determining institution information, of which the state of the operation of the vehicle or the state of the environment satisfies a predetermined criterion, and (2) extracting the information to be outputted relating to the institution indicated by the determined institution information; and
  transmitting information to be outputted extracted from the information to be outputted recorded in the memory medium to the apparatus.

* * * * *